United States Patent
Ichihara

(10) Patent No.: US 9,380,217 B2
(45) Date of Patent: Jun. 28, 2016

(54) CAMERA SYSTEM, IMAGING APPARATUS, LIGHTING DEVICE CAPABLE OF AUTOMATICALLY CHANGING THE IRRADIATION DIRECTION, AND CONTROL METHOD

(71) Applicant: CANON KABUSHIKI KAISHA, Tokyo (JP)

(72) Inventor: Yoshiro Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/312,466

(22) Filed: Jun. 23, 2014

(65) Prior Publication Data
US 2014/0375837 A1 Dec. 25, 2014

(30) Foreign Application Priority Data

Jun. 24, 2013 (JP) ................................ 2013-131671
Jun. 24, 2013 (JP) ................................ 2013-131672

(51) Int. Cl.
| H04N 5/222 | (2006.01) |
| G03B 15/05 | (2006.01) |
| H04N 5/235 | (2006.01) |
| H04N 5/225 | (2006.01) |
| G03B 7/16 | (2014.01) |

(52) U.S. Cl.
CPC ............... *H04N 5/2354* (2013.01); *G03B 7/16* (2013.01); *G03B 15/05* (2013.01); *H04N 5/2256* (2013.01); *G03B 2206/00* (2013.01); *G03B 2215/05* (2013.01); *G03B 2215/056* (2013.01); *G03B 2215/0521* (2013.01)

(58) Field of Classification Search
CPC .................................................... H04N 5/2256
USPC ............................................. 348/222.1, 371
See application file for complete search history.

(56) References Cited

U.S. PATENT DOCUMENTS 8,233,080 B2 * 7/2012 Yanai ..................... G03B 15/05
348/240.99

FOREIGN PATENT DOCUMENTS

| JP | 2009-145712 A | 7/2009 |
| JP | 2009-163179 A | 7/2009 |

* cited by examiner

Primary Examiner — Joel Fosselman
(74) Attorney, Agent, or Firm — Canon USA, Inc. IP Division

(57) ABSTRACT

A camera system includes a lighting device and an imaging apparatus. The lighting device includes a movable unit including a flash unit, a detection unit to detect information indicating the position of the movable unit, and a transmission unit to transmit position information based on information detected by the detection unit to the imaging apparatus. The imaging apparatus includes a calculation unit to calculate amount of light emission of the flash unit, a correction unit to perform correction of the amount of the light emission calculated by the calculation unit, and a reception unit to receive the position information from the lighting device. According to the position information received by the reception unit, the correction unit switches whether to perform correction of the amount of the light emission calculated by the calculation unit.

8 Claims, 35 Drawing Sheets

TO FIG. 1B

FROM FIG. 1A

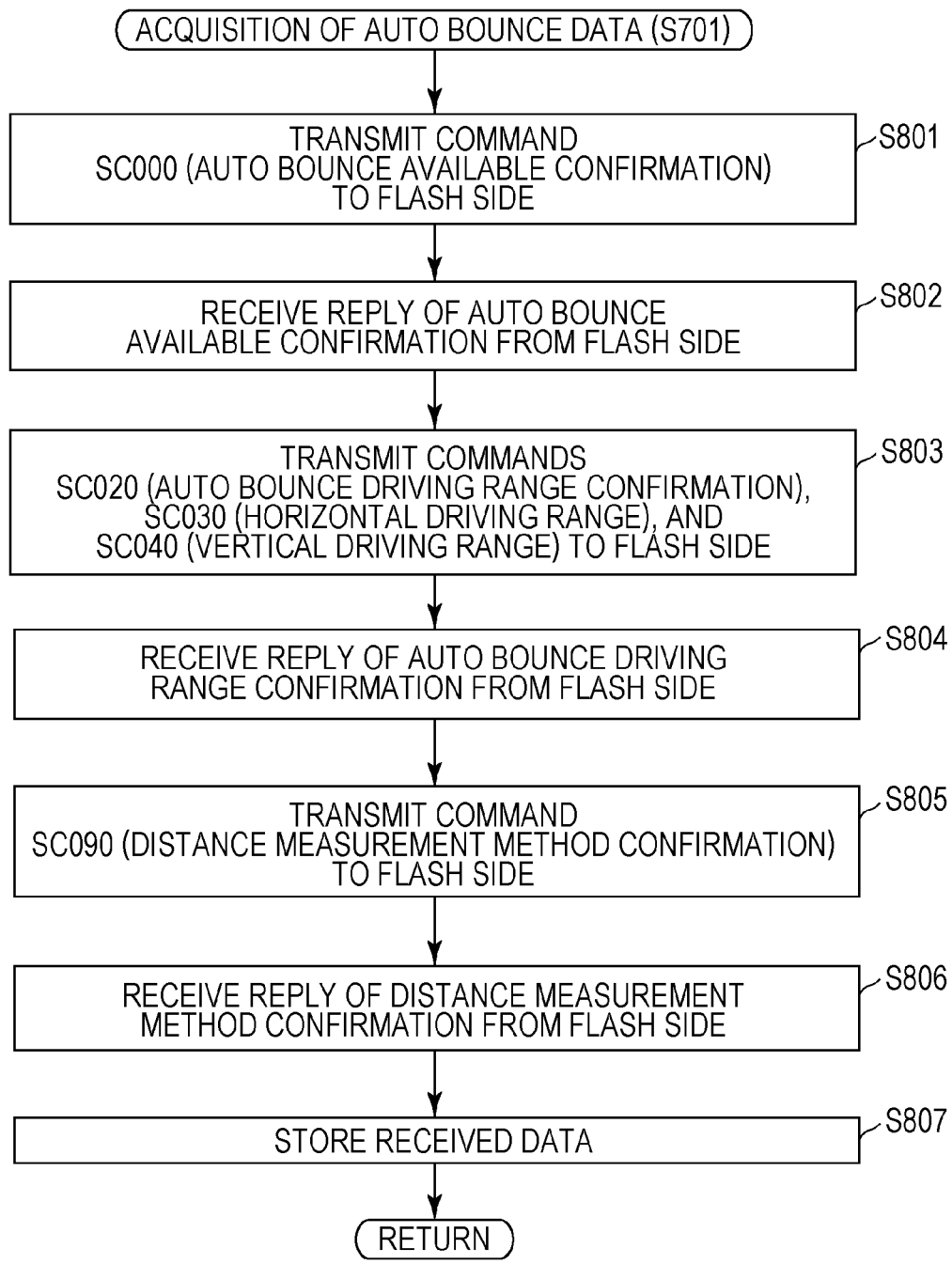

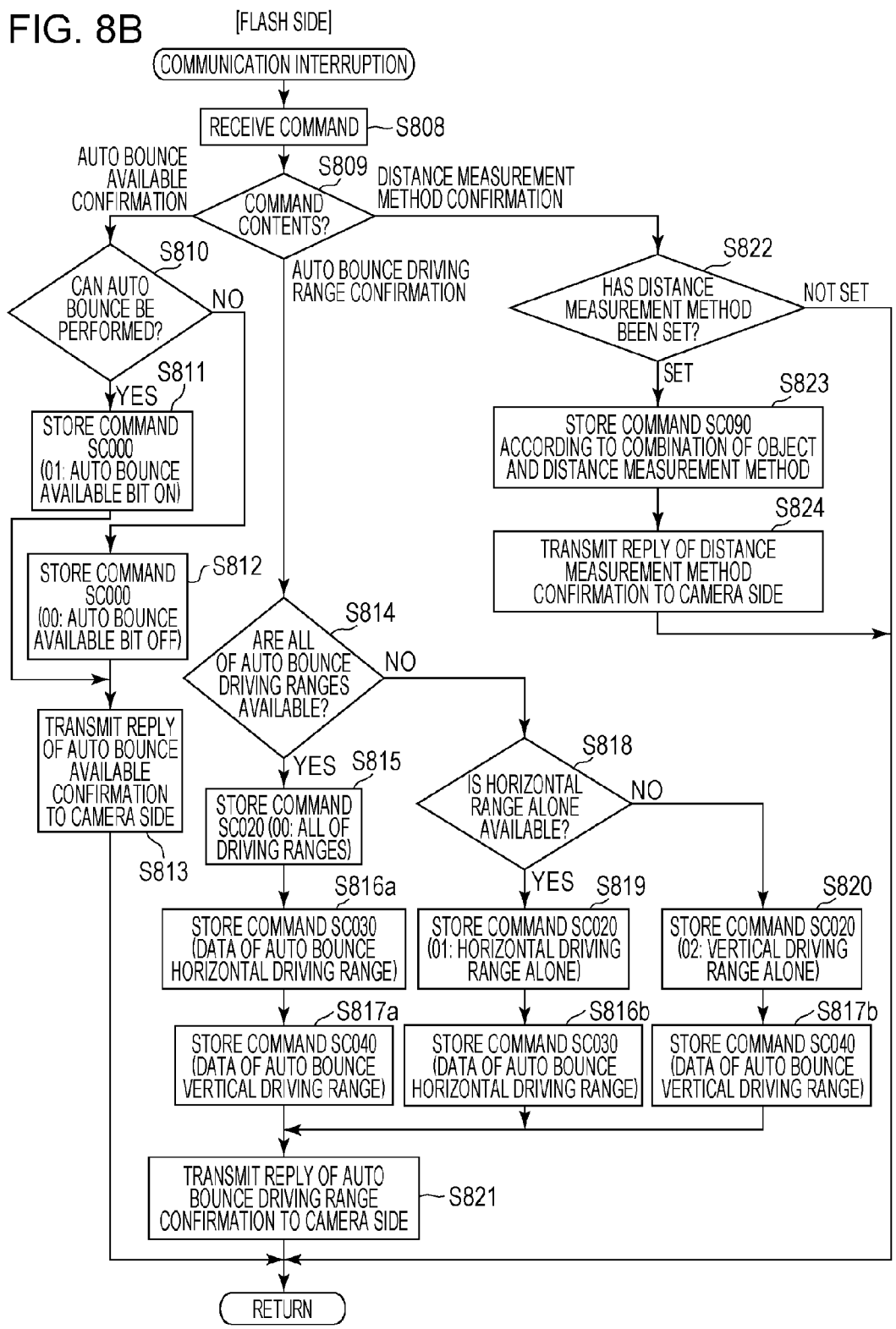

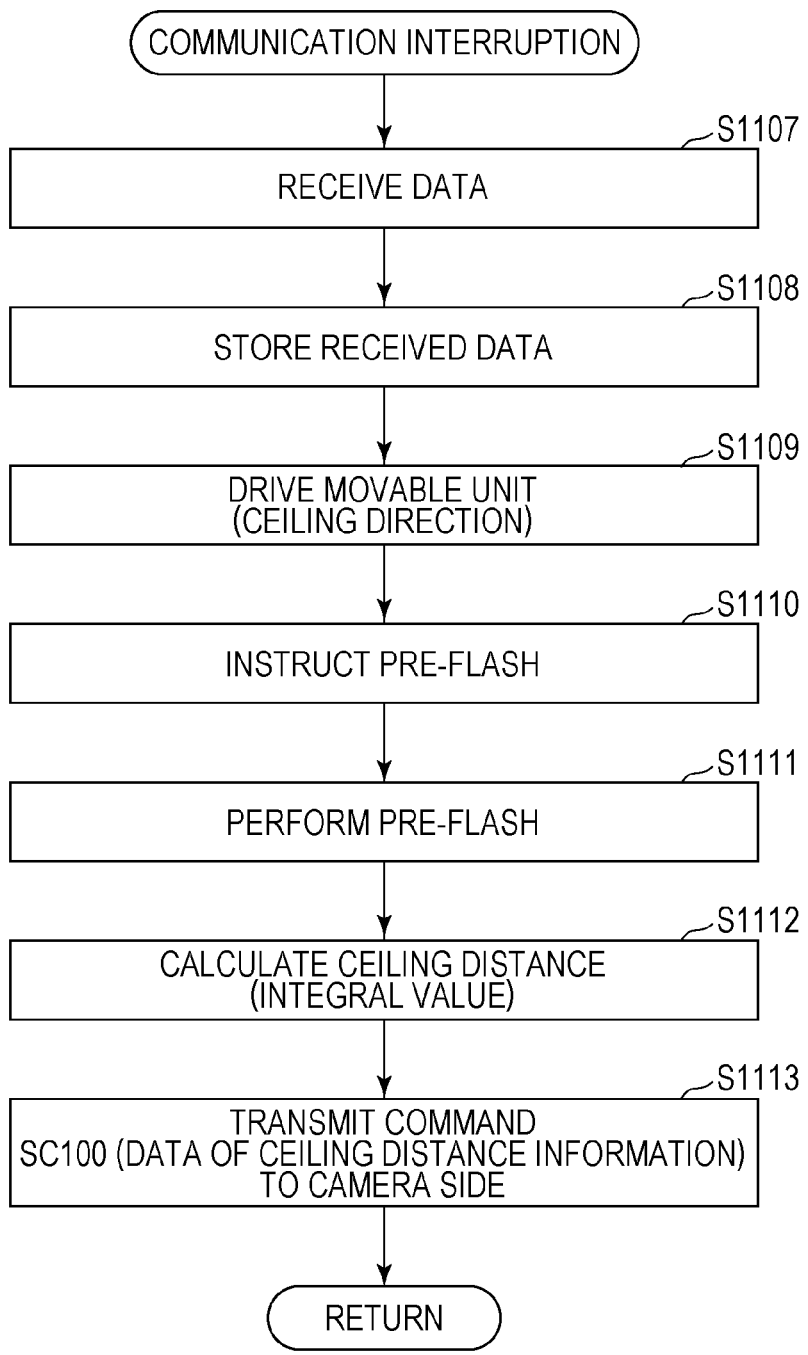

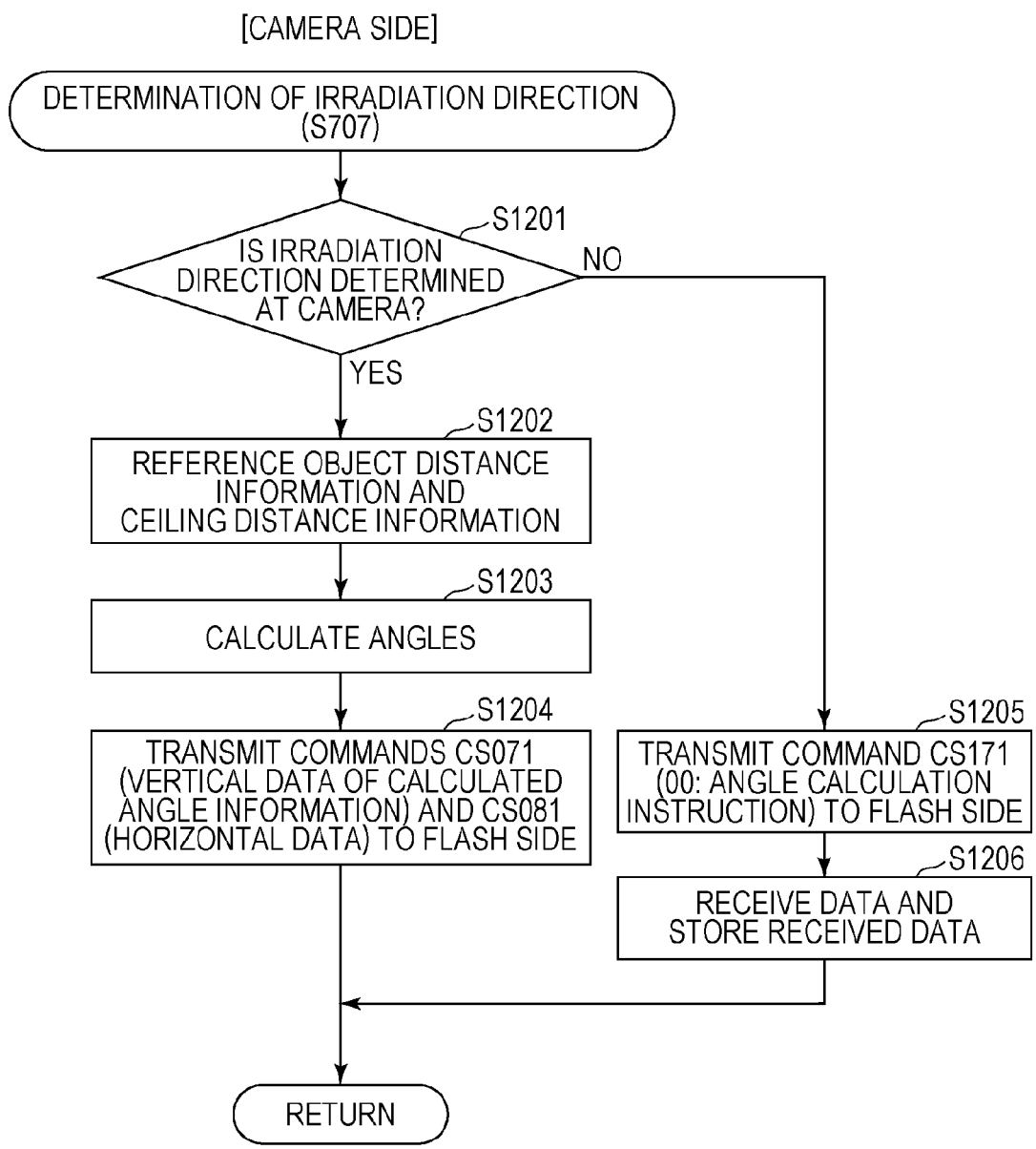

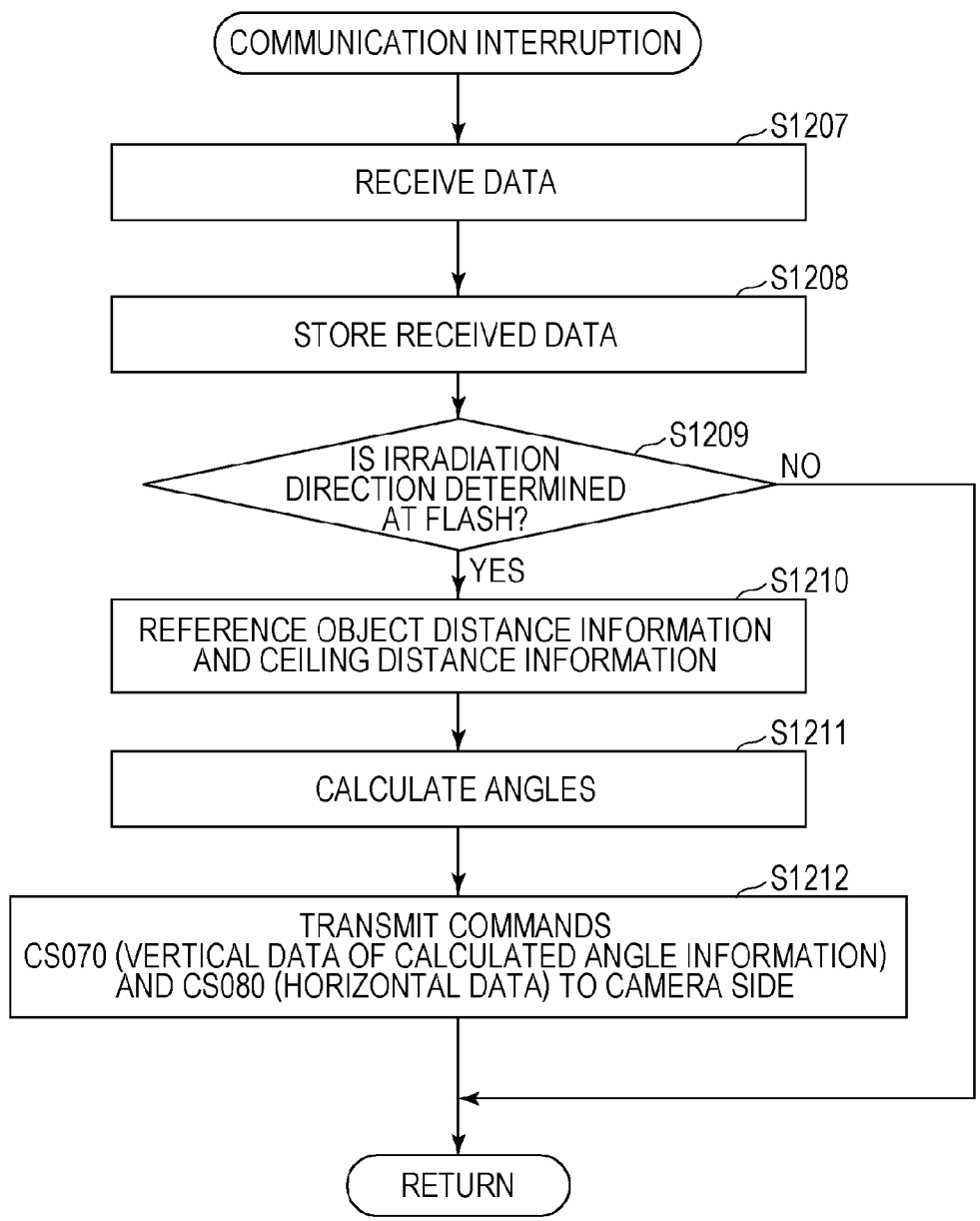

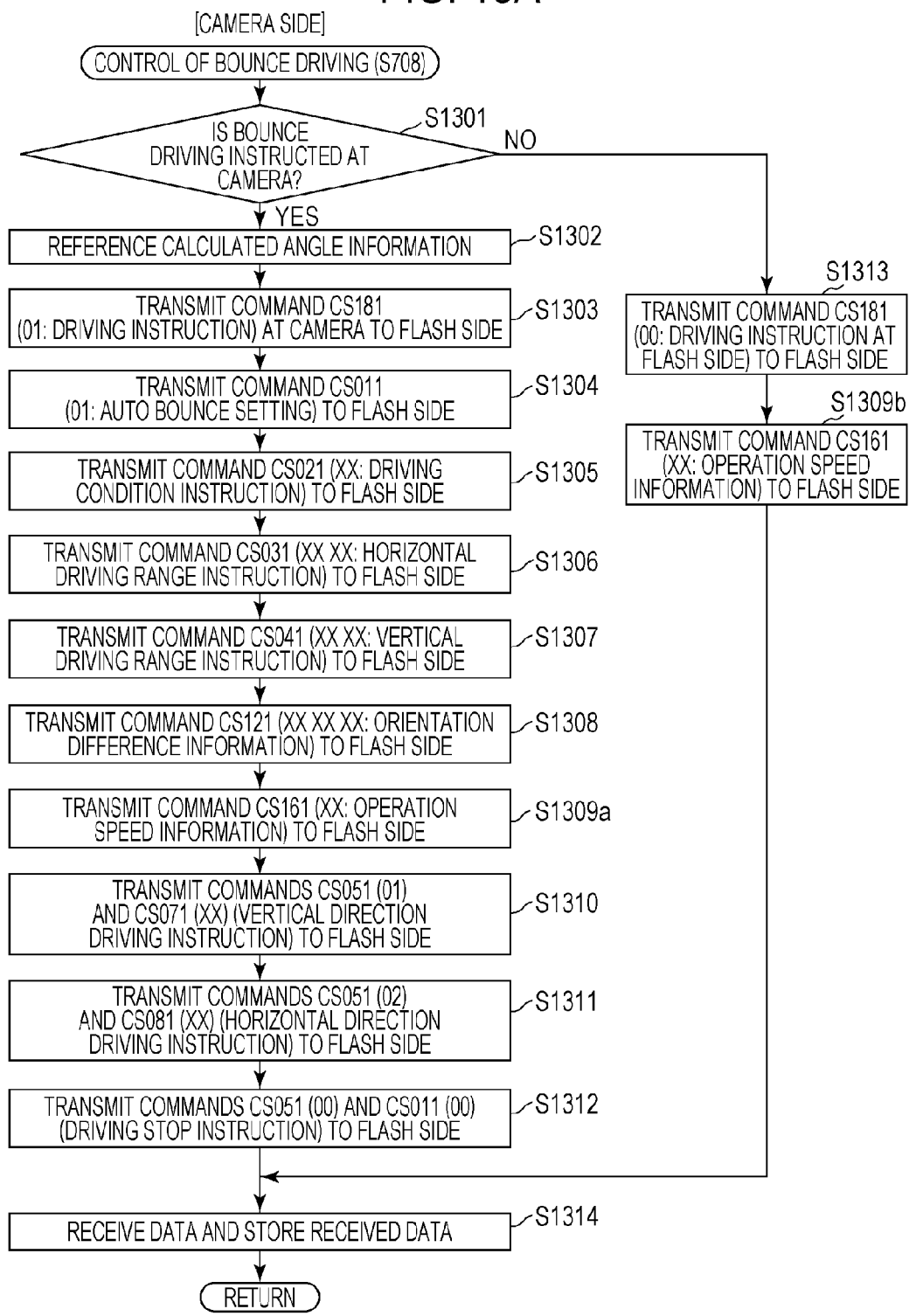

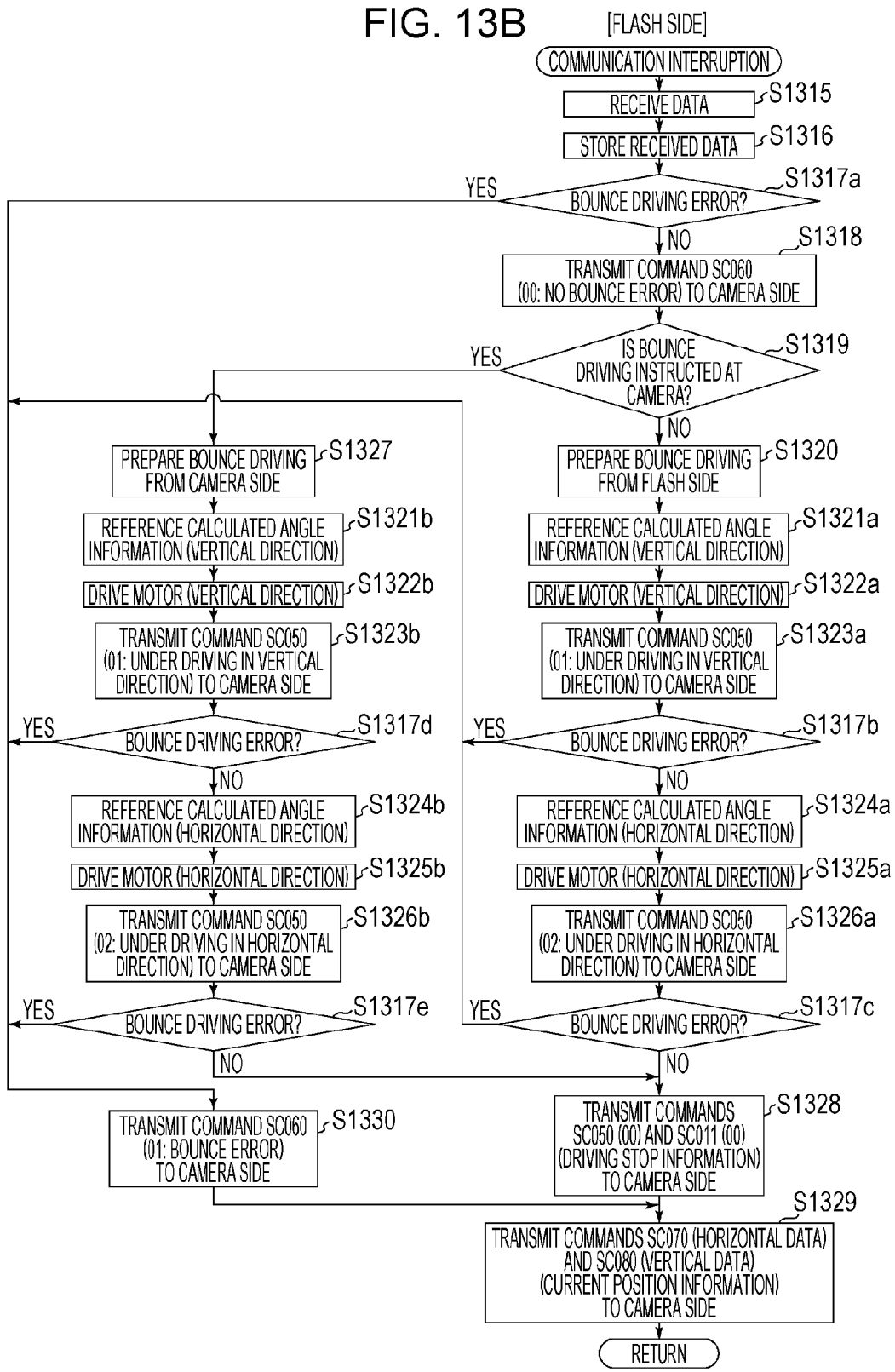

FIG. 17A

VERTICAL

| ANGLE | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |

FIG. 17B

HORIZONTAL

| ANGLE | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |
| 225 | 1 | 1 | 0 | 1 |
| 240 | 1 | 1 | 1 | 1 |
| 255 | 1 | 1 | 1 | 0 |
| 270 | 1 | 0 | 1 | 0 |
| 285 | 1 | 0 | 1 | 1 |
| 300 | 1 | 0 | 0 | 1 |
| 315 | 1 | 0 | 0 | 0 |

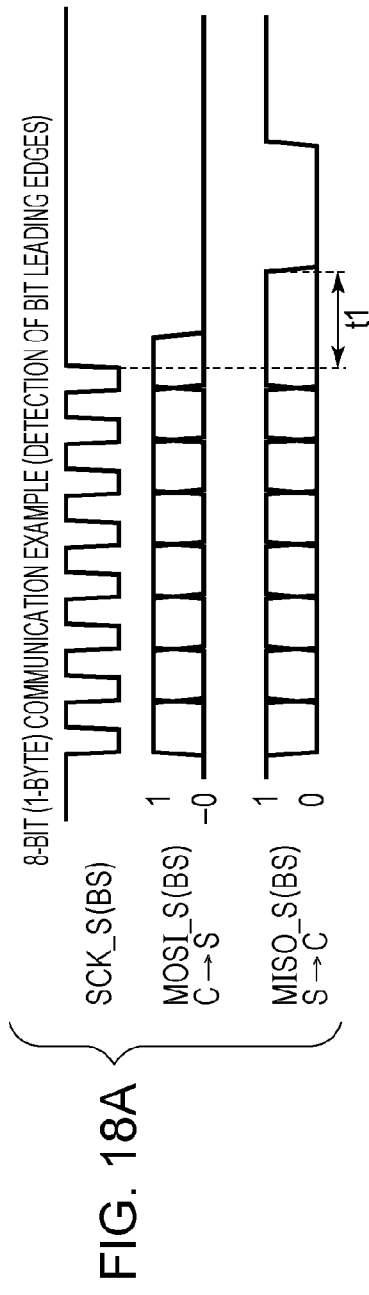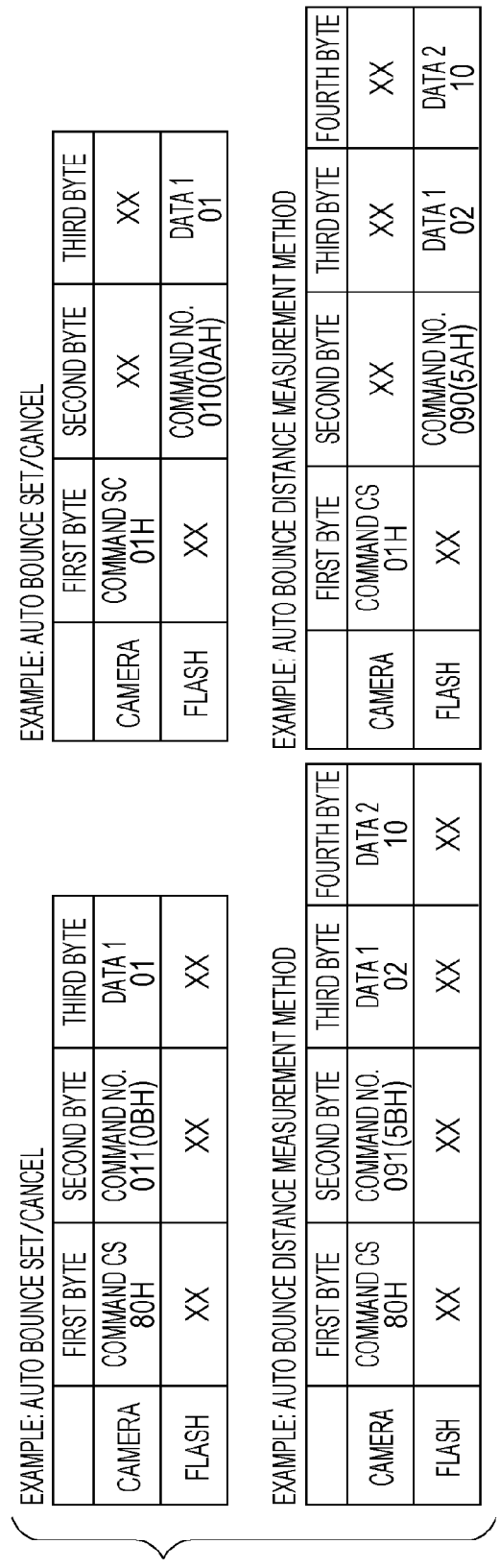

FIG. 19A

| COMMAND | COMMAND NO. | CONTENTS | DATA ITEM |
|---|---|---|---|
| SC HEX: 01 | 000 HEX: 00 | AUTO BOUNCE FUNCTION | 0: NO<br>1: YES |
| SC HEX: 01 | 010 HEX: A | AUTO BOUNCE SET/CANCEL | 0: CANCEL<br>1: SET |
| SC HEX: 01 | 020 HEX: 14 | AUTO BOUNCE DRIVING RANGE | 0: ALL AVAILABLE<br>1: HORIZONTAL AVAILABLE<br>2: VERTICAL AVAILABLE |
| SC HEX: 01 | 030 HEX: 1E | AUTO BOUNCE HORIZONTAL DRIVING RANGE | START TO END |
| SC HEX: 01 | 040 HEX: 28 | AUTO BOUNCE VERTICAL DRIVING RANGE | START TO END |
| SC HEX: 01 | 050 HEX: 32 | UNDER AUTO BOUNCE DRIVING (MOTOR) | 0: STOP<br>1: VERTICALLY OPERATING<br>2: HORIZONTALLY OPERATING |
| SC HEX: 01 | 060 HEX: 3C | AUTO BOUNCE ERROR | 0: NORMAL<br>1: ERROR |
| SC HEX: 01 | 070 HEX: 46 | CURRENT POSITION BOUNCE ANGLE INFORMATION (VERTICAL) | 000H TO 168H |
| SC HEX: 01 | 080 HEX: 50 | CURRENT POSITION BOUNCE ANGLE INFORMATION (HORIZONTAL) | 000H TO 168H |
| SC HEX: 01 | 090 HEX: 5A | AUTO BOUNCE DISTANCE MEASUREMENT METHOD | 0x: OBJECT<br>1x: CEILING (WALL)<br>x0: PRE-FLASH<br>x1: FLASH DISTANCE MEASUREMENT<br>x2: CAMERA DISTANCE MEASUREMENT |
| SC HEX: 01 | 100 HEX: 64 | CEILING DISTANCE INFORMATION | DATA |
| SC HEX: 01 | 110 HEX: 6e | OBJECT DISTANCE INFORMATION | DATA |
| SC HEX: 01 | 120 HEX: 78 | FLASH ORIENTATION DIFFERENCE INFORMATION | HORIZONTAL DATA<br>VERTICAL DATA<br>FRONT-AND-BACK DATA |
| SC HEX: 01 | 130 HEX: 82 | UNDER AUTO BOUNCE PRE-FLASH | 0: WAITING<br>1: FLASHING |

FIG. 19B

| COMMAND | COMMAND NO. | CONTENTS | DATA ITEM |
|---|---|---|---|
| CS HEX: 08 | 001 HEX: 01 | AUTO BOUNCE AVAILABLE CAMERA | 0: UNAVAILABLE<br>1: AVAILABLE |
| CS HEX: 08 | 011 HEX: 0B | AUTO BOUNCE SET/CANCEL | 0: CANCEL<br>1: SET |
| CS HEX: 08 | 021 HEX: 15 | AUTO BOUNCE DRIVING CONDITION INSTRUCTION | 0: ALL AVAILABLE<br>1: HORIZONTAL AVAILABLE<br>2: VERTICAL AVAILABLE |
| CS HEX: 08 | 031 HEX: 1F | AUTO BOUNCE HORIZONTAL DRIVING RANGE INSTRUCTION | START TO END |
| CS HEX: 08 | 041 HEX: 29 | AUTO BOUNCE VERTICAL DRIVING RANGE INSTRUCTION | START TO END |
| CS HEX: 08 | 051 HEX: 33 | AUTO BOUNCE DRIVING INSTRUCTION (MOTOR) | 0: STOP<br>1: VERTICAL OPERATING<br>2: HORIZONTAL OPERATING |
| CS HEX: 08 | 071 HEX: 47 | POSITION BOUNCE ANGLE INSTRUCTION (VERTICAL) | 000H TO 168H |
| CS HEX: 08 | 081 HEX: 51 | POSITION BOUNCE ANGLE INSTRUCTION (HORIZONTAL) | 000H TO 168H |
| CS HEX: 08 | 091 HEX: 5B | AUTO BOUNCE DISTANCE MEASUREMENT METHOD INSTRUCTION | 0x: OBJECT<br>1x: CEILING (WALL)<br>x0: PRE-FLASH<br>x1: FLASH DISTANCE MEASUREMENT<br>x2: CAMERA DISTANCE MEASUREMENT |
| CS HEX: 08 | 101 HEX: 65 | CEILING DISTANCE INFORMATION | DATA |
| CS HEX: 08 | 111 HEX: 6F | OBJECT DISTANCE INFORMATION | DATA |
| CS HEX: 08 | 121 HEX: 79 | CAMERA ORIENTATION DIFFERENCE INFORMATION | HORIZONTAL DATA<br>VERTICAL DATA<br>FRONT-AND-BACK DATA |
| CS HEX: 08 | 131 HEX: 83 | PRE-FLASH INHIBITION | 0: NOT INHIBITED<br>1: INHIBITED |
| CS HEX: 08 | 141 HEX: 8D | PHOTOMETRY TIMER STATE | 0: NOT OPERATING<br>1: OPERATING |
| CS HEX: 08 | 151 HEX: 97 | RELEASE SWITCH STATES | 0: ALL SWITCHES OFF<br>1: SW1 ON<br>2: SW2 ON |
| CS HEX: 08 | 161 HEX: A1 | CHANGE OF OPERATION SPEED | 0: NORMAL<br>1: LOW SPEED (SILENT)<br>2: HIGH SPEED |
| CS HEX: 08 | 171 HEX: AB | BOUNCE ANGLE CALCULATION | 0: FLASH<br>1: CAMERA |
| CS HEX: 08 | 181 HEX: B5 | BOUNCE DRIVING INSTRUCTION SELECTION | 0: FLASH<br>1: CAMERA |

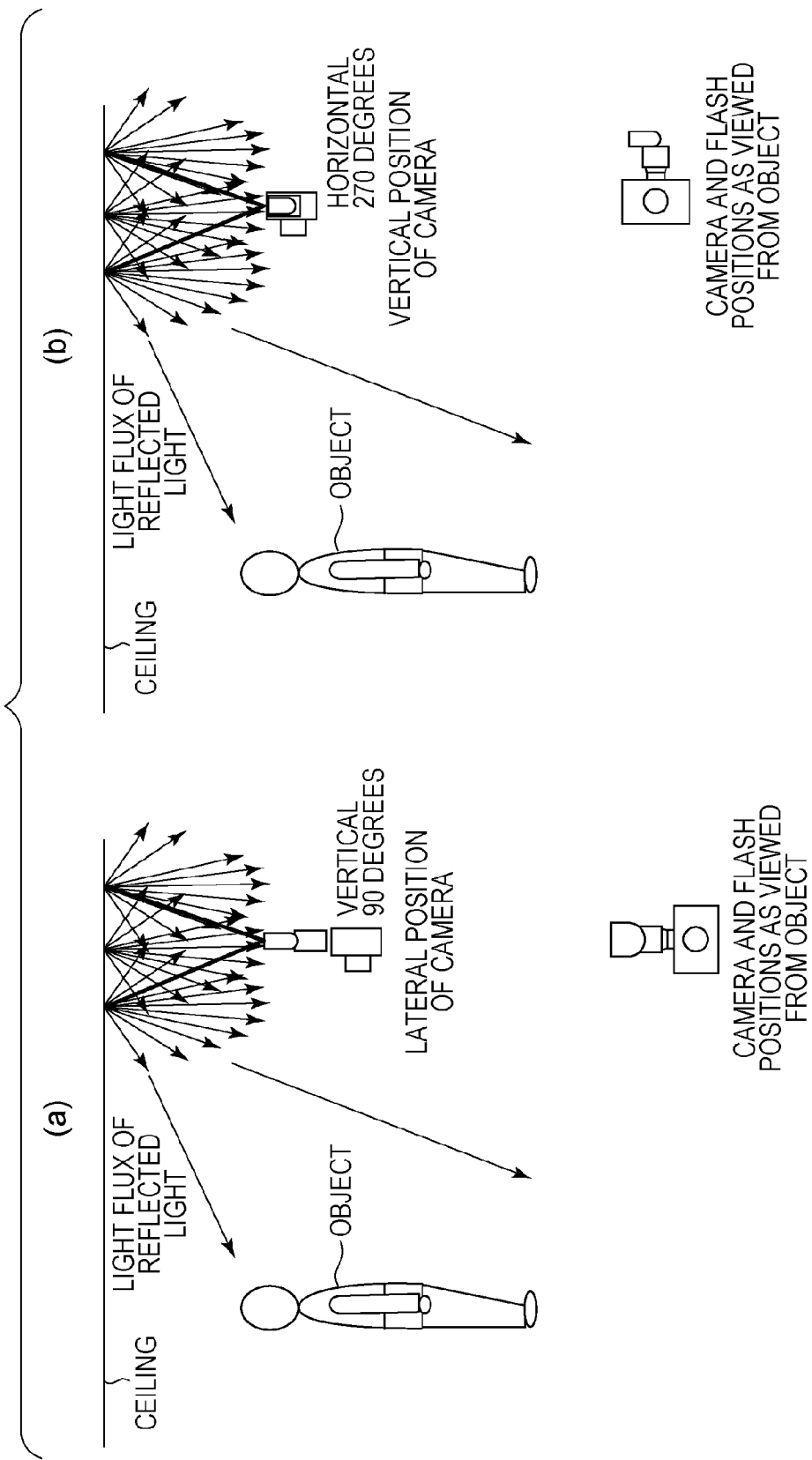

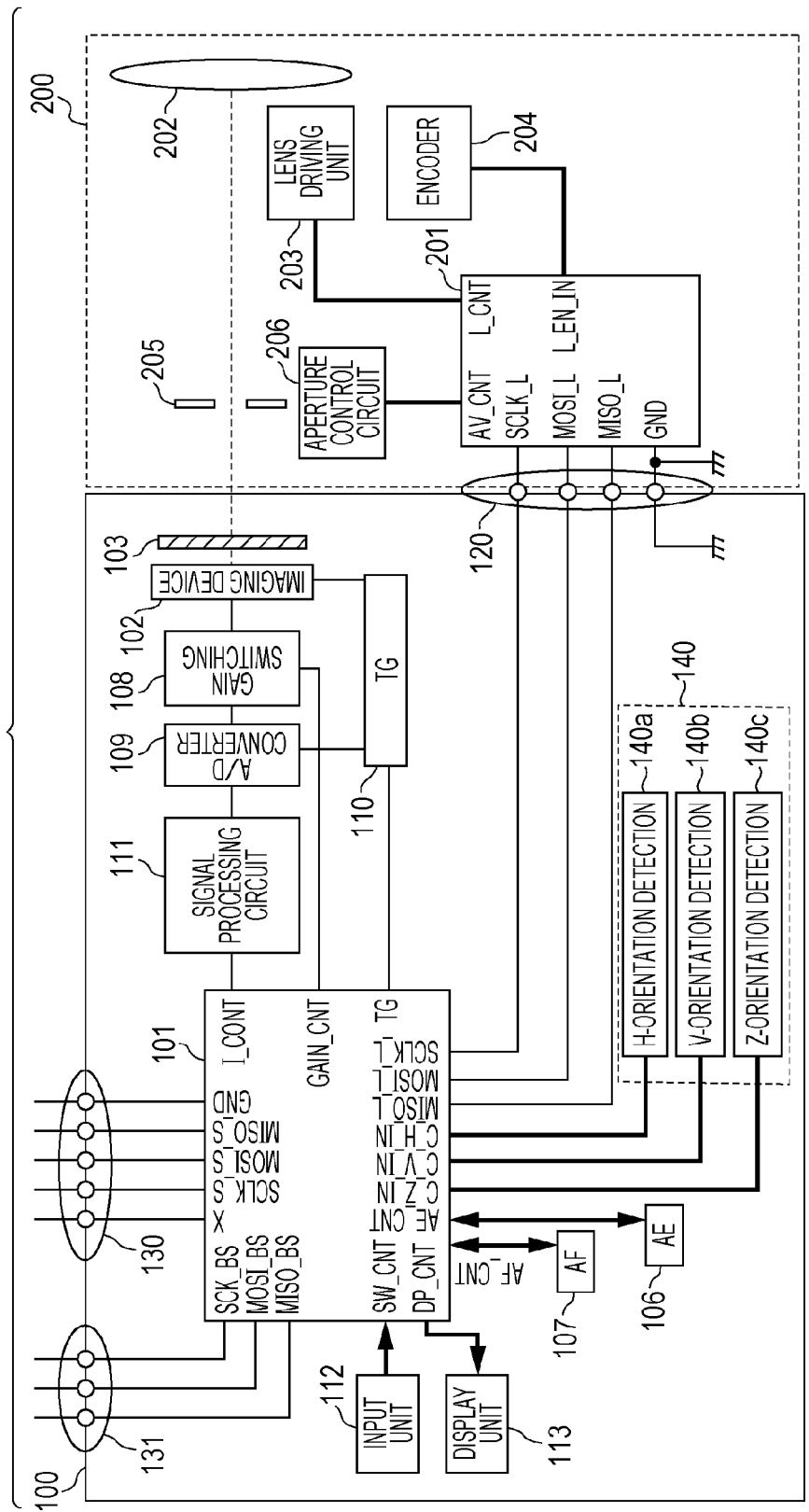

CAMERA SYSTEM, IMAGING APPARATUS, LIGHTING DEVICE CAPABLE OF AUTOMATICALLY CHANGING THE IRRADIATION DIRECTION, AND CONTROL METHOD

BACKGROUND OF THE INVENTION

1. Field of the Invention

The present invention relates to communication control of a lighting device capable of automatically changing the irradiation direction.

2. Description of the Related Art

Heretofore, there has been known a type of flash photographing where the ceiling or the like is irradiated with light from a lighting device, to irradiate a subject with diffusely reflected light from the ceiling or the like (hereinafter, referred to as bounce flash photographing). Bounce flash photographing enables an object to be irradiated with light from a lighting device, not directly but indirectly, so photographic expressions can be made in soft light.

For example, Japanese Patent Laid-Open No. 2009-145712 discloses an imaging apparatus which switches gain for an image signal obtained from an imaging device, according to bounce information obtained from a flash device.

The technology disclosed in Japanese Patent Laid-Open No. 2009-145712 is, however, technology used in a flash device of which a user manually changes the irradiation direction (bounce angle), and does not take into consideration the flash device communicating various types of information with an imaging apparatus to automatically change the irradiation direction. Accordingly, there is a concern that bounce flash photographing may not be suitably performed.

SUMMARY OF THE INVENTION

It has been found to be desirable to automatically change the irradiation direction and to enable bounce flash photographing to be suitably performed.

A camera system, according to an embodiment of the present invention, includes a lighting device, wherein the lighting device includes a flash unit, a movable unit including the flash unit, a detection unit configured to detect information indicating the position of the movable unit, and a transmission unit configured to transmit position information based on information detected by the detection unit to an imaging apparatus, and the imaging apparatus, wherein the imaging apparatus includes a calculation unit configured to calculate amount of light emission of the flash unit, a correction unit configured to perform correction of the amount of the light emission calculated by the calculation unit, and a reception unit configured to receive the position information from the lighting device, wherein, according to the position information received by the reception unit, the correction unit switches whether to perform correction of the amount of the light emission calculated by the calculation unit.

Further features of the present invention will become apparent from the following description of exemplary embodiments with reference to the attached drawings.

BRIEF DESCRIPTION OF THE DRAWINGS

FIG. 8A and FIG. 8B are a diagram illustrating a flowchart of auto bounce data acquisition processing.

FIG. 11A and FIG. 11B are a diagram illustrating a flowchart of ceiling (wall) distance calculation processing.

FIG. 12A and FIG. 12B are a diagram illustrating a flowchart of irradiation direction deciding processing.

FIG. 13A and FIG. 13B are a diagram illustrating a flowchart of bounce driving control processing.

FIGS. 17A and 17B are diagrams indicating allocations between a gray code and a turning angle of the rotary encoder.

FIGS. 18A and 18B are diagrams illustrating a data communication example between the camera main body and the flash device via a terminal.

FIGS. 19A and 19B are diagrams illustrating a command list in communication between the camera main body and the flash device.

FIG. 23 is a diagram illustrating an irradiation direction of the flash device according to the orientation of the camera system.

FIG. 25A and FIG. 25B are a block diagram illustrating a schematic configuration of a modification of a camera system according to an embodiment of the present invention.

DESCRIPTION OF THE EMBODIMENTS

First Embodiment

Figure 1A:
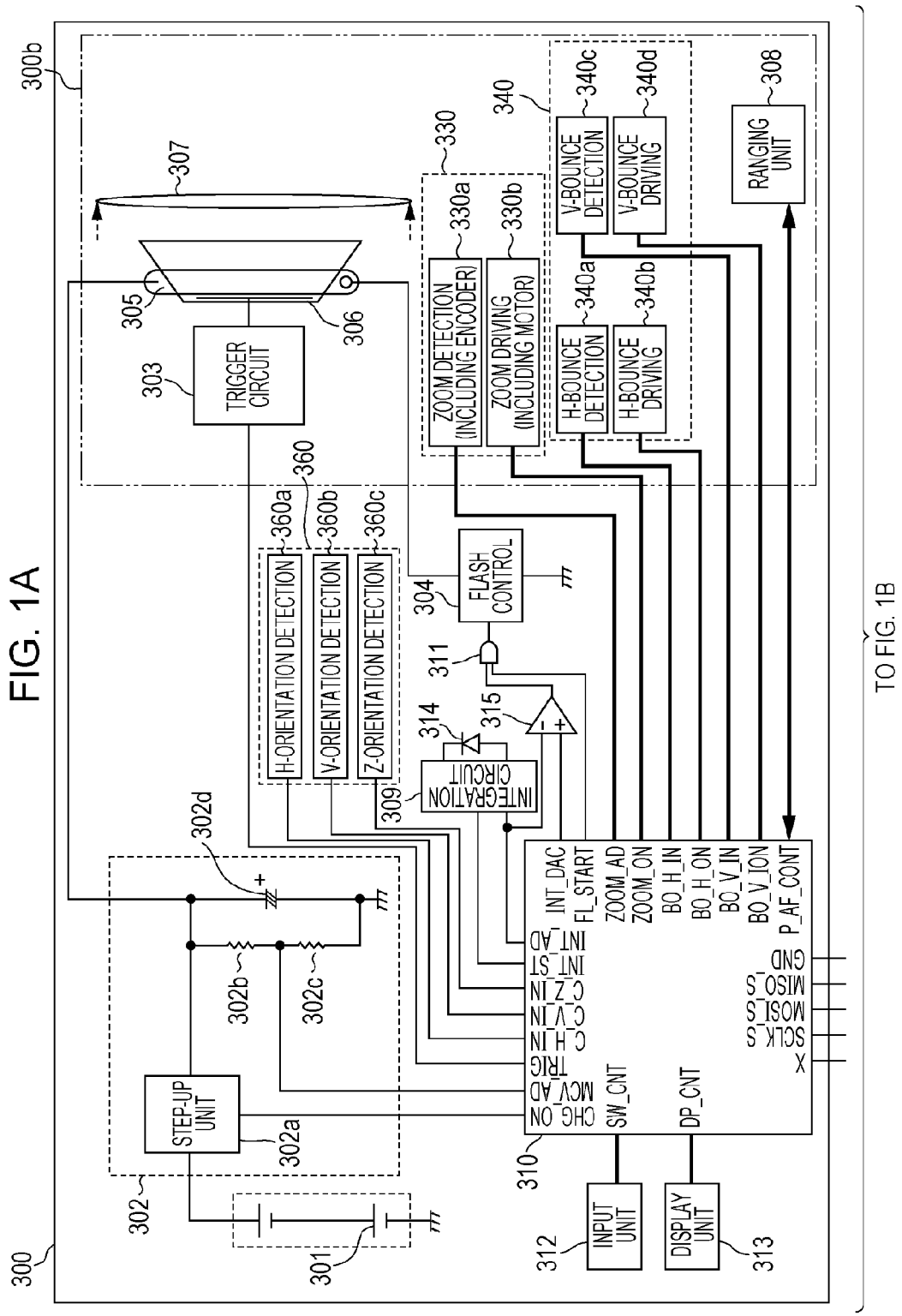
FIG. 1A and FIG. 1B are a block diagram illustrating a schematic configuration of a camera system according to an embodiment of the present invention.
Figure 1B:
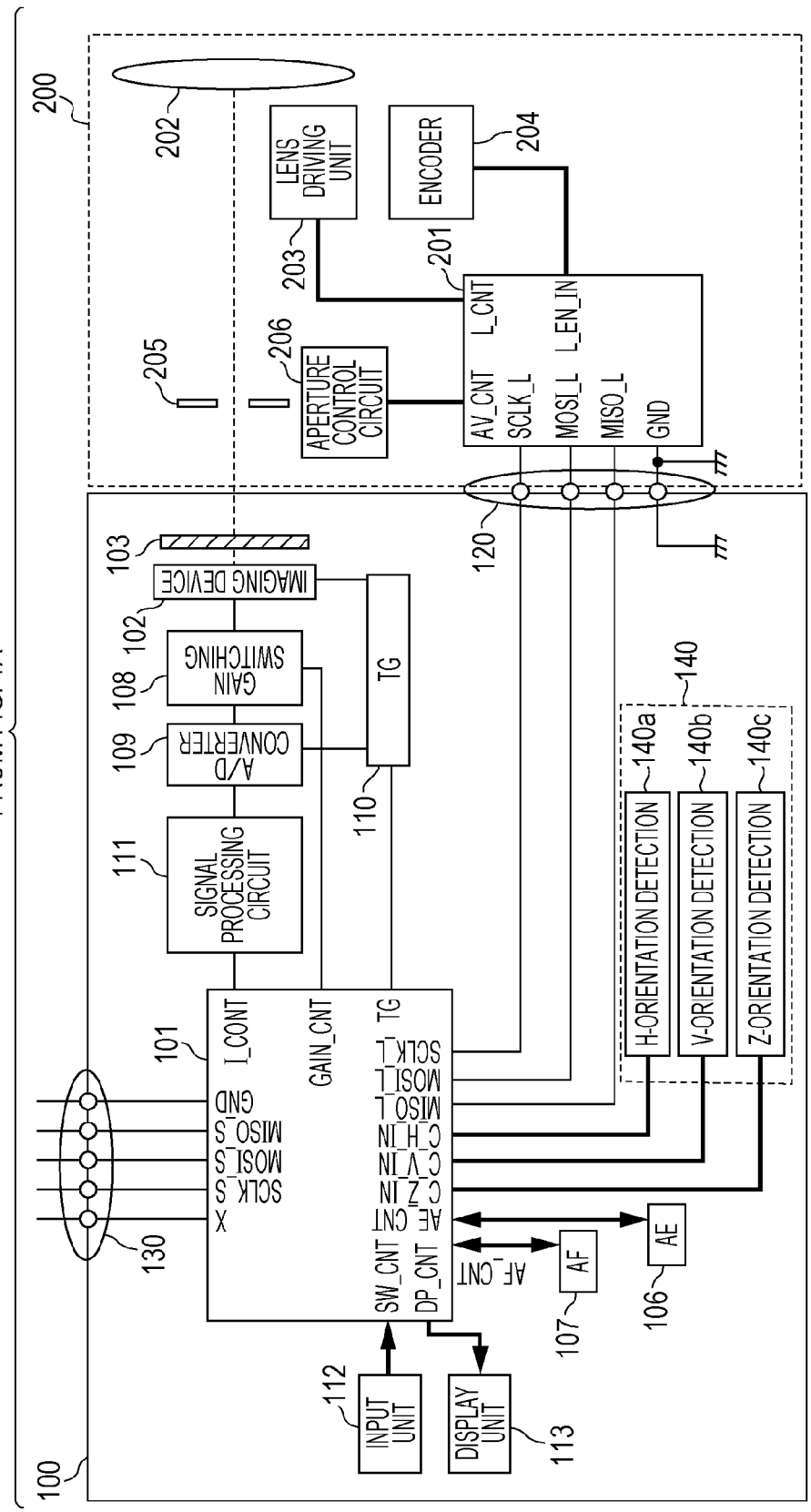
Figure 2:
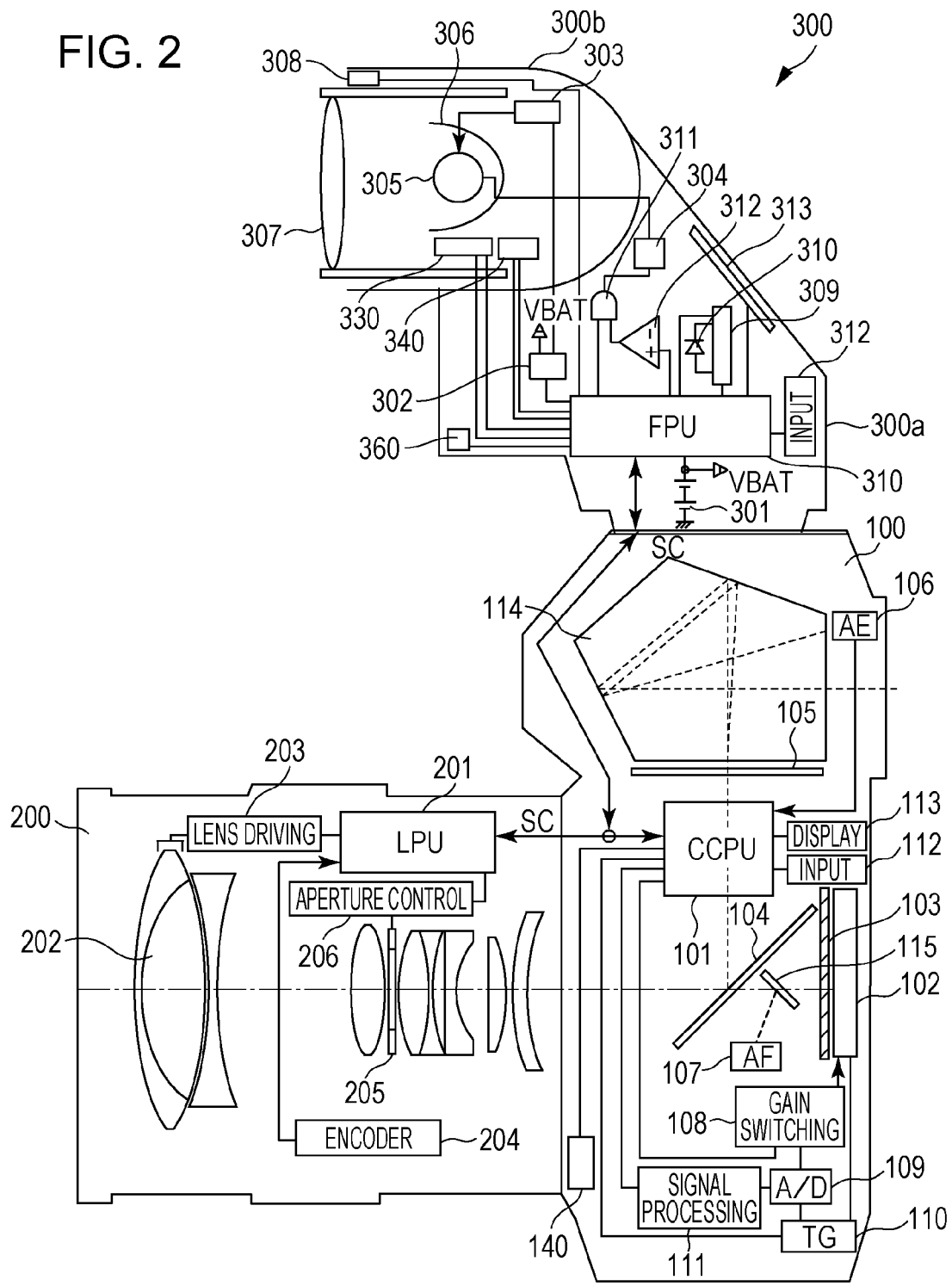
FIG. 2 is a block diagram illustrating a schematic configuration of the camera system according to an embodiment of the present invention.

Hereinafter, a first embodiment of the present invention will be described in detail based on the appended drawings. FIGS. 1A through 2 illustrate a schematic configuration of a camera system (including a digital camera, a lens, and a flash device) according to a first embodiment of the present invention. The camera system according to the present embodiment includes a camera main body 100 which is an imaging apparatus, a lens unit 200 detachably mounted on the camera main body 100, and a flash device 300 which is a lighting device detachably mounted on the camera main body 100. Note that the same components in FIGS. 1A through 2 are denoted with the same reference numerals.

First, an internal configuration of the camera main body 100 will be described. A camera microcomputer (may be abbreviated to "CCPU") 101 controls the units in the camera main body 100. The camera microcomputer 101 has a microcomputer built-in one-chip IC configuration including, for example, a central processing unit (CPU), read-only memory (ROM), random access memory (RAM), an input and output control circuit (I/O controller), a multiplexer, a timer circuit, electrically erasable programmable read-only memory (EEPROM), A/D and D/A converters, and so forth. The camera microcomputer 101 can perform control of the camera system using software, and perform various types of condition determination.

An imaging device 102 is an imaging device such as a charge-coupled device (CCD), a complementary metal-oxide semiconductor (CMOS) device, or the like including an infrared cut filter, a low-pass filter, and so forth, in which an object image is formed by a later-described lens group 202 at the time of photographing. A shutter 103 moves the imaging device 102 to a position to shield the imaging device 102 from light, and to a position to expose the imaging device 102.

A main mirror (half mirror) 104 moves to a position where part of light input from the lens group 202 is reflected to form an image on a focusing screen 105, and to a position where the light input from the lens group 202 is retracted from an optical path (photographing optical path) to the imaging device 102. An object image is formed on the focusing screen 105, and the formed object image is confirmed by a user through an optical finder which is not illustrated.

A photometry circuit (automatic exposure (AE) circuit) 106 includes a photometry sensor within the circuit, which divides an object into multiple regions and performs photometry at each region. A photometry sensor within the photometry circuit 106 senses an object image formed on the focusing screen 105 via a later-described pentagonal prism 114. A focus detection circuit (AF circuit) 107 includes a ranging sensor including multiple range-finding points within the circuit, which outputs focus information such as the defocus amount of each range-finding point.

A gain switching circuit 108 is configured to amplify the signal output from the imaging device 102. The camera microcomputer 101 performs gain switching according to photographing conditions, user operations, or the like.

An A/D converter 109 converts the amplified analog signal output from the imaging device 102 into a digital signal. A timing generator (TG) 110 synchronizes input of the amplified analog signal from the imaging device 102 with the conversion timing of the A/D converter 109.

A signal processing circuit 111 subjects image data, converted into digital signals at the A/D converter 109, to signal processing.

A communication line SC is an interface signal line between the camera main body 100, lens unit 200, and flash device 300, which perform communication of information such as exchange of data, transmission of commands, and so forth, with each other over the communication line SC with the camera microcomputer 101 as the host. Serial communication at terminals 120 and 130 in FIG. 1B exemplifies 3-terminal type serial communication, as an example of SC communication. The terminal 120 includes an SCLK_L terminal for synchronizing communication between the camera main body 100 and lens unit 200, a MOSI_L terminal for transmitting data to the lens unit 200, and a MISO_L terminal for receiving the data transmitted from the lens unit 200. The terminal 120 also includes a GND terminal connecting both the camera main body 100 and lens unit 200.

The terminal 130 includes an SCLK_S terminal for synchronizing communication between the camera main body 100 and flash device 300, a MOSI_S terminal for transmitting data from the camera main body 100 to the flash device 300, and a MISO_S terminal for receiving the data transmitted from the flash device 300. The terminal 130 also includes a GND terminal connecting both the camera main body 100 and flash device 300. FIGS. 18A and 18B illustrate a data communication example via the terminal 130. FIG. 18A is a diagram illustrating timing of data communication. When transmitting data from the camera microcomputer 101 to the flash microcomputer 310, data is serially transmitted by changing bits closer to the MOSI_S terminal to on/off in sync with an 8-bit clock of an SCK_S terminal. Conversely, when transmitting data from the flash microcomputer 310 to the camera microcomputer 101, data is serially transmitted by changing the bits closer to the MISO_S terminal to on/off in sync with the 8-bit clock of the SCK_S terminal. Note that, though reading/writing of a signal is performed at the leading edge of the SCLK_S signal in 8-bit (1-byte) communication in FIG. 18A, this 8-bit communication is performed by consecutively transmitting a command, command data, and data multiple times. FIG. 18B is a specific example of information to be communicated, and is transmitted from the camera microcomputer 101 to the flash microcomputer 310 in accordance with a command list in FIG. 19B described later.

For example, in a case of "auto bounce set/cancel from camera to flash", 80H in CS communication at the first byte, command No. 011 (0BH) at the second byte, and 01 (setting) of data (contents) at the third byte, are converted from hexadecimal to binary and transmitted from the camera main body 100 to the flash device 300.

Specifically, when the camera main body 100 transmits information to the flash device 300, the camera main body 100 transmits the command CS: 80H to the flash device 300 as the first byte, and when the camera main body 100 acquires information from the flash device 300, transmits the command SC 01H as the first byte from the camera main body 100 to the flash device 300. Subsequently, one of the camera main body 100 and flash device 300 transmits a number following the SC or CS in the command No. (converted into hexadecimal at the time of transmission) as the second byte and setting item data as the third byte or the fourth bytes to the other. Communication of other information will be described with reference to the command lists indicated in FIGS. 19A and 19B as appropriate.

An input unit 112 includes an operation unit including a power switch, a release switch, setting buttons, and so forth. The camera microcomputer 101 executes various processes in response to input to the input unit 112. Upon the release switch being operated in a first stage (half-pressed), a switch SW1 turns on, and the camera microcomputer 101 starts photographing preparation operation such as focus adjustment, photometry, and so forth. Also, upon the release switch being operated in a second stage (full-pressed), a switch SW2 turns on, and the camera microcomputer 101 starts photographing operation such as exposure, developing processing or the like. Also, the user can also perform various settings of the flash device 300 mounted on the camera main body 100 by operating the setting buttons and so forth of the input unit 112. A display unit 113 including a liquid crystal device or light emission element displays various set modes, other photographing information, and so forth.

A pentagonal prism 114 guides the object image on the focusing screen 105 to the photometry sensor within the photometry circuit 106 and the optical finder which is not illustrated. A sub mirror 115 guides light input from the lens group 202 and transmitted the main mirror 104 to the ranging sensor of the focus detection circuit 107.

A orientation detection circuit 140 is a circuit configured to detect orientation difference, in which reference numeral 140a denotes a horizontal orientation detection unit configured to detect orientation difference in the horizontal direction, and 140b denotes a vertical orientation detection unit configured to detect orientation difference in the vertical direction, and reference numeral 140c denotes a front-back orientation detection unit configured to detect orientation difference in the front-back direction (Z direction). An angular velocity sensor or gyroscope sensor is employed as the orientation detection circuit 140, for example. Orientation information relating to the orientation difference in each direction detected by the orientation detection circuit 140 is input to the camera microcomputer 101.

Next, configurations and operation within the lens unit 200 will be described. A microcomputer LPU (hereinafter, lens microcomputer) 201 controls the units in the lens unit 200.

The lens microcomputer 201 has a microcomputer built-in one-chip IC configuration including, for example, a CPU, ROM, RAM, input and output control circuit (I/O control circuit), a multiplexer, a timer circuit, EEPROM, A/D and D/A converters, and so forth.

The lens group 202 is configured including multiple lenses including a focus lens, a zoom lens, and so forth. Note that the zoom lens may be omitted from the lens group 202. A lens driving unit 203 is a driving system configured to move a lens included in the lens group 202. The driving amount of the lens group 202 is calculated within the camera microcomputer 101 based on output of the focus detection circuit 107 within the camera main body 100. The calculated driving amount is transmitted from the camera microcomputer 101 to the lens microcomputer 201. An encoder 204 is an encoder configured to detect the position of the lens group 202 and to output driving information. The lens driving unit 203 moves the lens group 202 by a driving amount based on the driving information from the encoder 204, to perform focus adjustment. An aperture 205 configured to adjust the amount of light emission passed through is controlled by the lens microcomputer 201 via an aperture control circuit 206.

Next, the configuration of the flash device 300 will be described. The flash device 300 is configured including a main body unit 300a detachably mounted on the camera main body 100, and a movable unit 300b held so as to be turnable vertically and horizontally as to the main body unit 300a. Note that the turnable direction of the movable unit 300b is defined with a side connected to the movable unit 300b at the main body unit 300a as the upper side in the present embodiment.

A microcomputer FPU (hereinafter, flash microcomputer) 310 controls the units in the flash device 300. The flash microcomputer 310 has a microcomputer built-in one-chip IC configuration including, for example, a CPU, ROM, RAM, input and output control circuit (I/O control circuit), a multiplexer, a timer circuit, EEPROM, A/D and D/A converters, and so forth.

A battery 301 functions as a power source (VBAT) of the flash device 300. A step-up circuit block 302 is configured including a step-up unit 302a, resistors 302b and 302c used for voltage detection, and a main capacitor 302d. The step-up circuit block 302 steps up the voltage of the battery 301 to several hundred volts using the step-up unit 302a, and causes the main capacitor 302d to charge electric energy for the flash.

The charging voltage of the main capacitor 302d is divided by the resistors 302b and 302c, and the divided voltages are input to an A/D conversion terminal of the flash microcomputer 310. A trigger circuit 303 applies pulse voltage to a later-described discharge tube 305, for exciting the discharge tube 305. A flash control circuit 304 controls starting and stopping of the flash of the discharge tube 305. The discharge tube 305 is excited by receiving the pulse voltage of several KV applied from the trigger circuit 303, and emits light using electric energy charged at the main capacitor 302d.

A ranging unit 308 is a unit configured to detect distance to an object using a known method. The ranging unit 308 includes, for example, a light receiving sensor. The ranging unit 308 receives irradiation light from the discharge tube 305 and reflected at an object in the irradiation direction (the light-casting direction) using the light receiving sensor, and detects distance to the object. Alternatively, the ranging unit 308 may further include a light source for ranging, so as to receive irradiation light from the light source for ranging and reflected at the object in the irradiation direction using the light receiving sensor, and detect distance to the object.

An integration circuit 309 integrates a received photocurrent of a later-described photodiode 314, and output thereof is input to an inverted input terminal of a later-described comparator 315 and an A/D converter terminal of the flash microcomputer 310. A non-inverted input terminal of the comparator 315 is connected to a D/A converter terminal within the flash microcomputer 310, and the output of the comparator 315 is connected to an input terminal of a later-described AND gate 311. Another input of the AND gate 311 is connected to a flash control terminal of the flash microcomputer 310, and the output of the AND gate 311 is input to the flash control circuit 304. A photodiode 314 is a sensor configured to receive the light emitted from the discharge tube 305, and receives light emitted from the discharge tube 305 directly or via a glass fiber or the like.

A reflection umbrella 306 reflects the light emitted from the discharge tube 305 to be guided in a predetermined direction. A zoom optical system 307 including an optical panel and so forth of which a relative position as to the discharge tube 305 is changeably held can change the guide number and irradiation range (light-casting range) of the flash device 300 by changing the relative position between the discharge tube 305 and zoom optical system 307. The flash unit of the flash device 300 principally is configured including the discharge tube 305, reflection umbrella 306, and zoom optical system 307. The irradiation range of the flash unit is changed due to movement of the zoom optical system 307, and the irradiation direction of the flash unit is changed due to turning of the movable unit 300b.

An input unit 312 includes an operation unit such as a power switch, a mode setting switch for setting the operation mode of the flash device 300, setting buttons for setting various parameters, and so forth. The flash microcomputer 310 executes various processes in response to input to the input unit 312.

A display unit 313 including a liquid crystal device or light emission element displays the states of the flash device 300.

A zoom driving circuit 330 is configured including a zoom detection unit 330a configured to detect information relating to the relative position between the discharge tube 305 and zoom optical system 307 using an encoder or the like, and a zoom driving unit 330b including a motor for moving the zoom optical system 307.

The driving amount of the zoom optical system 307 is calculated by the flash microcomputer 310 which obtained focus distance information output from the lens microcomputer 201 via the camera microcomputer 101 based on the focus distance information.

A bounce circuit 340 is configured including bounce position detection circuits 340a and 340c configured to detect the driving amount of the movable unit 300b (the turning angle of the movable unit 300b as to the main body unit 300a) and bounce driving circuits 340b and 340d causing the movable unit 300b to turn.

The bounce position detection circuit (horizontal bounce detection circuit) 340a detects the driving amount in the horizontal direction of the movable unit 300b, and the bounce position detection circuit (vertical bounce detection circuit) 340c detects the driving amount in the vertical direction of the movable unit 300b, using a rotary encoder or absolute encoder.

The bounce driving circuit (horizontal bounce driving circuit) 340b performs driving in the horizontal direction of the movable unit 300b, and the bounce driving circuit (vertical bounce driving circuit) 340d performs driving in the vertical direction of the movable unit 300b, using a known motor.

Figure 15A:
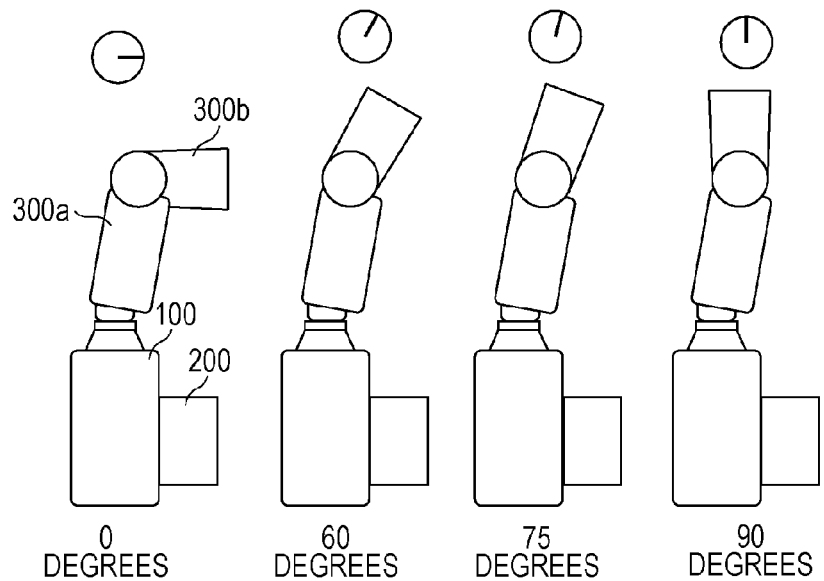
FIGS. 15A and 15B are diagrams illustrating turning ranges in the vertical and horizontal directions of a movable unit.
Figure 15B:
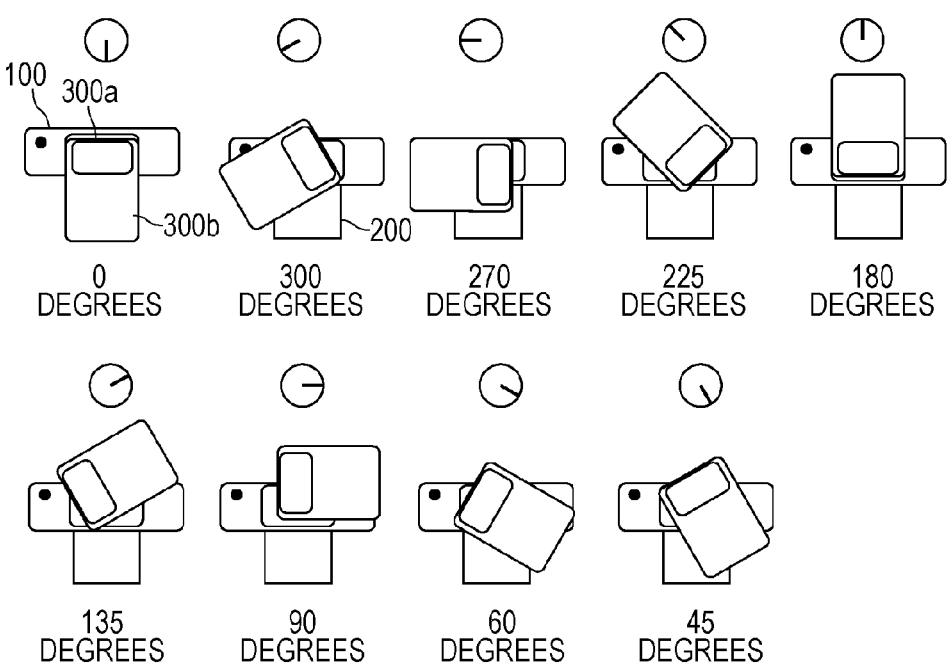

Now, description will be made regarding an example of the turning range and detection method of the movable unit 300b of the flash device 300, with reference to FIGS. 15A to 15C, 16A, 16B, 17A, and 17B. FIGS. 15A to 15C are diagrams illustrating turning of the movable unit 300b in the vertical and horizontal directions, FIGS. 16A and 16B are diagrams illustrating outputs of rotary encoders in the vertical and horizontal directions, and FIGS. 17A and 17B are diagrams illustrating allocations between gray code of a rotary encoder and turning angles.

As illustrated in FIG. 15A, the movable unit 300b is held in the vertical direction as to the main body unit 300a in a turnable manner, and as illustrated in FIG. 15B, the movable unit 300b is held in the horizontal direction as to the main body unit 300a in a turnable manner. Now, assuming that the position in the vertical direction of the movable unit 300b is in the state of 0 degrees in FIG. 15A, and the position in the horizontal direction of the movable unit 300b is in the state of 0 degrees in FIG. 15B are reference positions of the movable unit 300b. Indicators illustrated by a circle and a line in the states in FIG. 5 correspond to the positions of the rotary encoders illustrated in FIGS. 16A and 16B.

Figure 16A:
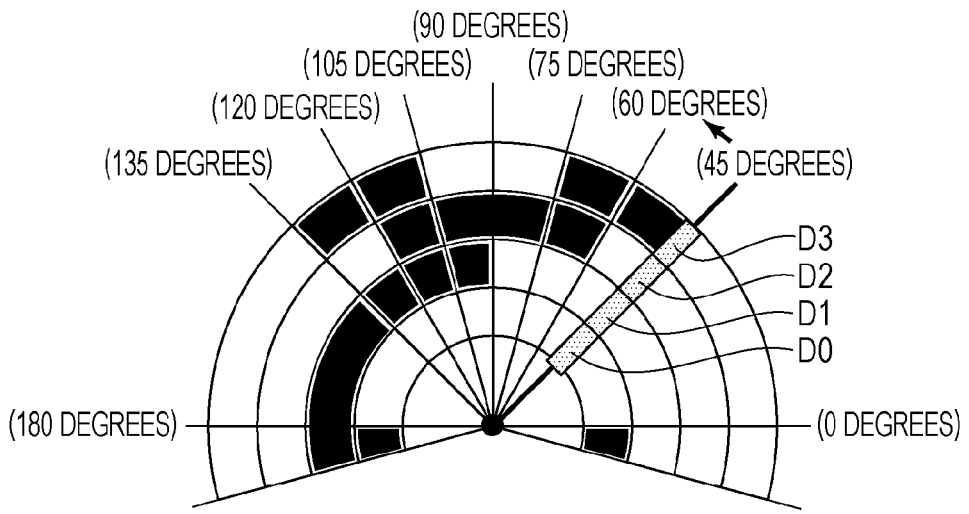
FIGS. 16A and 16B are diagrams illustrating detection results of a rotary encoder in the vertical and horizontal directions.
Figure 16B:
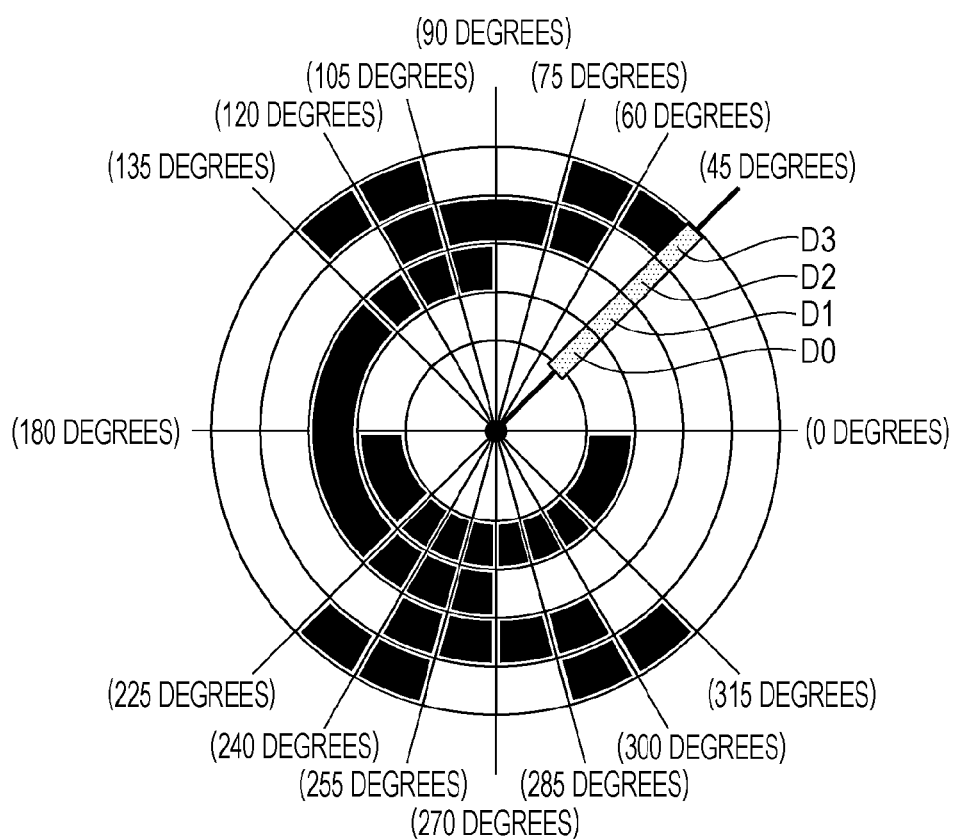

FIG. 16A illustrates a configuration in which the turning angle in the vertical direction is detected by a rotary encoder using 4-bit gray codes, and FIG. 16B illustrates a configuration in which the turning angle in the horizontal direction is detected by a rotary encoder using 4-bit gray codes.

The detection portions of the rotary encoder configured to detect turning in the vertical direction and the rotary encoder configured to detect turning in the horizontal direction have a known configuration using a photo-reflector, photointerrupter, and so forth. The rotary encoders output 0 as a white portion illustrated in FIGS. 17A and 17B, and output 1 as a black portion in the present embodiment. Also, turning operation is determined at the leading edge of a bit change, and pattern data is read at the time of stopping.

As indicated in FIGS. 17A and 17B, the rotary encoders output different signals depending on the turning angle of the movable unit 300b, whereby the bounce position detection circuits 340a and 340c can detect the driving amount of the movable unit 300b.

A orientation detection circuit 360 is a circuit configured to detect orientation difference, in which reference numeral 360a denotes a horizontal orientation detection unit configured to detect orientation difference in the horizontal direction, reference numeral 360b denotes a vertical orientation detection unit configured to detect orientation difference in the vertical direction, and reference numeral 360c denotes a front-back orientation detection unit configured to detect orientation difference in the front-back direction (Z direction). An angular velocity sensor or gyroscope sensor is employed as the orientation detection circuit 360, for example.

Figure 3:
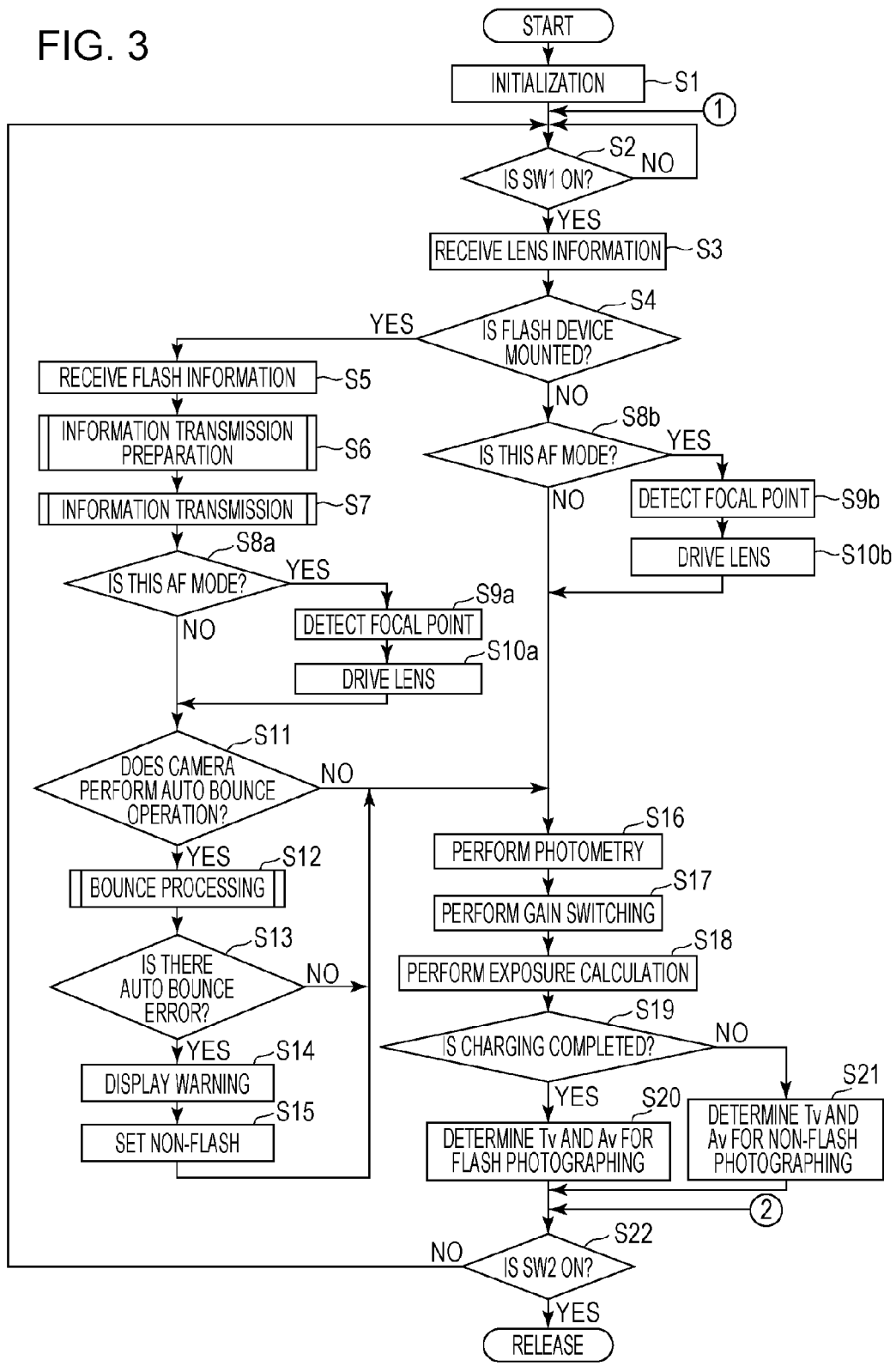
FIG. 3 is a diagram illustrating a flowchart of various processes of a camera main body according to auto bounce flash photographing in a first embodiment.

Next, description will be made regarding various processes performed at the camera main body 100 relating to auto bounce flash photographing, with reference to FIGS. 3 and 4. Upon the power switch included in the input unit 112 being turned on to activate the camera microcomputer 101 of the camera main body 100, the camera microcomputer 101 starts the flowchart illustrated in FIG. 3.

In step S1, the camera microcomputer 101 initializes its own memory and ports. Also, the camera microcomputer 101 reads the states of the switches included in the input unit 112 and predetermined input information, and performs setting of various photographing modes, such as how to decide shutter speed, how to decide aperture, and so forth. In step S2, the camera microcomputer 101 determines whether or not the release switch included in the input unit 112 has been operated and the SW1 is on. If the SW1 is on, the flow proceeds to step S3, and if the SW1 is off, repeats step S2.

In step S3, the camera microcomputer 101 performs communication with the lens microcomputer 201 within the lens unit 200 via the communication line SC. Next, the camera microcomputer 101 acquires focus distance information of the lens unit 200 and optical information used for focus adjustment and photometry. In step S4, the camera microcomputer 101 determines whether or not the flash device 300 is mounted on the camera main body 100. If the flash device 300 is mounted on the camera main body 100, the camera microcomputer 101 proceeds to step S5, and if not mounted on the camera main body 100, proceeds to S8b.

In step S5, the camera microcomputer 101 performs communication with the flash microcomputer 310 within the flash device 300 via the communication line SC to acquire flash information, such as a flash ID, charging information indicating the charging state of the main capacitor 302d, and so forth, from the flash microcomputer 310. Also, the camera microcomputer 101 performs communication with the flash microcomputer 310 via the communication line SC to transmit the focus distance information acquired in step S3 to the flash microcomputer 310. Thus, the flash microcomputer 310 calculates the driving amount of the zoom optical system 307 based on the received focus distance information, and moves the zoom optical system 307 based on the calculated driving amount to change the irradiation range of the flash device 300 to a range in accordance with the focus distance.

In step S6, the camera microcomputer 101 performs preparation for transmitting information relating to the flash device 300 input via the input unit 112 to the flash microcomputer 310 of the flash device 300. Here, the camera microcomputer 101 determines the information relating to the flash device 300 input via the input unit 112 to convert this information into the corresponding command transmission. Note that details in step S6 will be described later with reference to FIG. 5.

In step S7, the camera microcomputer 101 transmits the information relating to the flash device 300 prepared for transmission in step S6 to the flash device 300. Note that details in step S7 will be described later with reference to FIG. 6.

In step S8a, the camera microcomputer 101 determines whether or not the set focus adjustment mode is an automatic focus adjustment (AF) mode. If in the automatic focus adjustment mode, the camera microcomputer 101 proceeds to step S9a, and if in a manual focus adjustment (MF) mode, proceeds to step S11. Note that steps for performing the same processing in the flowchart in FIG. 3 are denoted with the same reference numerals, such as steps S8a and S8b, for example. In step S9a, the camera microcomputer 101 moves the focus detection circuit 107 to perform focus detection operation according to a known phase difference detection method. Also, in step S9a, the camera microcomputer 101 decides a range-finding point for focusing from multiple range-finding points in focus adjustment, according to a known automatic selection algorism based on the near-point preference concept, or user operations to the input unit 112, or the like. In step S10a, the camera microcomputer 101 stores the range-finding point decided in step S9a in the RAM within the camera microcomputer 101. Further, in step S10a, the camera microcomputer 101 calculates the driving amount of the lens group 202 based on the focus information from the focus detection circuit 107. Next, the camera microcomputer 101 performs communication with the lens microcomputer 201 within the lens unit 200 via the communication line SC to move the lens group 202 based on the calculated driving amount.

In step S11, the camera microcomputer 101 determines whether to perform operation for automatically deciding the irradiation direction at the time of bounce flash photographing (hereinafter, referred to as auto bounce operation). Whether to perform auto bounce operation is determined based on the state of an auto bounce switch which switches whether to execute auto bounce operation included in the input unit 112 or input unit 312, or the state of another camera main body 100, or the like. In a case of executing auto bounce operation, the camera microcomputer 101 proceeds to step S12, and in a case of not executing auto bounce operation, proceeds to step S16.

In step S12, the camera microcomputer 101 executes processing relating to auto bounce operation (hereinafter, referred to as bounce processing). Details of the bounce processing will be described later with reference to FIG. 7. After execution of the bounce processing, the camera microcomputer 101 proceeds to step S13. In step S13, the camera microcomputer 101 determines whether or not an error has occurred in the auto bounce processing. If an error has occurred in the bounce processing, the camera microcomputer 101 proceeds to step S14, and if no error has occurred in the bounce processing, proceeds to step S16. In a case where an error has occurred in the bounce processing, information indicating that an error has occurred in the bounce processing in step S12 is transmitted from the flash microcomputer 310.

In step S14, the camera microcomputer 101 displays information indicating that an error has occurred in the bounce processing, on the display unit 113. Note that the camera microcomputer 101 may perform communication with the flash microcomputer 310 to cause the flash microcomputer 310 to display information indicating that an error has occurred in the bounce processing, on the display unit 313 of the flash device 300.

In step S15, the camera microcomputer 101 switches to setting not to perform flash photographing (non-flash setting) and proceeds to step S16.

In a case where determination is made in step S4 that the flash device 300 is not mounted, the camera microcomputer 101 proceeds to step S8b to determine whether or not the focus adjustment mode, set in the same way as in step S8a, is the AF mode. In a case of the AF mode, the camera microcomputer 101 proceeds to step S9b, and in a case of the MF mode, proceeds to step S16.

In step S9b, the camera microcomputer 101 executes the same processing as the processing in step S9a, proceeds to step S10b to execute the same processing as the processing in step S10a, and proceeds to step S16.

In step S16, the photometry circuit 106 performs photometry, and the camera microcomputer 101 acquires the photometry results from the photometry circuit 106. For example, in a case where the photometry sensor of the photometry circuit 106 performs photometry on each of the six divided regions, the camera microcomputer 101 stores, in the RAM, the luminance value of each region serving as the acquired photometry result as EVb(i) (i=0 to 5).

In step S17, the gain switching circuit 108 performs gain switching according to gain setting input from the input unit 112. The gain setting is ISO sensitivity setting, for example. Also, in step S17, the camera microcomputer 101 performs communication with the flash microcomputer 310 via the communication line SC to transmit gain setting information indicating the gain after switching to the flash microcomputer 310.

In S18, the camera microcomputer 101 performs exposure calculation using a known algorism based on the photometry results (the luminance value of each region stored in the RAM) acquired in step S16 to decide an exposure value (EVs).

In step S19, the camera microcomputer 101 determines whether or not a charging completion signal has been received from the flash microcomputer 310. In a case of having received the charging completion signal, the camera microcomputer 101 proceeds to step S20, and in a case of having received no charging completion signal, proceeds to step S21.

In step S20, the camera microcomputer 101 decides exposure control values (shutter speed (Tv) and Aperture value (Av)) adapted to flash photographing based on the exposure value calculated in step S18.

On the other hand, in step S21, the camera microcomputer 101 decides exposure control values adapted to photographing for preventing the flash device 300 from emitting light (non-flash photographing) based on the exposure value calculated in step S18.

After deciding the exposure control values in step S20 or step S21, the camera microcomputer 101 proceeds to step S22, and in step S22 determines whether or not the release switch included in the input unit 112 has been operated, and the SW2 is on. If the SW2 is on, the camera microcomputer 101 proceeds to step S23 in FIG. 4, and if the SW2 is off, returns to step S2.

The processing in step S23 and thereafter is processing relating to flash photographing, and processing relating to non-flash photographing is of the processing in step S23 and thereafter from which processing for performing the main flash is omitted.

In step S23, the photometry circuit 106 performs photometry in a state in which the flash device 300 emits no light, and the camera microcomputer 101 acquires a photometry result at the time of non-flash (non-flash luminance value) from the photometry circuit 106. At this time, the camera microcomputer 101 stores the luminance value of each region at the time of non-flash serving as the acquired photometry result in the RAM as EVa(i) (i=0 to 5).

In step S24, the camera microcomputer 101 commands the flash microcomputer 310 to perform pre-flash via the communication line SC. The flash microcomputer 310 controls the trigger circuit 303 and flash control circuit 304 to perform pre-flash at a predetermined amount of light emission in accordance with this command.

In step S25, the photometry circuit 106 performs photometry in the state in which the flash device 300 is performing the pre-flash, and the camera microcomputer 101 acquires a photometry result (luminance value at the time of pre-flash) at the time of pre-flash from the photometry circuit 106. At this time, the camera microcomputer 101 stores the luminance value of each region at the time of pre-flash serving as the acquired photometry result in the RAM as EVf(i) (i=0 to 5).

In step S26, the camera microcomputer 101 raises the main mirror prior 104 to exposure, to retract the main mirror 104 from the photographing optical path.

In step S27, the camera microcomputer 101 extracts the luminance value EVdf(i) of a pre-flash reflected light component alone, based on the luminance value at the time of non-flash and the luminance value at the time of pre-flash, as follows. The extraction is performed every six regions.

$$EVdf(i) \leftarrow LN2(2^{EVf(i)} - 2^{EVa(i)}) (i=0 \text{ to } 5)$$

In step S28, the camera microcomputer 101 acquires pre-flash information (Qpre) indicating the amount of light emission at the time of pre-flash from the flash microcomputer 310 via the communication line SC.

In step S29, the camera microcomputer 101 selects whether to set the amount of light emission suitable for the object of which region of the six regions based on the range-finding points, focus distance information, pre-flash information (Qpre) and bounce communication contents, and calculates the amount of main flash.

In the calculation of the amount of main flash, a relative ratio (r) is obtained regarding the amount of main flash suitable for the amount of pre-flash as to the object of the selected region (P) based on the exposure value (EVs), object brightness (EVb), and the luminance value EVdf(P) of the pre-flash reflected light component alone.

$$r \leftarrow LN2(2^{EVs} - 2^{EVb(i)}) - Evdf(p)$$

Here, the reason why difference is obtained by subtracting expanded object brightness (EVb) from the exposure value (EVs) is to perform control so that exposure at the time of irradiation of the flash light will be suitable, by adding the flash light to external light.

Also, a situation may occur where there is a highly reflective object (such as a golden folding screen or the like) within the photographing screen, causing the reflected light component of the pre-flash to increase, and the amount of main flash being calculated too small. To prevent such a situation from occurring, there has been known processing in which when, detecting a highly reflective object within the photographing screen, correction is performed to increase the calculated amount of main flash. However, in a case of performing bounce flash photographing, detection of a highly reflective object is not performed, so this correction is not performed. This is because even if there is a highly reflective object within the photographing screen at the time of bounce flash photographing, the highly reflective object is not directly irradiated with flash light, so influence of the highly reflective object on the reflected light component of the pre-flash is small.

In addition, the amount of main flash is not corrected according to the in-screen position of an object existing within the photographing screen at the time of bounce flash photographing, and so forth. As described above, correction is not performed of the amount of main flash according to the reflection ratio of an object existing within the photographing screen, or the in-screen position of the object at the time of bounce flash photographing, which is normally performed at the time of flash photographing, so the amount of main flash suitable for bounce flash photographing can be calculated. The term "normal flash photographing" as used here means flash photographing that is performed by the movable unit 300b being positioned in the reference position illustrated in FIG. 15.

In step S30, the camera microcomputer 101 corrects the relative ratio (r) using the shutter speed (Tv) when performing flash photographing and the flash time of pre-flash (t_pre), and a correction coefficient (c) set beforehand by the input unit 112, and calculates a new relative ratio r, as in the following Expression.

$$r \leftarrow r + Tv - t\_pre + c$$

Here, the reason why correction is performed using the shutter speed (Tv) and the flash time of pre-flash (t_pre) is to correctly compare the photometry integral value at the time of pre-flash (INTp) and the photometry integral value at the time of main flash (INTm).

In step S31, the camera microcomputer 101 transmits information relating to the relative ratio (r) for deciding the amount of main flash to the flash microcomputer 310 via the communication line SC.

In step S32, the camera microcomputer 101 instructs the lens microcomputer 201 to obtain the aperture value (Av) decided in step S20, and also controls the shutter 103 to obtain the decided shutter speed (Tv).

In step S33, the camera microcomputer 101 commands the flash microcomputer 310 to perform main flash via the communication line SC. Next, the flash microcomputer 310 performs main flash based on the relative ratio (r) transmitted from the camera.

Upon a series of exposure operations being thus completed, in step S34 the camera microcomputer 101 lowers the main mirror 104 retracted from the photographing optical path to obliquely dispose the main mirror 104 in the photographing optical path again.

In step S35, the camera microcomputer 101 amplifies the signal output from the imaging device 102 with the gain set at the gain switching circuit 108, following which converts the signal into a digital signal at the A/D converter 109. Next, the signal processing circuit 111 subjects the image data converted into the digital signal to predetermined signal processing, such as white balance or the like.

In step S36, the camera microcomputer 101 records the image data subjected to the signal processing in the memory which is not illustrated, and ends the series of processing relating to photographing. Next, in step S37 the camera microcomputer 101 determines whether or not the SW1 is on. If the SW1 is on, the flow returns to step S22, and if the SW1 is off, returns to step S2.

Figure 5:
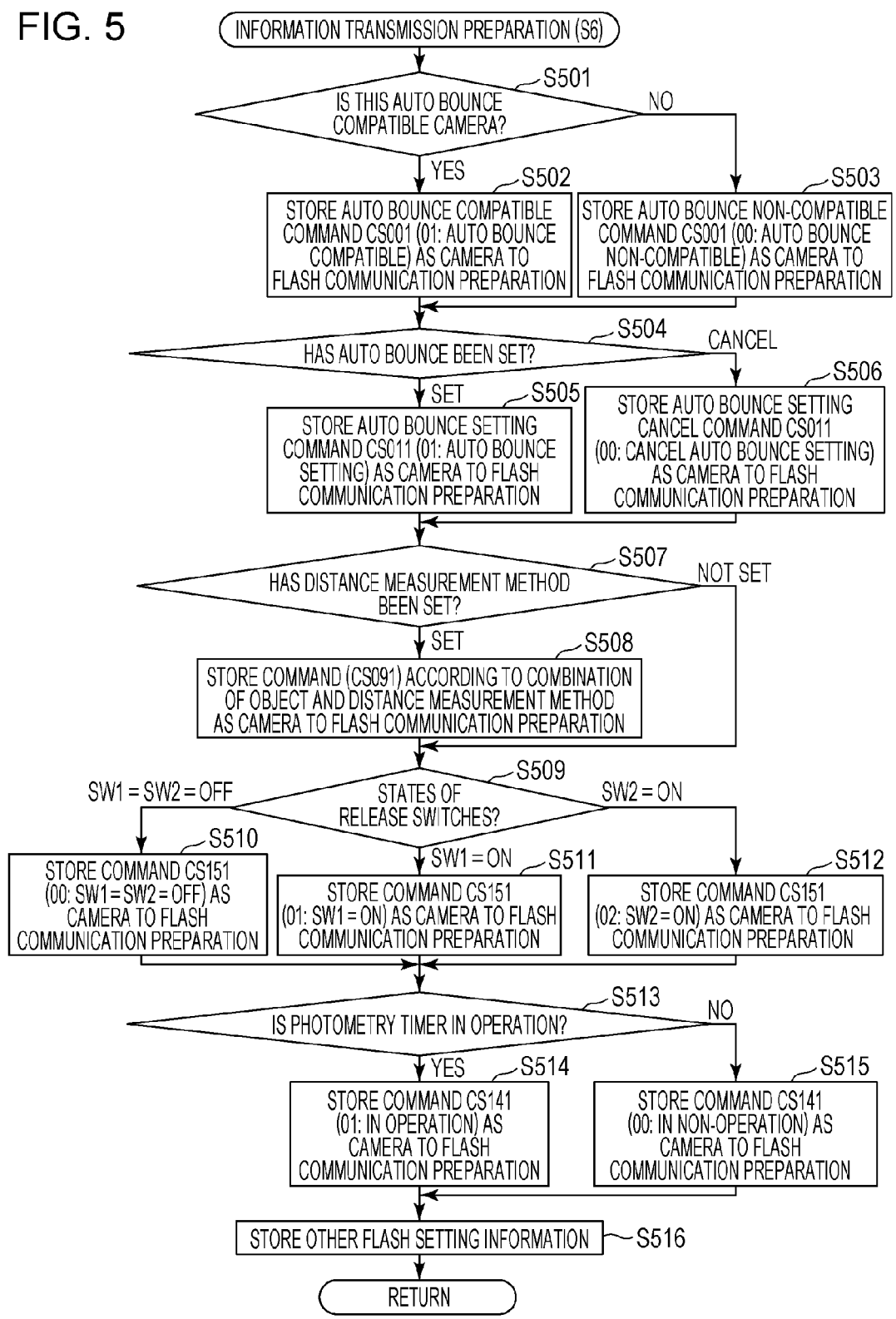
FIG. 5 is a diagram illustrating a flowchart of information transmission preparation processing of the camera main body.

Next, details of step S6 will be described with reference to FIG. 5. FIG. 5 is a diagram illustrating a flowchart of information transmission preparation processing of the camera main body 100. In step S6, the camera microcomputer 101 performs processing in accordance with the flowchart illustrated in FIG. 5. Details of the setting commands at this time are described in FIGS. 19A and 19B.

In step S501, the camera microcomputer 101 determines whether or not its own camera is a camera capable of executing auto bounce operation (compatible camera). If the camera is a compatible camera, the flow proceeds to step S502, and if not a compatible camera, proceeds to step S503.

In step S502, the camera microcomputer 101 stores "CS001 command (data 01)" in the built-in memory (not illustrated) of the camera microcomputer 101, as preparation for communication between the camera and the flash device (C to S), and proceeds to step S504. On the other hand, in step S503 the camera microcomputer 101 stores "CS001 command (data 00)" in the built-in memory (not illustrated) of the camera microcomputer 101 as preparation for communication between the camera and the flash device (C to S), and proceeds to step S504.

In step S504, the camera microcomputer 101 determines whether or not setting to execute auto bounce operation has been performed or cancelled. If the setting has been performed, the flow proceeds to step S505, and if the setting has been cancelled, proceeds to step S506.

In step S505, the camera microcomputer 101 stores "CS011 command (data 01)" in the built-in memory (not illustrated) of the camera microcomputer 101 as preparation for communication between the camera and the flash device (C to S), and proceeds to step S507. On the other hand, in step S506 the camera microcomputer 101 stores "CS011 command (data 00)" in the built-in memory (not illustrated) of the camera microcomputer 101 as preparation for communication between the camera and the flash device (C to S), and proceeds to step S507.

In step S507, the camera microcomputer 101 decides a method for obtaining distance to an object (distance measurement method) which is information for the camera main body 100 deciding an irradiation direction most suitable for bounce flash photographing. The object here is an object serving as a photographing target, and a reflection object (such as ceiling, wall, or the like) which reflects flash light at the time of bounce flash photographing. Examples of the distance measurement method include "pre-flash method" for performing pre-flash to measure distance to the object using the amount of reflected light of the object, "flash ranging method" for measuring distance to the object using the ranging unit 308 within the flash device 300, and "camera ranging method" for measuring distance to the object using a focus adjustment result between the camera main body 100 and lens unit 200. The distance measurement method is not particularly restricted.

In a case where the ranging method has been set, the camera microcomputer 101 proceeds to step S508, and in a case where the ranging method has not been set, proceeds to step S509.

In step S508, the camera microcomputer 101 stores "CS091 command" in the built-in memory (not illustrated) of the camera microcomputer 101 in accordance with the setting contents of the ranging method as preparation for communication between the camera and the flash device (C to S), and proceeds to step S509.

As an example, determination between "object" and "ceiling" is allocated to the upper four bits as 0 and 1 in order, determination between "pre-flash", "flash ranging" and "camera ranging" is allocated to the lower four bits as 0, 1, and 2 in order, which are represented by a combination. In a case where both of the object and ceiling are set to "pre-flash", the camera microcomputer 101 stores "CS091 command (data 00 10)" in the built-in memory (not illustrated) of the camera microcomputer 101. Similarly, in a case where both of the object and ceiling are set to "flash ranging", the camera microcomputer 101 stores "CS091 command (data 01 11)", and in a case where the object is set to "camera ranging", and the ceiling is set to "pre-flash", stores "CS091 command (data 02 10)" in the built-in memory (not illustrated) of the camera microcomputer 101.

In step S509, the camera microcomputer 101 determines the states of the release switches. If both of the SW1 and SW2 are off, the flow proceeds to step S510, if the SW1 is on, proceeds to step S511, and if the SW2 is on, proceeds to step S512.

In step S510, the camera microcomputer 101 stores "CS151 command (data 00)" in the built-in memory (not illustrated) of the camera microcomputer 101, and proceeds to step S513. In step S511, the camera microcomputer 101 stores "CS151 command (data 01)" in the built-in memory (not illustrated) of the camera microcomputer 101, and proceeds to step S513. In step S512, the camera microcomputer 101 stores "CS151 command (data 02)" in the built-in memory (not illustrated) of the camera microcomputer 101, and proceeds to step S513.

In step S513, the camera microcomputer 101 determines whether or not the photometry timer is in operation. The photometry timer is a timer configured to determine a period to perform photometry for switching to a power saving mode after performing photometry for a certain period of time, and is in operation while performing photometry for a certain period of time. The photometry timer is included in the camera microcomputer 101, and starts time counting in sync with the SW1 being turned on, for example. If the photometry timer is in operation, the camera microcomputer 101 proceeds to step S514, and if the photometry timer is not in operation, proceeds to step S515.

In step S514, the camera microcomputer 101 stores "CS141 command (data 01)" in the built-in memory (not illustrated) of the camera microcomputer 101 as preparation for communication between the camera and flash device (C to S), and proceeds to step S516. On the other hand, in step S515, the camera microcomputer 101 stores "CS141 command (data 00)" in the built-in memory (not illustrated) of the camera microcomputer 101 as preparation for communication between the camera and flash device (C to S), and proceeds to step S516. In step S516, the camera microcomputer 101 stores other flash setting information in the built-in memory of the camera microcomputer 101, and proceeds to step S7.

Figure 6:
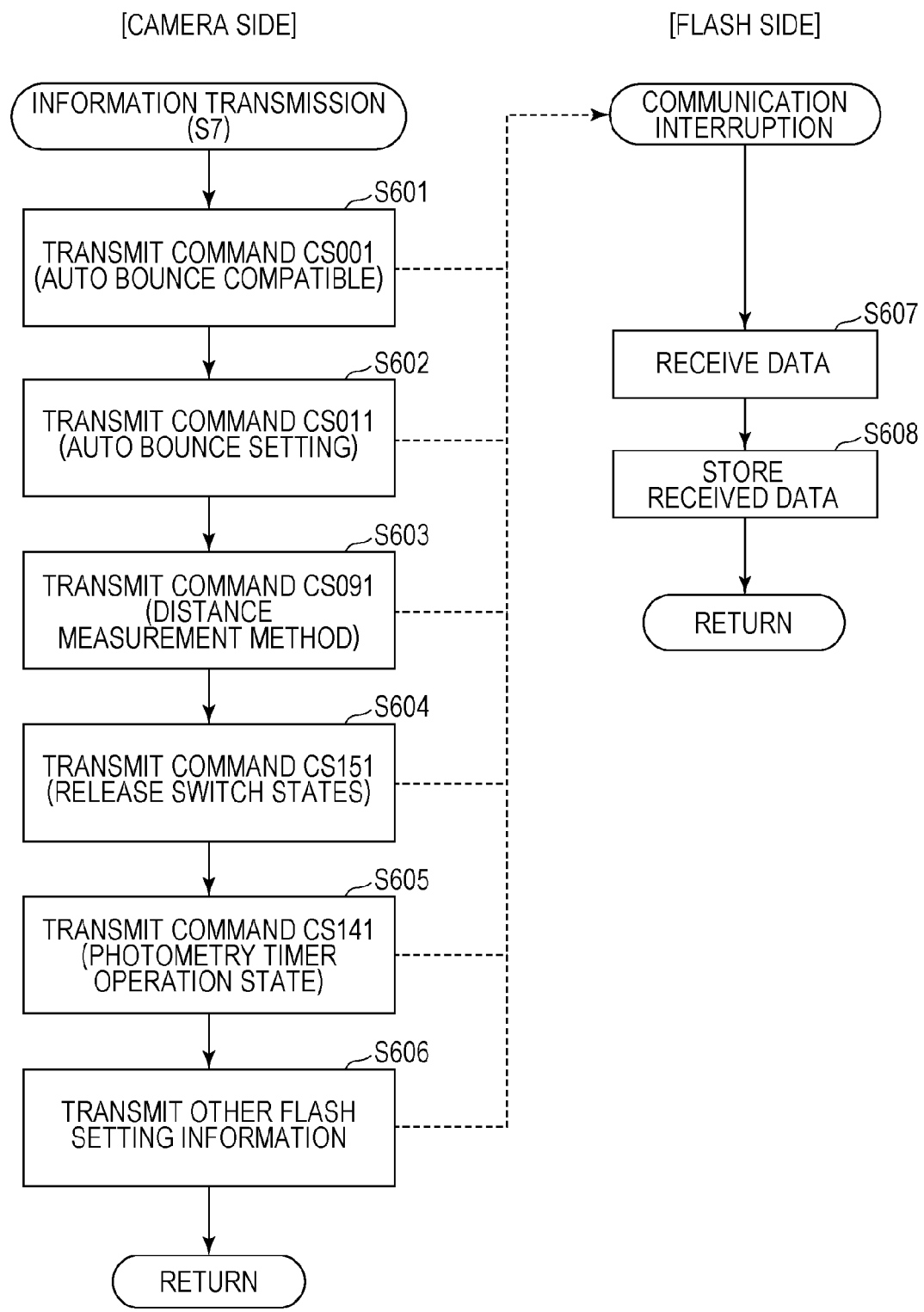
FIG. 6 is a diagram illustrating a flowchart of information transmission processing performed at the camera main body.

Next, details of step S7 will be described with reference to FIG. 6. FIG. 6 is a diagram illustrating a flowchart of the information transmission processing of the camera main body 100. In step S7, the camera microcomputer 101 performs the processing in accordance with the flowchart illustrated in FIG. 6. Details of the setting commands at this time are described in FIGS. 19A and 19B. Note that serial communication between the camera and the flash device in FIGS. 18A and 18B is employed in the processes in the flowchart in FIG. 7. Also, in FIG. 7, the processes performed at the camera main body 100 are illustrated in steps S601 to S606, and the corresponding processes of the flash device 300 are illustrated in steps S607 and S608.

First, the processes performed at the camera main body 100 will be described. In S601, the camera microcomputer 101 transmits the data according to the determination result in step S501 to the flash microcomputer 310, and proceeds to step S602. In S602, the camera microcomputer 101 transmits the data according to the determination result in step S504 to the flash microcomputer 310, and proceeds to step S603. In S603, the camera microcomputer 101 transmits the data according to the determination result in step S507 to the flash microcomputer 310, and proceeds to step S604.

In step S604, the camera microcomputer 101 transmits the data according to the determination result in step S509 to the flash microcomputer 310, and proceeds to step S605. In step S605, the camera microcomputer 101 transmits the data according to the determination result in step S513 to the flash microcomputer 310, and proceeds to step S606. In step S606, the camera microcomputer 101 transmits the data stored in step S516 to the flash microcomputer 310, and proceeds to step S8.

Next, the processes of the flash device 300 will be described. In step S607, upon receiving a communication interruption, the flash microcomputer 310 receives the data transmitted from the camera microcomputer 101, and proceeds to step S608. In step S608, the flash microcomputer 310 stores the received data in the built-in memory of the flash microcomputer 310 and ends the processes.

Figure 7:
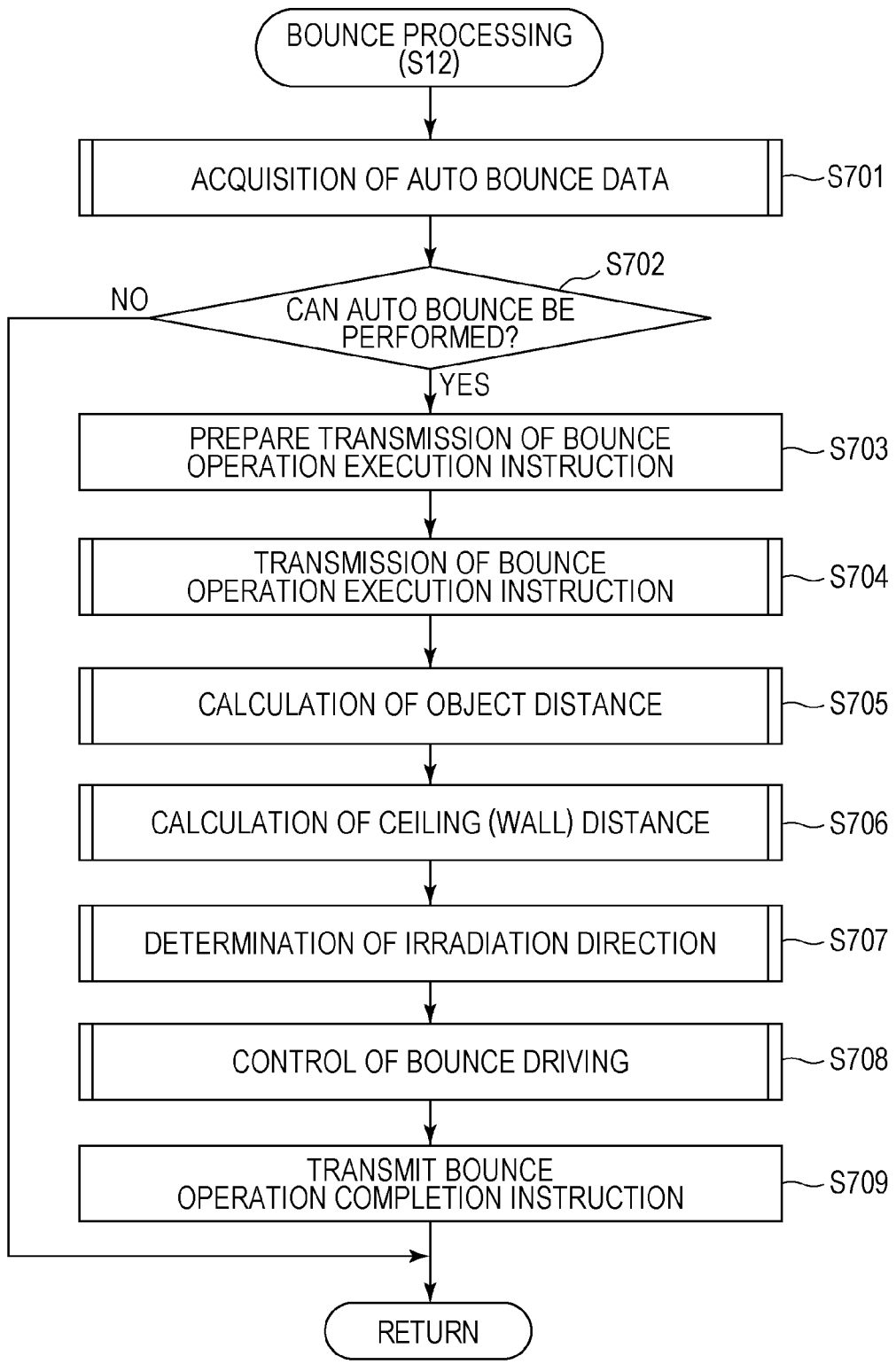
FIG. 7 is a diagram illustrating a flowchart of bounce processing.

Next, details of step S12 will be described with reference to FIG. 7. FIG. 7 is a diagram illustrating a flowchart of bounce processing, which includes the processes of the camera microcomputer 101 and flash device 310.

In step S701, the camera microcomputer 101 receives auto bounce data from the flash microcomputer 310 and proceeds to step S702. Details of step S701 will be described later with reference to FIG. 8.

In step S702, the camera microcomputer 101 determines whether or not an auto bounce operation can be performed. Here, whether or not an auto bounce operation can be performed is determined based on whether or not the auto bounce operation of the flash device 300 can be performed, based on the auto bounce data set and received in the auto bounce operation of the camera main body 100. In a case where auto bounce operation can be performed, the camera microcomputer 101 proceeds to step S703, and in a case where auto bounce operation cannot be performed, skips the bounce processing and proceeds to step S13.

In step S703, the camera microcomputer 101 performs preparation for transmitting a bounce operation execution instruction, and in step S704 transmits the bounce operation execution instruction. Details of step S704 will be described later.

In step S705, the camera microcomputer 101 calculates object distance to decide the irradiation direction most suitable for bounce flash photographing. Details of step S705 will be described later. Similarly, in step S706 the camera microcomputer 101 calculates ceiling (wall) distance to decide the irradiation direction most suitable for bounce flash photographing. Details of step S706 will be described later. Note that which of the camera microcomputer 101 and flash microcomputer 310 is to calculate object distance and ceiling (wall) distance, is decided based on the set ranging method.

In step S707, the camera microcomputer 101 decides the irradiation direction most suitable for bounce flash photographing. Details of step S707 will be described later. In step S708, the camera microcomputer 101 performs bounce driving control so as obtain the optimal irradiation direction in step S708. Details of step S708 will be described later.

In step S709, the camera microcomputer 101 transmits a bounce operation completion instruction to the flash microcomputer 310, and proceeds to step S13.

Next, the processes in the bounce processing will be descried in detail.

First, the auto bounce data acquisition processing in step S701 will be described with reference to FIG. 8. In FIG. 8, the processes performed at the camera main body 100 are illustrated in steps S801 to S807, and the corresponding processes of the flash device 300 are illustrated in steps S808 to S824.

First, the processes performed at the camera main body 100 will be described. In step S801, the camera microcomputer 101 transmits a command to confirm whether or not auto bounce can be performed at the flash device 300, to the flash microcomputer 310. Next, in step S802 the camera microcomputer 101 receives a reply for confirmation regarding whether or not auto bounce can be performed, transmitted from the flash microcomputer 310.

Next, in step S803 the camera microcomputer 101 transmits a command to confirm a driving range for auto bounce to the flash microcomputer 310. Next, in step S804 the camera microcomputer 101 receives a reply for confirmation of the driving range for auto bounce transmitted from the flash microcomputer 310.

Next, in step S805 the camera microcomputer 101 transmits a command to confirm the ranging method for calculating object distance for auto bounce, to the flash microcomputer 310. Next, in step S806 the camera microcomputer 101 receives a reply for confirmation of the ranging method transmitted from the flash microcomputer 310.

Lastly, in step S807 the camera microcomputer 101 stores the data received in steps S802, S804, and S806 in the built-in memory of the camera microcomputer 101, and ends the processes.

Next, the processes of the flash device 300 will be described. In step S808, upon receiving a communication interruption, the flash microcomputer 310 receives the command transmitted from the camera microcomputer 101, and proceeds to step S809. In step S809, the flash microcomputer 310 determines the contents of the command. In a case of "auto bounce availability confirmation", the flow proceeds to step S810, in a case of "auto bounce driving range confirmation", proceeds to step S814, and in a case of "ranging method confirmation", proceeds to step S822.

In step S810, the flash microcomputer 310 determines whether or not auto bounce can be performed. If auto bounce can be performed, the flow proceeds to step S811, and if auto bounce cannot be performed, proceeds to step S812.

In step S811, the flash microcomputer 310 stores "SC000 command (data 01)" in the built-in memory of the flash microcomputer 310 in communication between the camera and flash device (S to C), and proceeds to step S813. On the other hand, in step S812 the flash microcomputer 310 stores "SC000 command (data 00)" in the built-in memory of the flash microcomputer 310 in communication between the camera and flash device (S to C), and proceeds to step S813.

In step S813, the flash microcomputer 310 transmits the data stored in step S811 or step S812 as the reply regarding auto bounce availability confirmation, and ends the processes.

In step S814, the flash microcomputer 310 determines whether or not both of the vertical direction and horizontal direction are available as the driving range of auto bounce. If both are available, the flash microcomputer 310 proceeds step S815, and if only one is available, proceeds to step S818 to determine whether or not the horizontal direction alone is available. If the horizontal direction alone is available, the flow proceeds to step S819, and if the vertical direction alone is available, proceeds to step S820.

In a case where both are available as the driving range, in step S815 the flash microcomputer 310 stores "SC020 command (data 00)" in the built-in memory of the flash microcomputer 310 in communication between the camera and flash device (S to C), and proceeds to step S816a.

In step S816a, the flash microcomputer 310 stores "SC030 command (data XX (start) XX (end))" in the built-in memory of the flash microcomputer 310 in communication between the camera and flash device (S to C) as the driving range in the horizontal direction, and proceeds to step S817a.

In step S817a, the flash microcomputer 310 stores "SC040 command (data XX (start) XX (end))" in the built-in memory of the flash microcomputer 310 in communication between the camera and flash device (S to C) as the driving range in the vertical direction, and proceeds to step S821.

On the other hand, in a case where the horizontal direction alone is available as the driving range, in step S819 the flash microcomputer 310 stores "SC020 command (data 01)" in the built-in memory of the flash microcomputer 310 in communication between the camera and flash device (S to C), and proceeds to step S816b.

In step S816b, the flash microcomputer 310 stores "SC030 command (data XX (start) XX (end))" in the built-in memory of the flash microcomputer 310 in communication between the camera and flash device (S to C) as the driving range in the horizontal direction, and proceeds to step S821.

Also, in a case where the vertical direction alone is available as the driving range, in step S820 the flash microcomputer 310 stores "SC020 command (data 02)" in the built-in memory of the flash microcomputer 310 in communication between the camera and flash device (S to C), and proceeds to step S817b.

In step S817b, the flash microcomputer 310 stores "SC040 command (data XX (start) XX (end))" in the built-in memory of the flash microcomputer 310 in communication between the camera and flash device (S to C) as the driving range in the vertical direction, and proceeds to step S821.

In step S821, the flash microcomputer 310 transmits the data stored in steps S815, S816a, S816b, S817a, S817b, S819, and S820 as a reply of the auto bounce driving range confirmation, and ends the processes.

In step S822, the flash microcomputer 310 determines a ranging method for calculating object distance for auto bounce.

If the ranging method has been set, the flash microcomputer 310 proceeds to step S823. In step S823, the flash microcomputer 310 stores "SC090 command (data XXXX)" according to the ranging method and object setting contents in the built-in memory of the flash microcomputer 310, and proceeds to step S824. In step S824, the flash microcomputer 310 transmits the data stored in step S823 as a reply of the ranging method, and ends the processes. If the ranging method has not been set, the flash microcomputer 310 transmits data indicating that not ranging method has been set in step S824.

As described above, the camera microcomputer 101 acquires auto bounce data.

Figure 9:
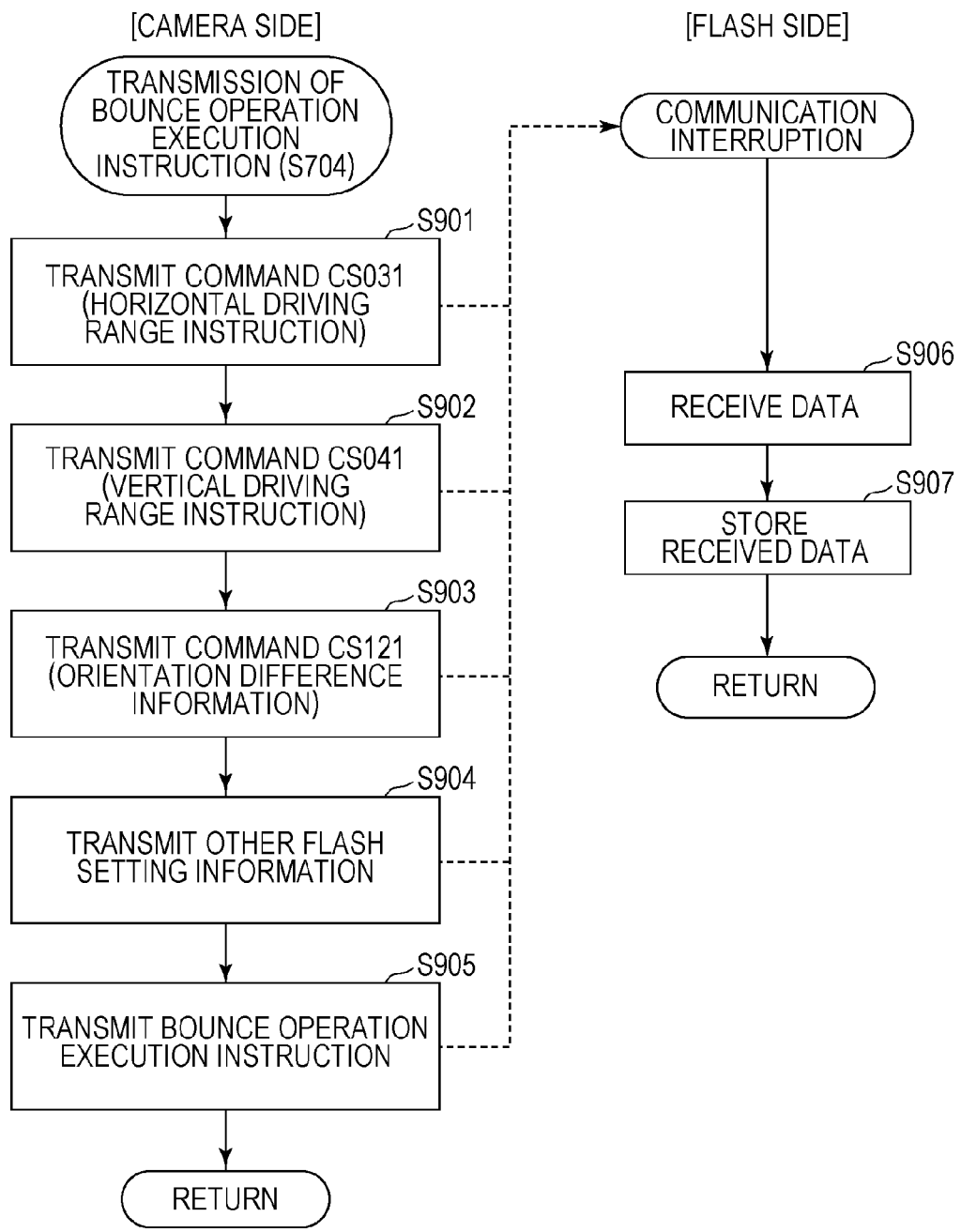
FIG. 9 is a diagram illustrating a flowchart of bounce operation execution instruction transmission processing.

Next, the bounce operation execution instruction transmission processing in step S704 in the bounce processing will be described with reference to FIG. 9. Details of the setting commands at this time are described in FIGS. 19A and 19B. In FIG. 9, the processes performed at the camera main body 100 are illustrated in steps S901 to S905, and the corresponding processes of the flash device 300 are illustrated in steps S906 and S907.

First, the processes performed at the camera main body 100 will be described. In S901, the camera microcomputer 101 transmits "CS031 command (data XXXX)" for setting the driving range in the horizontal direction at the time of bounce operation to the flash microcomputer 310, and proceeds to step S902. In a case of not setting the driving range in the horizontal direction, this step is omitted. In step S902, the camera microcomputer 101 transmits "CS041 command (data XX XX)" for setting the driving range in the vertical and horizontal directions at the time of bounce operation to the flash microcomputer 310, and proceeds to step S903. In a case of not setting the driving range in the vertical direction, the present step is omitted. In step S903, the camera microcomputer 101 transmits "CS121 command (data XX XX XX)" to the flash microcomputer 310 as orientation difference information indicating detection results of the vertical orientation detection unit 140a, horizontal orientation detection unit 140b, and front-back orientation detection unit 140c. In step S904, the camera microcomputer 101 transmits other flash setting information to the flash microcomputer 310, and proceeds to step S905. In step S905, the camera microcomputer 101 transmits a bounce operation execution instruction to the flash microcomputer 310, and proceeds to step S705.

Next, the processes of the flash device 300 will be described. In step S906, upon receiving a communication interruption, the flash microcomputer 310 receives the data transmitted from the camera microcomputer 101, and proceeds to step S907. In step S907, the flash microcomputer 310 stores the received data in the built-in memory of the flash microcomputer 310, and starts bounce operation.

As described above, the camera microcomputer 101 transmits the bounce operation execution instruction to the flash microcomputer 310.

Figure 10A:
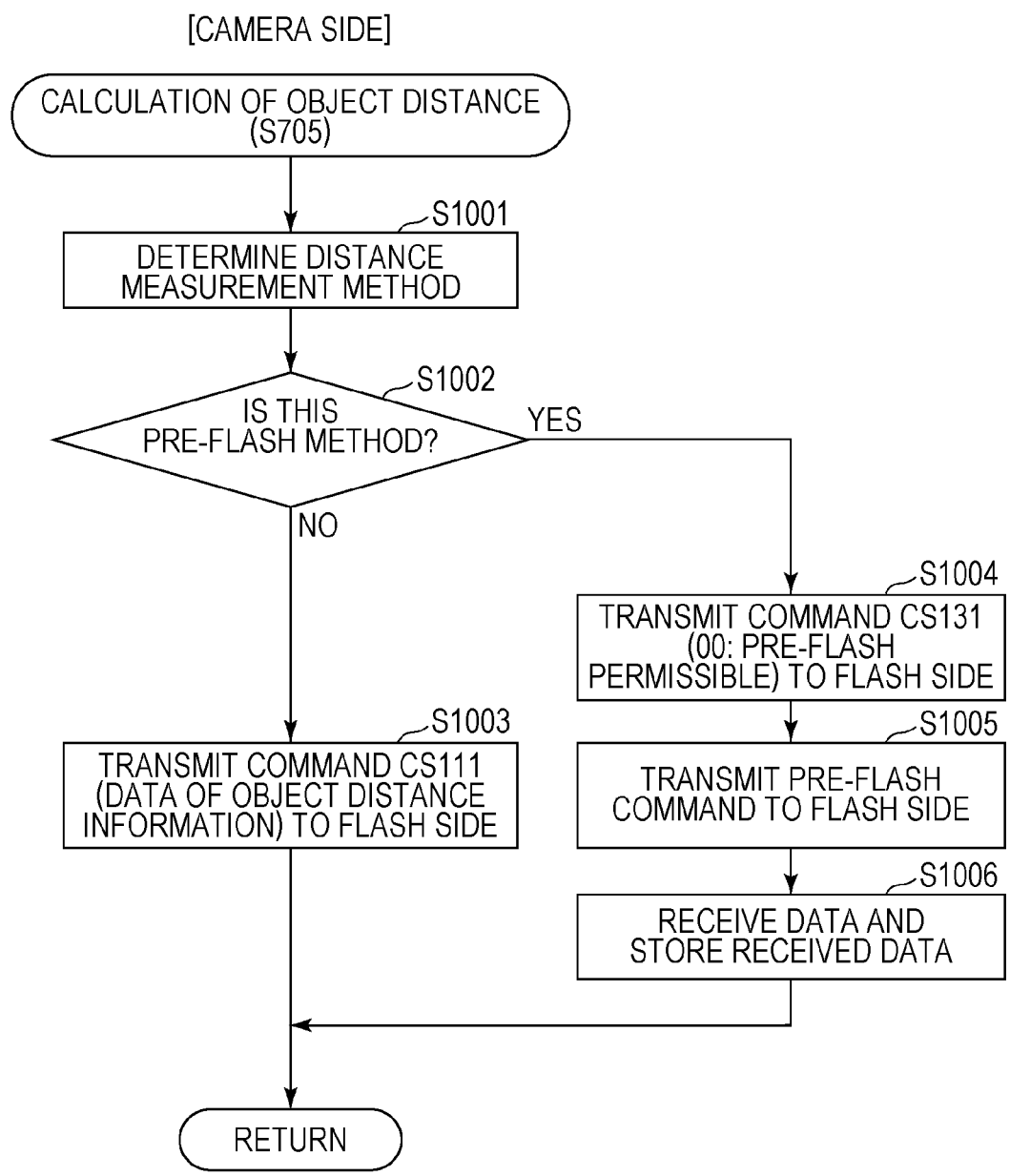
FIG. 10A and FIG. 10B are a diagram illustrating a flowchart of object distance calculation processing.
Figure 10B:
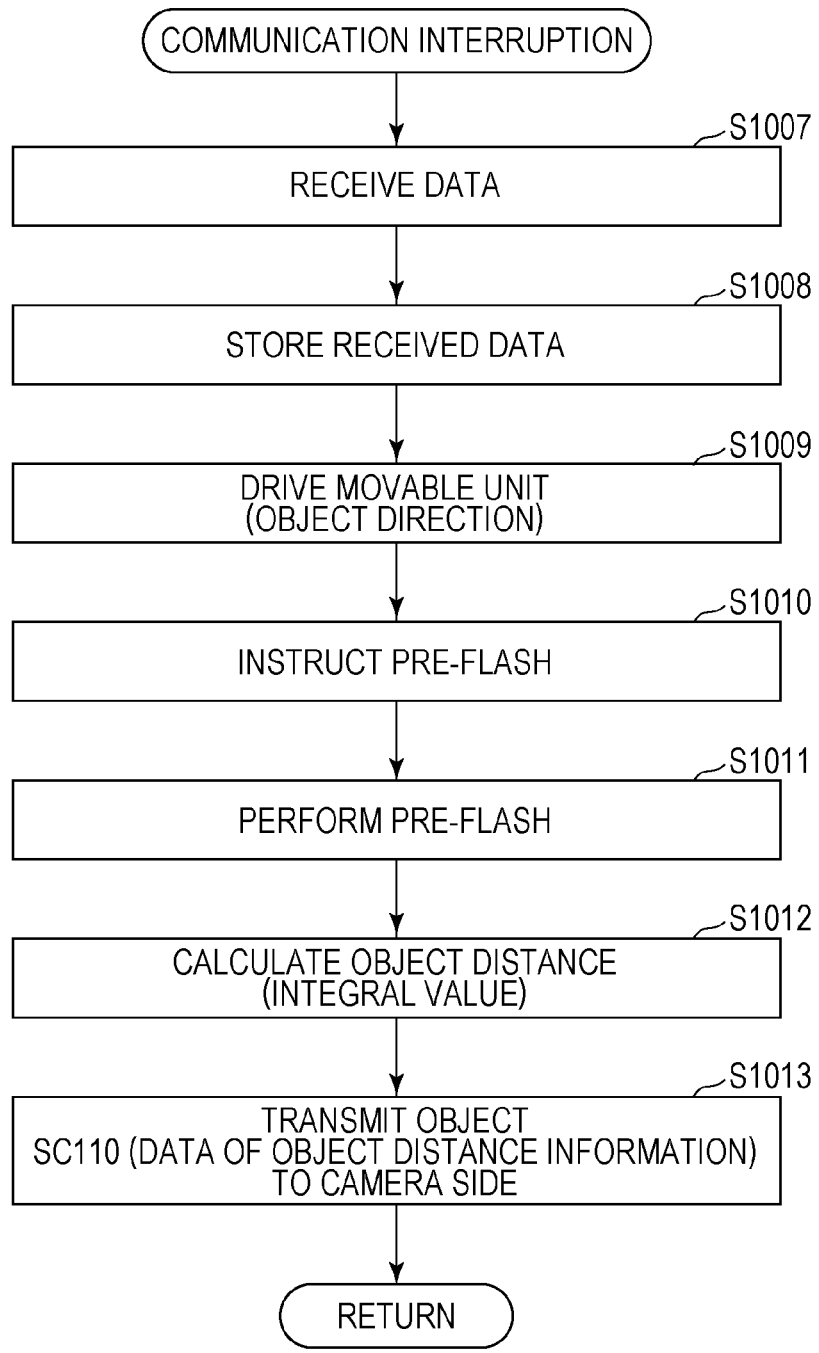

Next, the object distance calculation processing in step S705 in the bounce processing will be described with reference to FIG. 10. Details of the setting commands at this time are described in FIGS. 19A and 19B. Note that the processes performed at the camera main body 100 are illustrated in steps S1001 to S1006 in FIG. 10, and the corresponding processes of the flash device 300 are illustrated in steps S1007 to S1013.

First, the process of the camera main body 100 will be described. In step S1001, the camera microcomputer 101 decides a ranging method for calculating object distance, and proceeds to step S1002.

In step S1002, the camera microcomputer 101 determines whether or not the ranging method is the pre-flash method. If the ranging method differs from the pre-flash method, the flow proceeds to step S1003, and if the ranging method is the pre-flash method, proceeds to step S1004.

In step S1003, the ranging method differs from the pre-flash method, so the camera microcomputer 101 transmits "CS111 command (data XX)" to the flash microcomputer 310 as object distance information, and proceeds to step S706. Note that in a case of having received that the ranging method is the flash ranging method as auto bounce data, the present step is omitted.

In step S1004, the camera microcomputer 101 transmits "CS131 command (data 00)" to the flash microcomputer 310 as pre-flash permission, and proceeds to step S1005.

In step S1005, the camera microcomputer 101 transmits a pre-flash command to the flash microcomputer 310, and proceeds to step S1006.

In step S1006, the camera microcomputer 101 receives the object distance information from the flash microcomputer 310, stores the received data in the built-in memory of the camera microcomputer 101, and proceeds to step S706.

Next, the processes of the flash device 300 will be described. In step S1007, upon receiving a communication interruption, the flash microcomputer 310 receives the data transmitted from the camera microcomputer 101, and proceeds to step S1008. In step S1008, the flash microcomputer 310 stores the received data in the built-in memory of the flash microcomputer 310, and proceeds to step S1009.

Upon receiving pre-flash permission, in step S1009 the flash microcomputer 310 instructs the bounce circuit 340 so that the irradiation direction is in the direction toward the object, and the bounce circuit 340 causes the movable unit 300b to turn.

After turning of the movable unit 300b, in step S1010 the flash microcomputer 310 gives a pre-flash instruction to the flash control circuit 304 in accordance with the pre-flash command.

In step S1011, the flash control circuit 304 causes the discharge tube 305 to perform pre-flash in accordance with the pre-flash instruction.

In step S1012, the ranging unit 308 receives reflected light of pre-flash reflected at the object using the light receiving sensor, and calculates object distance based on an integral value of the received reflected light.

In step S1013, the flash microcomputer 310 transmits "SC110 command (data XX)" to the camera microcomputer 101 as object distance information indicating the calculated object distance, and ends the object distance calculation processing.

Thus, an object distance, for deciding the irradiation direction most suitable for bounce flash photographing, is calculated.

Figure 11A:
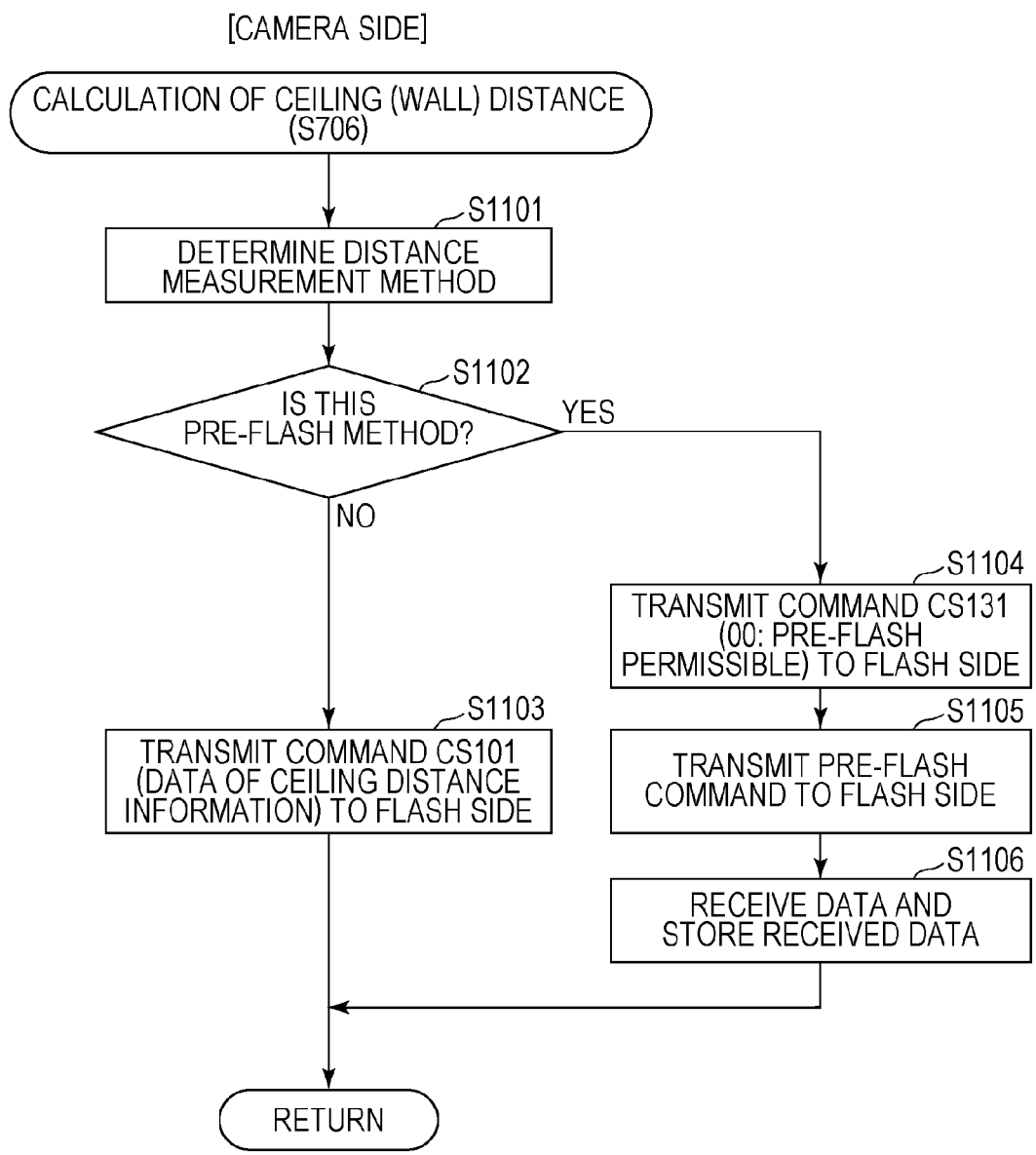

Next, the ceiling (wall) distance calculation processing in step S706 in the bounce processing will be described with reference to FIG. 11. Details of the setting commands at this time are described in FIGS. 19A and 19B. Note that, in FIG. 11, the processes performed at the camera main body 100 are illustrated in steps S1101 to S1106, and the corresponding processes of the flash device 300 are illustrated in steps S1107 to S1113.

First, the processes performed at the camera main body 100 will be described. In step S1101, the camera microcomputer 101 decides a ranging method for calculating ceiling (wall) distance, and proceeds to step S1102.

In step S1102, the camera microcomputer 101 determines whether or not the ranging method is the pre-flash method. In a case where the ranging method differs from the pre-flash method, the flow proceeds to step S1103, and in a case of the pre-flash method, proceeds to step S1104.

In step S1103, the ranging method differs from the pre-flash method, so the camera microcomputer 101 transmits "CS101 command (data XX)" to the flash microcomputer 310 as ceiling distance information, and proceeds to step S707. Note that in a case of having received as auto bounce data to the effect that the ranging method is the flash ranging method, this step is omitted.

In step S1104, the camera microcomputer 101 transmits "CS131 command (data 00)" to the flash microcomputer 310 as pre-flash permission, and proceeds to step S1105.

In step S1105, the camera microcomputer 101 transmits a pre-flash command to the flash microcomputer 310, and proceeds to step S1106.

In step S1106, the camera microcomputer 101 receives the object distance information from the flash microcomputer 310, stores the received data in the built-in memory of the camera microcomputer 101, and proceeds to step S707.

Next, the processes of the flash device 300 will be described. In step S1107, upon receiving a communication interruption, the camera microcomputer 101, the flash microcomputer 310 receives the data transmitted from the camera microcomputer 101, and proceeds to step S1108. In step S1108, the flash microcomputer 310 stores the received data in the built-in memory of the flash microcomputer 310, and proceeds to step S1109.

Upon receiving pre-flash permission, in step S1109 the flash microcomputer 310 instructs the bounce circuit 340 so that the irradiation direction is now the ceiling direction, and the bounce circuit 340 causes the movable unit 300b to turn.

After turning of the movable unit 300b, in step S1110 the flash microcomputer 310 gives a pre-flash instruction to the flash control circuit 304 in accordance with the pre-flash command.

In step S1111, the flash control circuit 304 causes the discharge tube 305 to perform pre-flash in accordance with the pre-flash instruction.

In step S1112, the ranging unit 308 receives reflected light of pre-flash reflected at the object using the light receiving sensor, and calculates ceiling distance based on an integral value of the received reflected light.

In step S1113, the flash microcomputer 310 transmits "SC100 command (data XX)" to the camera microcomputer 101 as ceiling distance information indicating the calculated ceiling distance, and ends the processes.

Thus, the ceiling (wall) distance for deciding the irradiation direction most suitable for bounce flash photographing is calculated. Next, the irradiation direction deciding processing in step S707 in the bounce processing will be described with reference to FIG. 12. Details of the setting commands at this time are described in FIGS. 19A and 19B. Note that in FIG. 12, the processes performed at the camera main body 100 are illustrated in steps S1201 to S1206, and the corresponding processes of the flash device 300 are illustrated in steps S1207 to S1212.

In step S1201, the camera microcomputer 101 determines whether or not deciding the irradiation direction will be performed at the camera main body 100. In a case where both of the camera main body 100 and flash device 300 can decide the irradiation direction, though the irradiation direction may be decided by either, the user may be allowed to set either to decide the irradiation direction by operating the input unit 112. Alternatively, in a case where only one of those can decide the irradiation direction, which of those is to be employed to decide the irradiation direction may automatically be set. If deciding the irradiation direction using the camera main body 100, the camera microcomputer 101 proceeds to step S1202, and if deciding the irradiation direction using the flash device 300, proceeds to step S1205.

In step S1202, the camera microcomputer 101 references, in order to decide the irradiation direction, the object distance information indicating the object distance calculated in step S705, and ceiling distance information indicating the ceiling (wall) distance calculated in step S706.

Figure 20:
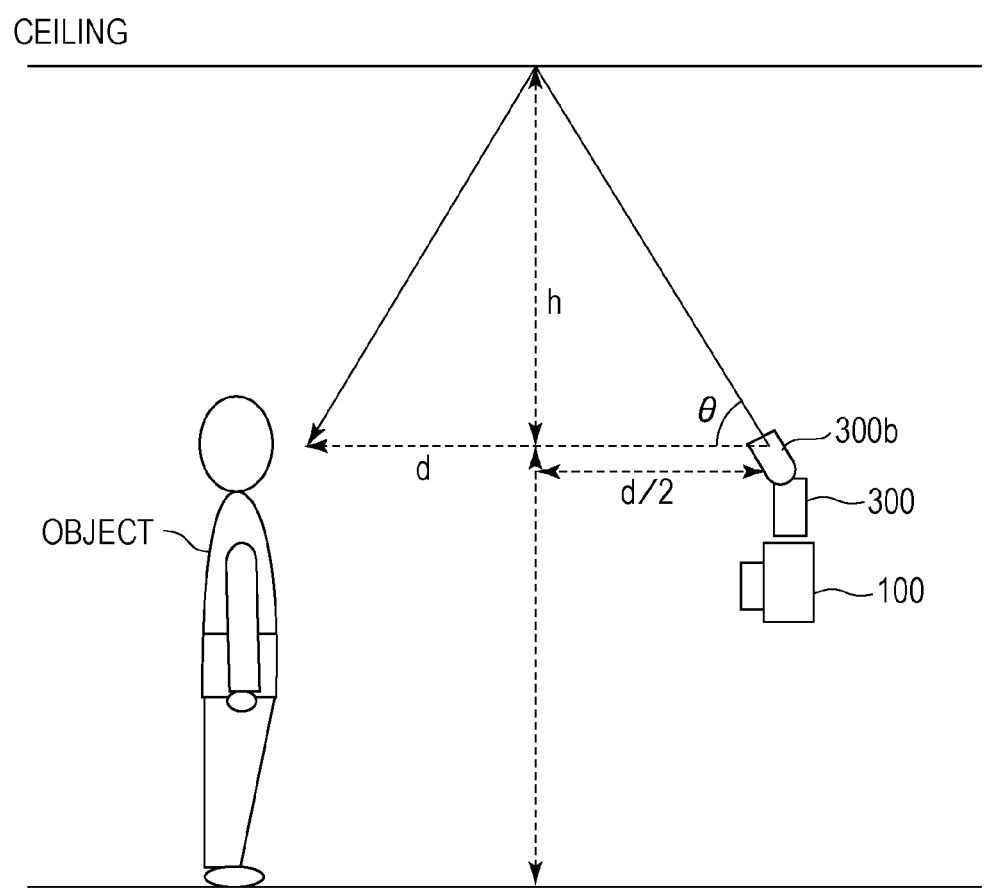
FIG. 20 is a diagram illustrating an example of a bounce flash photographing scene.

In step S1203, the camera microcomputer 101 decides the irradiation direction most suitable for bounce flash photographing based on the referenced object distance information and ceiling distance information. Specifically, the camera microcomputer 101 calculates the turning angle of the movable unit 300b as the optimal irradiation direction. The method for calculating the turning angle is not restricted to any particular method as long as it is a method to calculate a turning angle based on the object distance and ceiling distance. Representing the distance to a subject from the exit surface of flash light of the flash device 300 by d, such as in the example of the bounce flash photographing scene illustrated in FIG. 20, reflected light most suitable for the subject is obtained when reflecting flash light at the ceiling portion at a distance of d/2 in the subject direction. In this case, representing distance to the ceiling by h, and the irradiation direction most suitable for the horizontal direction by θ, θ is obtained from Expression (1).

$$\theta = \tan^{-1}(2h/d) \quad (1)$$

Therefore, a turning angle as to the main body unit 300a of the moveable portion 300b can be calculated so that the irradiation direction is θ. Note that, in order to handle a case where the movable unit 300b does not readily turn to the calculated turning angle, an arrangement may be made in which a predetermined specified angle is selected based on the calculated turning angle, and the movable unit 300b is controlled to turn to the selected angle. In this case, a greater specified angle than the calculated turning angle is selected. Specifically, the movable unit 300b is moved to a position farther away from the reference position than the position of the calculated turning angle. This is because the front side of the subject is irradiated with more reflected light from the ceiling in comparison with a case where a smaller specified angle than the turning angle is selected, and also because the subject has to be prevented from being directly irradiated with flash light.

Upon completing the angle calculation, the camera microcomputer 101 stores angular information indicating the calculated angle in the built-in memory of the camera microcomputer 101, and proceeds to step S1204.

In step S1204, the camera microcomputer 101 transmits "CS071 (vertical data XX)" and "CS081 (horizontal data XX)" to the flash microcomputer 310 as the angular information indicating the calculated angle, and proceeds to step S708.

On the other hand, in a case where the irradiation direction is not decided at the camera main body 100, in step S1205 the camera microcomputer 101 transmits "CS171 (data 00)" to the flash microcomputer 310 as an angle calculation instruction, and proceeds to step S1206.

In step S1206, the camera microcomputer 101 receives the angular information from the flash microcomputer 310, stores the received data in the built-in memory of the camera microcomputer 101, and proceeds to step S708.

Next, the processes of the flash device 300 will be described. In step S1207, upon receiving a communication interruption, the flash microcomputer 310 receives the data transmitted from the camera microcomputer 101, and proceeds to step S1208. In step S1208, the flash microcomputer 310 stores the received data in the built-in memory of the flash microcomputer 310, and proceeds to step S1209.

In step S1209, the flash microcomputer 310 determines whether or not the flash device 300 is to decide the irradiation direction. If deciding the irradiation direction at the flash device 300, the flow proceeds to step S1210, and of not deciding the irradiation direction at the flash device 300, ends the irradiation direction deciding processing.

In step S1210, the flash microcomputer 310 references the object distance information indicating the object distance calculated in step S705, and ceiling distance information indicating the ceiling (wall) distance calculated in step S706, in order to decide the irradiation direction.

In step S1211, the flash microcomputer 310 decides the irradiation direction most suitable for bounce flash photographing based on the referenced object distance information and ceiling distance information. The method for deciding the irradiation direction may be similar to the case of deciding the irradiation direction at the camera main body 100, so description will be omitted.

In step S1212, the flash microcomputer 310 transmits "SC070 (vertical data XX)" and "SC080 (horizontal data XX)" to the camera microcomputer 101 as the angular information indicating the calculated angle, and ends the irradiation direction deciding processing.

Thus, the irradiation direction most suitable for bounce flash photographing is decided.

Next, the bounce driving control processing of step S708 in the bounce processing will be described with reference to FIG. 13. Details of the setting commands at this time are described in FIGS. 19A and 19B. Note that in FIG. 13, the processes performed at the camera main body 100 are illustrated in steps S1301 to S1314, and the corresponding processes of the flash device 300 are illustrated in steps S1315 to S1330.

In step S1301, the camera microcomputer 101 determines whether or not bounce driving instruction is to be performed on the camera side. If performing on the camera side, the flow proceeds to step S1302, and if performing that on the flash side, proceeds to step S1313.

In step S1302, the camera microcomputer 101 references the angular information calculated in step S707.

In step S1303, the camera microcomputer 101 transmits "CS181 command (data 01)" to the flash microcomputer 310 to inform the flash microcomputer 310 that bounce driving instruction is to be performed on the camera side, and proceeds to step S1304.

In step S1304, the camera microcomputer 101 transmits "CS011 command (data 01)" to the flash microcomputer 310 as an auto bounce setting, and proceeds to step S1305.

In step S1305, the camera microcomputer 101 transmits "CS021 command (data XX)" to the flash microcomputer 310 as an auto bounce driving condition, and proceeds to step S1306. The data here is "Both of horizontal and vertical: data (00)", "horizontal alone: data (01)", and "vertical alone: data (02)".

In step S1306, the camera microcomputer 101 transmits "CS031 command (data XX XX)" to the flash microcomputer 310 as the driving range in the horizontal direction, and proceeds to step S1307. In step S1307, the camera microcomputer 101 transmits "CS041 command (data XX XX)" to the flash microcomputer 310 as the driving range in the vertical direction, and proceeds to step S1308.

In step S1308, the camera microcomputer 101 transmits "CS121 command (data XX XX XX)" to the flash microcomputer 310 as orientation difference information, and proceeds to step S1309a.

In step S1309a, the camera microcomputer 101 transmits "CS161 command (data XX)" to the flash microcomputer 310 as operation speed information indicating speed for causing the movable unit 300b to turn (driving speed of the motor of the bounce driving circuit 340). The data here is "normal (reference speed) (data 00)", "low speed (50% of reference speed) (data 01)", and "high speed (150% of reference speed) (data 02)", but the data may further finely be set. Thus, speed for causing the moveable portion 300b to turn is set changeably, whereby the operation sound of the motor for causing the movable unit 300b to turn can be set in accordance with the scene. The speed for causing the movable unit 300b to turn is changed by user operations to the input unit 112.

In step S1310, the camera microcomputer 101 transmits "CS051 command (data 01)" and "CS071 command (data XX)" to the flash microcomputer 310 as a driving instruction in the vertical direction, and proceeds to step S1311. In step S1311, the camera microcomputer 101 transmits "CS051 command (data 02)" and "CS081 command (data XX)" to the flash microcomputer 310 as a driving instruction in the horizontal direction, and proceeds to step S1312.

After completion of bounce driving, in step S1312 the camera microcomputer 101 transmits "CS051 command (data 00)" and "CS011 command (data 00)" to the flash microcomputer 310 as a stop instruction of bounce driving, and proceeds to step S1314.

In a case of performing bounce driving instruction on the flash side, in step S1313 the camera microcomputer 101 transmits "CS181 command (data 00)" to the flash microcomputer 310 to inform that bounce driving instruction is performed on the flash side, and proceeds to step S1309b.

In step S1309b, the camera microcomputer 101 transmits "CS161 command (data XX)" to the flash microcomputer 310 as operation speed information in the same way as step S1309a, and proceeds to step S1314.

In step S1314, the camera microcomputer 101 receives the current position information from the flash microcomputer 310, stores the received data in the built-in memory of the camera microcomputer 101, and proceeds to step S709.

Next, the processes of the flash device 300 will be described. In step S1315, upon receiving a communication interruption, the flash microcomputer 310 receives the data transmitted from the camera microcomputer 101, and proceeds to step S1316. In step S1316, the flash microcomputer 310 stores the received data in the built-in memory of the flash microcomputer 310, and proceeds to step S1317a.

In step S1317a, the flash microcomputer 310 determines whether or not a driving error has occurred at the time of bounce driving, such as reaching the far end of the movable unit 300b, or forcibly pressing the movable unit 300b by the hand, or the like. If there is no driving error, the flash microcomputer 310 proceeds to step S1318, and if there is a driving error, proceeds to step S1330.

In step S1318, the flash microcomputer 310 transmits "SC060 command (data 00)" to the camera microcomputer 101 to inform that there is no driving error, and proceeds to step S1319.

In step S1319, the flash microcomputer 310 determines whether or not bounce driving instruction is to be performed on the camera side. If performing bounce driving instruction on the flash side, the flow proceeds to step S1320, and if performing bounce driving instruction on the camera side, proceeds to step S1327.

In step S1320, the flash microcomputer 310 performs preparation for bounce driving in accordance with the instruction from the flash side, and proceeds to step S1321a.

In step S1321a, the flash microcomputer 310 references the angular information in the vertical direction calculated in step S707, and proceeds to step S1322a.

In step S1322a, the flash microcomputer 310 drives the motor of the bounce driving circuit 340d to cause the movable unit 300b to turn to the calculated angle in the vertical direction.

In step S1323a, the flash microcomputer 310 transmits "SC050 command (data 01)" to the camera microcomputer 101 to inform that driving in the vertical direction is being performed, and proceeds to step S1317b.

In step S1317b, the flash microcomputer 310 determines whether or not a driving error has occurred in the same way as in step S1317a. If there has been no driving error, the flow proceeds to step S1324a, and if there has been a driving error, proceeds to step S1330.

In step S1324a, the flash microcomputer 310 references the angular information in the horizontal direction calculated in step S707, and proceeds to step S1325a.

In step S1325a, the flash microcomputer 310 drives the motor of the bounce driving circuit 340b to cause the movable unit 300b to turn to the calculated angle in the horizontal direction.

In step S1326a, the flash microcomputer 310 transmits "CS050 command (data 02)" to the camera microcomputer 101 to inform that driving in the horizontal direction is being performed, and proceeds to step S1317c.

In step S1317c, the flash microcomputer 310 determines whether or not a driving error has occurred in the same way as in step S1317a. If there has been no driving error, the flow proceeds to step S1328, and if there has been a driving error, proceeds to step S1330.

After driving in the vertical and horizontal directions is completed, in step S1328 the flash microcomputer 310 transmits "SC051 command (data 00)" and "SC011 command (data 00)" to the camera microcomputer 101 as driving stop information, and proceeds to step S1329. In step S1329, the flash microcomputer 310 transmits "SC070 command (data XX)" and "SC080 command (data XX)" to the camera microcomputer 101 as the current position information indicating the turning angle of the movable unit 300b after bounce driving, and ends the processes.

On the other hand, in a case of performing bounce driving instruction on the camera side, in step S1327 the flash microcomputer 310 performs preparation for bounce driving in accordance with the instruction from the flash side, and proceeds to step S1321b.

Hereinafter, the flash microcomputer 310 executes the same processes in steps S1321b to S1317e as the processes in steps S1321a to S1317c.

Thus, the movable unit 300b is controlled to automatically turn in the vertical and horizontal directions so as to obtain the irradiation direction most suitable for bounce flash photographing.

Figure 14:
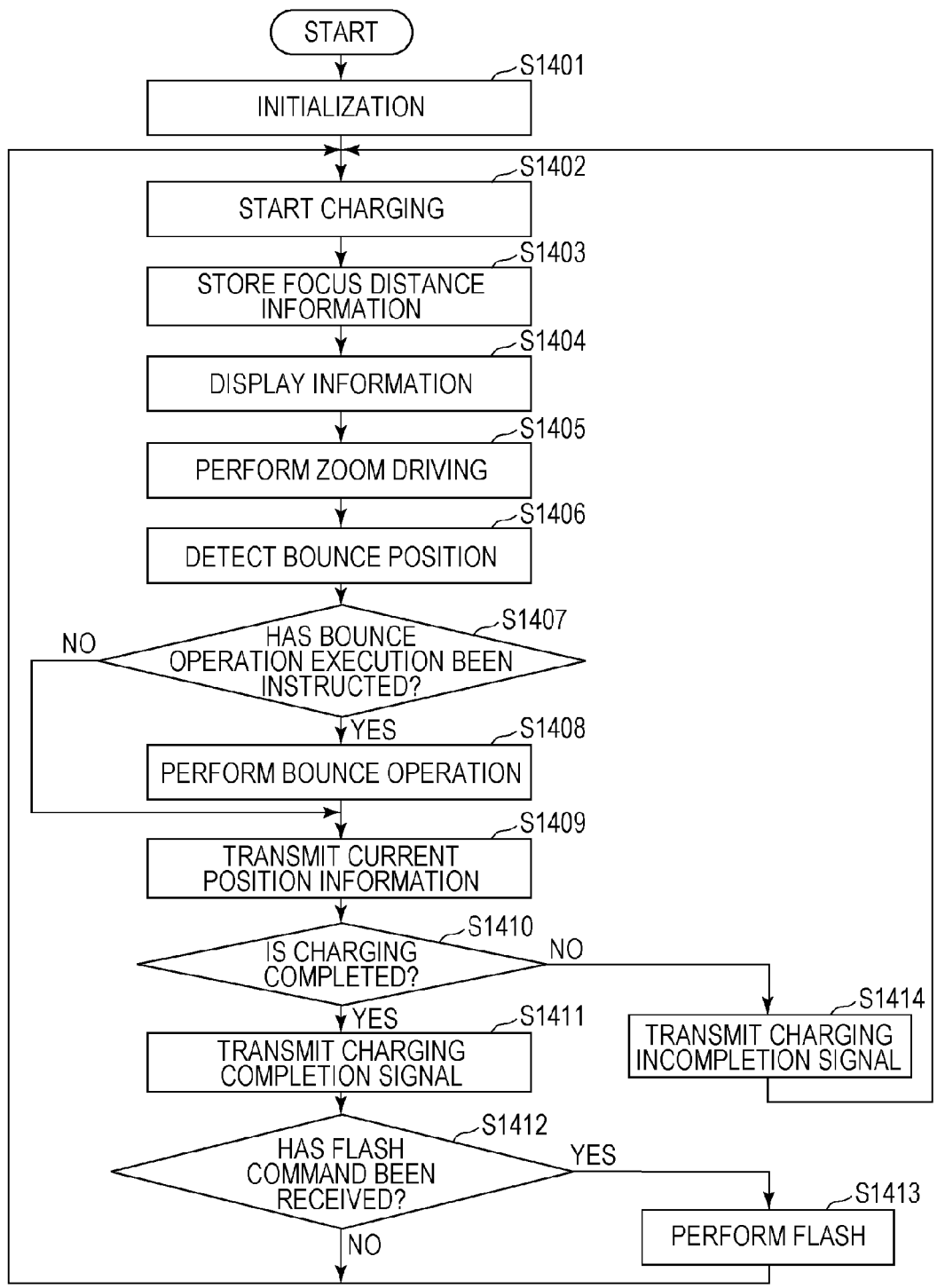
FIG. 14 is a diagram illustrating a flowchart of various processes along with flash of a flash device, which includes bounce operation.

Next, processing accompanied with flash of the flash device 300 including bounce operation will be described with reference to FIG. 14. Upon the power switch included in the input unit 312 being turned on to enable the flash microcomputer 310 of the flash device 300 to be operated, the flash microcomputer 310 starts the flowchart illustrated in FIG. 14.

In step S1401, the flash microcomputer 310 performs initialization of its own memory and ports. Also, the flash microcomputer 310 reads the states of the switches included in the input unit 312 and predetermined input information, and performs setting of various flash modes such as how to decide the amount of flash, flash timing, and so forth.

In step S1402, the flash microcomputer 310 starts operation of the step-up circuit block 302 to perform charging of the main capacitor 302d.

In step S1403, the flash microcomputer 310 stores the focus distance information acquired from the camera microcomputer 101 via the communication line SC in the built-in memory of the flash microcomputer 310.

Note that, in a case where the focus distance information has been stored, the flash microcomputer 310 updates this to new focus distance information.

In step S1404, the flash microcomputer 310 displays an image relating to the flash mode set at the input unit 312, an image relating to the acquired focus distance information, or the like on the display unit 313.

In step S1405, the flash microcomputer 310 causes the zoom driving circuit 330 to move the zoom optical system 307 so that the irradiation range of flash light is a range according to the acquired focus distance information.

In step S1406, the flash microcomputer 310 detects the turning angle of the movable unit 300b as to the main body unit 300a using the bounce position detection circuits 340a and 340c.

In step S1407, the flash microcomputer 310 determines whether or not a bounce operation execution instruction has been received. In a case of having received a bounce operation execution instruction, the flow proceeds to step S1408 to perform the above bounce driving, and in a case of having received no bounce operation execution instruction, proceeds to step S1409.

In step S1409, the flash microcomputer 310 transmits the current position information indicating the turning angle of the movable unit 300b as to the main body unit 300a after bounce driving to the camera microcomputer 101 as described above.

In step S1410, the flash microcomputer 310 determines whether or not the charging voltage of the main capacitor 302d is equal to or greater than a predetermined value (completion of charging). In a case of equal to or greater than a predetermined value, the flow proceeds to step S1411, and in a case of smaller than a predetermined value, proceeds to step S1414.

In step S1411, the flash microcomputer 310 transmits a charging completion signal to the camera microcomputer 101, and proceeds to step S1412.

In step S1412, the flash microcomputer 310 determines whether or not a flash start signal has been received as a flash command. In a case of having received the signal, the flow proceeds to step S1413, and in a case of not having received the signal, returns to step S1402.

In step S1413, the flash microcomputer 310 instructs the flash control circuit 304 to perform flash in response to the received flash start signal, the flash control circuit 304 causes the discharge tube 305 to flash in accordance with the flash instruction, and after completion of flash, returns to step S1402. Note that, in step S1413, in a case of a series of flashes such as pre-flash for light control and the main flash, the flash microcomputer 310 does not return to step S1402 until the series of flash is completed.

In a case where the charging voltage is smaller than a predetermined value, in step S1414 the flash microcomputer 310 transmits a charging incompletion signal to the camera microcomputer 101, and returns to step S1402.

Thus, the processing accompanied with flash of the flash device 300 including bounce operation is executed.

As described above, the irradiation direction most suitable for bounce flash photographing can automatically be decided, and communication of information between the imaging apparatus and lighting device for performing bounce flash photographing can suitably be performed in the present embodiment. Thus, bounce flash photographing can suitably be performed by automatically changing the irradiation direction of the lighting device.

Note that the flowcharts described in the present embodiment are only exemplary, and that various processes may be executed in a sequence different from those in the flowcharts described in the present embodiment if there is no problem. Also, the commands, command numbers, and data items described in the present embodiment are only exemplary, these may be set in any way as long as they serve similar roles.

Second Embodiment

Bounce flash photographing has been performed according to Japanese Patent Laid-Open No. 2009-163179 in which first half-pressing of the release button is performed while directing the photographing lens to the reflected surface to measure distance to the reflected surface, second half-pressing of the release button is performed while directing the photographing lens to an object to measure distance to the object, and a bounce angle most suitable for bounce flash photographing is calculated from each distance thereof, thereby performing bounce operation. In the case of the technology disclosed in Japanese Patent Laid-Open No. 2009-163179, for example, when the orientation of the camera is changed from the orientation in the horizontal position to the orientation in the vertical position, distance measurement has to be performed again to calculate a bounce angle.

Therefore, in a case of detecting change in the orientation of the camera to automatically drive a flash emission unit so as to constantly obtain the same irradiation position, the flash emission unit is automatically driven each time the orientation of the camera is changed, which makes electric power easy to consume, and also irks the user.

To this end, the present embodiment has been devised to enable driving for changing the irradiation direction to be performed at suitable timing in a configuration in which driving for changing the irradiation direction is automatically performed.

Note that a camera system (including a digital camera, a lens, and a flash device) according to the present embodiment is generally the same as the camera system described with reference to FIGS. 1A through 2 in the first embodiment, so detailed description will be omitted. It should be noted, however, that the input unit 312 of the flash device 300 according to the present embodiment also includes a selection button for selecting whether to fix the irradiation position by the flash device 300, and a lock button for fixing the irradiation position. Also, the various processes described in the first embodiment with reference to FIGS. 5 to 20 are executed in the present embodiment, detailed description of which will be omitted.

Next, the various processes performed at the camera main body 100 relating to auto bounce flash photographing will be described with reference to FIGS. 21 and 22. Upon the power switch included in the input unit 112 being turned on to enable the camera microcomputer 101 of the camera main body 100 to operate, the camera microcomputer 101 starts the flowchart illustrated in FIG. 21. Note that steps S101 to S110b in FIG. 21 perform the same processes as steps S1 to S10b in FIG. 3, so description will be omitted. Also, steps S121 to S130 in FIG. 21 perform the same processes as steps S13 to S22 in FIG. 3, so description will be omitted.

In step S111, the camera microcomputer 101 determines whether or not the irradiation position by the flash device 300 is in a fixed state (hereinafter, referred to as under bounce lock). If the irradiation position by the flash device 300 is not under bounce lock, the flow proceeds to step S112, and if the irradiation position by the flash device 300 is under bounce lock, proceeds to step S113. Whether or not the irradiation position by the flash device 300 is under bounce lock is determined based on the state of the lock button included in the input unit 112 or input unit 312. Note that, in a case of executing the present step for the first time after the power switch is turned on, a particular irradiation position is not set, so the camera microcomputer 101 may proceed to step S112 even though under bounce lock. In step S112, the camera microcomputer 101 determines whether to perform operation for automatically deciding the irradiation direction at the time of bounce flash photographing (hereinafter, referred to as auto bounce operation). Whether to perform the auto bounce operation is determined based on the state of an auto bounce switch for switching whether to execute auto bounce operation, included in the input unit 112 or input unit 312, or another state of the camera main body 100. In a case of executing the auto bounce operation, the camera microcomputer 101 proceeds to step S114, and in a case of not executing the auto bounce operation, the camera microcomputer 101 proceeds to step S124.

In step S113, the camera microcomputer 101 determines whether the object distance has been changed equal to or greater than a predetermined value under bounce lock. Specifically, the camera microcomputer 101 determines whether or not difference between the last object distance detection result and the latest object distance detection result is equal to or greater than a predetermined value. The amount of change in the object distance is calculated based on the focus detection result and the lens driving result obtained in step S109*a* and S110*a*, and whether or not the object distance has been changed equal to or greater than a predetermined value based on the calculation result. In a case where that the object distance has been changed equal to or greater than a predetermined value, the camera microcomputer 101 proceeds to step S112, and in a case where the object distance has not been changed equal to or greater than a predetermined value, proceeds to step S115.

In step S114, the camera microcomputer 101 executes processing relating to the auto bounce operation (hereinafter, referred to as bounce processing), and after execution of the bounce processing, proceeds to step S118.

In step S115, the camera microcomputer 101 determines whether or not the amount of change in the orientation of the camera system is equal to or greater than a predetermined value based on the detection result of the orientation detection circuit 140 on the camera side or the orientation detection circuit 360 on the flash side. Specifically, the camera microcomputer 101 determines whether or not difference between the last orientation detection result and the latest orientation detection result is equal to or greater than a predetermined value. In a case where the orientation has been changed by an amount equal to or greater than a predetermined value, the camera microcomputer 101 proceeds to step S116, and in a case where the orientation has not been changed equal to or greater than a predetermined value, proceeds to step S118.

In step S116, the flash microcomputer 310 calculates the turning angle of the movable unit 300*b* of the flash device 300 based on the orientation information of the camera system after change in the orientation so that the irradiation position by the flash device 300 is not changed from that before change in the orientation of the camera system.

In step S117, the camera microcomputer 101 transmits angular information indicating the calculated turning angle to the flash microcomputer 310. The flash device 300 drives the movable unit 300*b* based on the angular information transmitted here.

The above-descried processing in step S113 is executed since, in a case where object distance has been changed greatly under bounce lock, the effects of reflected light from the ceiling or the like to the object greatly change if the irradiation position is fixed. For example, in a case where the irradiation position is set so that an object at an object distance of 2 m is irradiated with reflected light, but then the object moves and the object distance is changed to 5 m, the amount of reflected irradiation light greatly differs when the object distance is 2 m and when the object distance is 5 m if the irradiation positions are the same. Therefore, in a case where the subject distance changes greatly under bounce lock, the camera microcomputer 101 executes the bounce processing to decide the irradiation position again.

Also, the processing in step S115 is executed, since in a case where the orientation of the camera system has been changed greatly under bounce lock, the irradiation position changes greatly in a state in which the turning angle of the movable unit 300*b* of the flash device 300 is fixed as to the main body unit 300*a*. Detailed description will be made with reference to FIGS. 23A and 23B illustrating the irradiation direction of the flash device 300 according to the orientation of the camera system. FIG. 23A illustrates the orientation of the camera main body 100 of which the portion on which the flash device 300 is mounted is directed in the direction toward the ceiling (the lateral position of the camera). Also, FIG. 23B illustrates the orientation of the camera main body 100 of which the portion on which the flash device 300 is mounted is directed to the horizontal direction (the vertical position of the camera). For example, in a case where the irradiation position has been set with the orientation of the camera system illustrated in FIG. 23A in a state in which the turning angle of the movable unit 300*b* is fixed, the orientation of the camera system has been changed to the orientation of the camera system illustrated in FIG. 23B, the irradiation direction of the flash device 300 is changed greatly in a state in which the turning angle is fixed. Therefore, in a case where the orientation of the camera system has been changed under bounce lock, the camera microcomputer 101 executes calculation processing of the turning angle again so that the set irradiation position is irradiated with the flash light. As an example, in a case where the turning angle of the movable unit 300*b* has been 90 degrees in the vertical direction with the orientation illustrated in FIG. 23A, the same irradiation position can be set by setting the turning angle of the movable unit 300*b* to 270 degrees in the horizontal direction with the orientation illustrated in FIG. 23B.

Also, the process in step S113 and the process in step S115 are executed only in the state in which the SW1 is on. Specifically, even in a case where the subject distance or the orientation of the camera system has been changed greatly under bounce lock, resetting of the irradiation position and re-driving of the movable unit 300*b* are not performed if the SW1 is off. Thus, resetting of the irradiation position, and re-driving of the movable unit 300*b* are prevented from being performed in a state in which it is unlikely that the user will shoot an image, so driving of the movable unit 300*b* can be performed at a suitable timing and power consumption can be suppressed.

In step S118, the camera microcomputer 101 determines whether or not the current mode is a mode in which the irradiation position by the flash device 300 is fixed (hereinafter, referred to as bounce lock mode). If the current mode is the bounce lock mode, the camera microcomputer 101 proceeds to step S119, and if the current mode is not the bounce lock mode, proceeds to step S120. The bounce lock mode is set according to an operation to the lock button of the input unit 112 at the camera side or the lock button at the input unit 312 at the flash side, and it can be said that the state in which the bounce lock mode is set is under bounce lock.

In step S119, the camera microcomputer 101 turns on a known bit indicating that the current mode is the bounce lock mode, so the bounce lock is set, and proceeds to step S121. On the other hand, in step S120 the camera microcomputer 101 turns on a known bit indicating that the current mode is not the bounce lock mode, so the bounce lock is cancelled, and proceeds to step S121.

Figure 4:
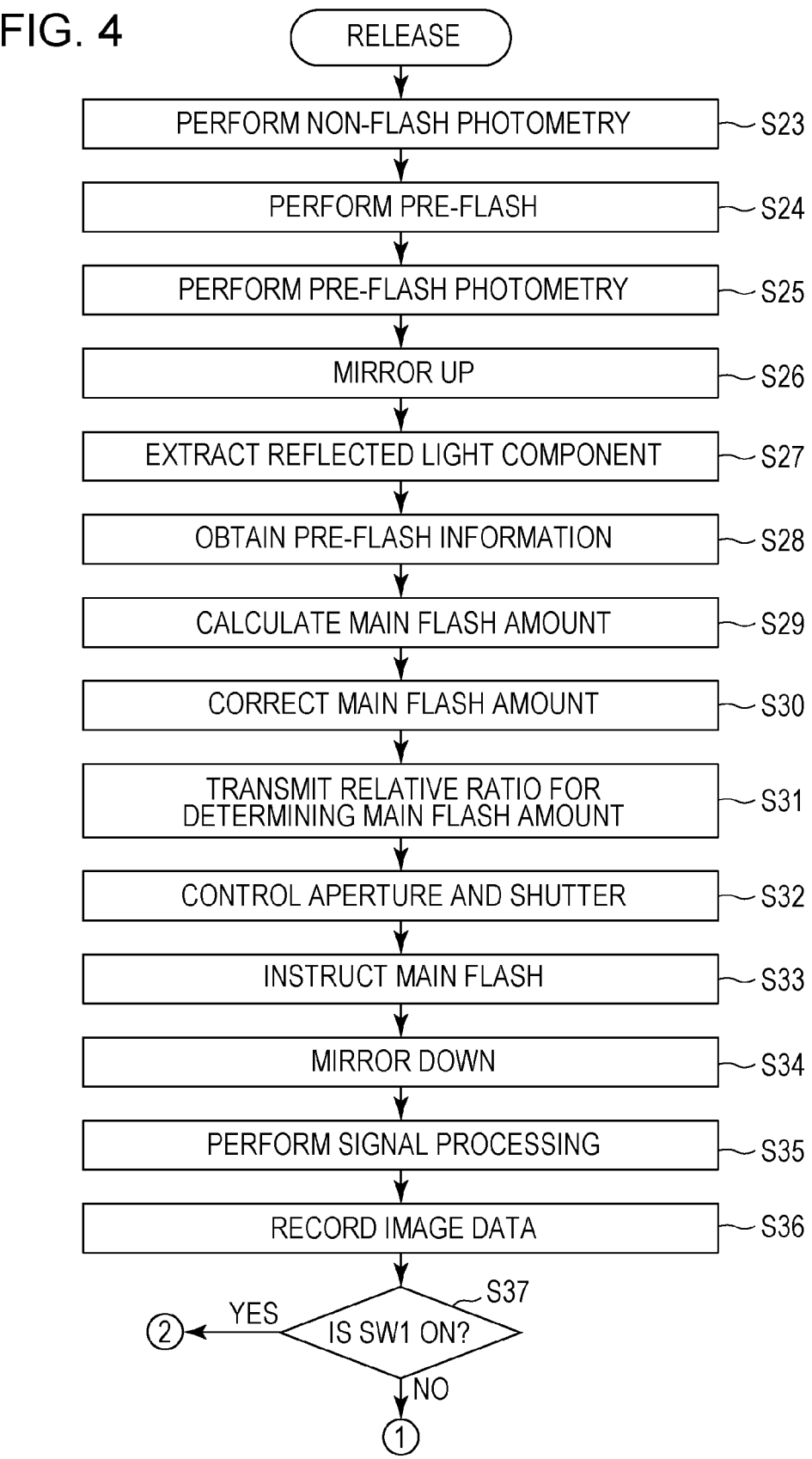
FIG. 4 is a diagram illustrating a flowchart of various processes of a camera main body according to the auto bounce flash photographing in the first embodiment.
Figure 21A:
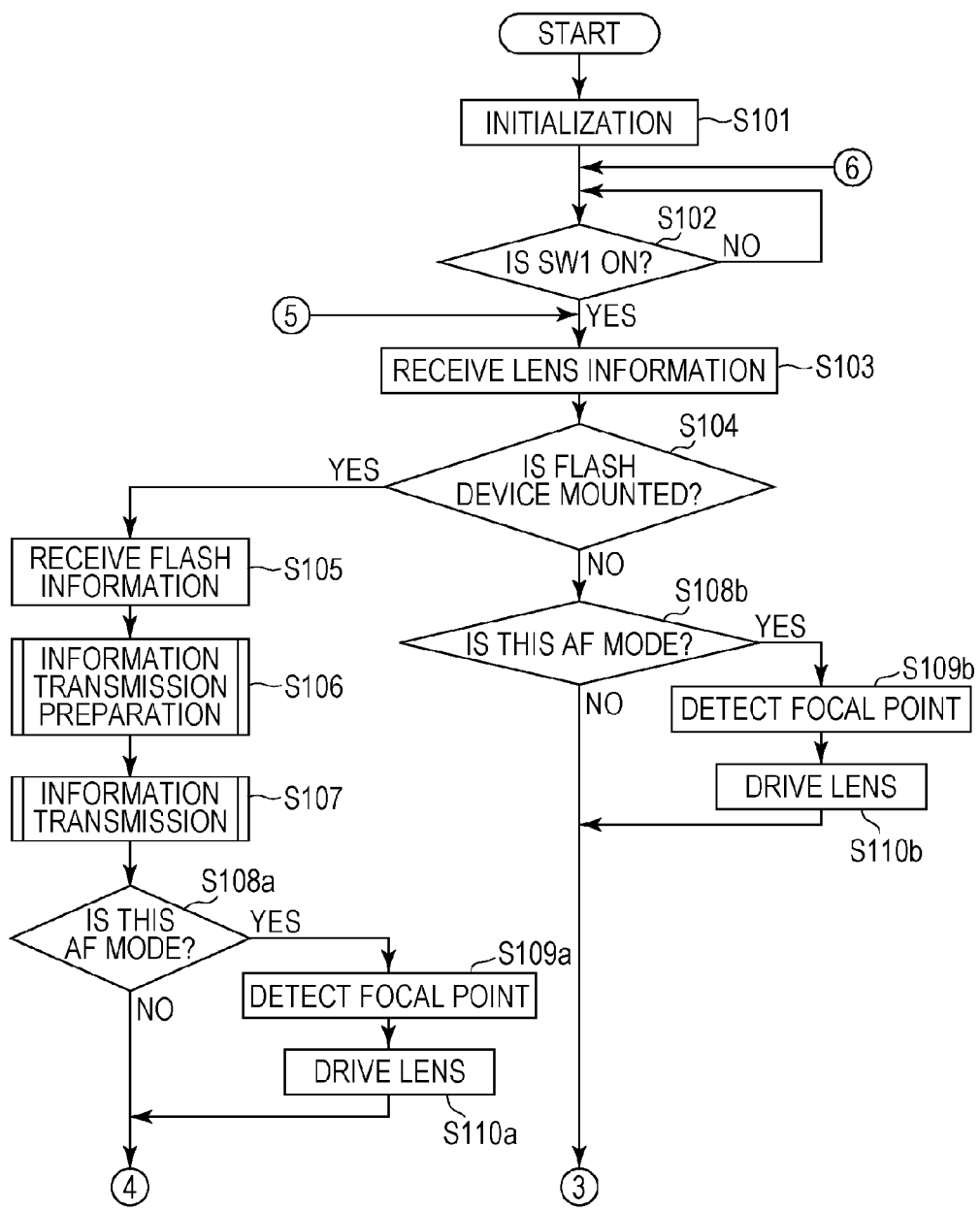
FIGS. 21A and 21B are a diagram illustrating a flowchart of various processes performed at the camera main body relating to auto bounce flash photographing in a second embodiment.
Figure 21B:
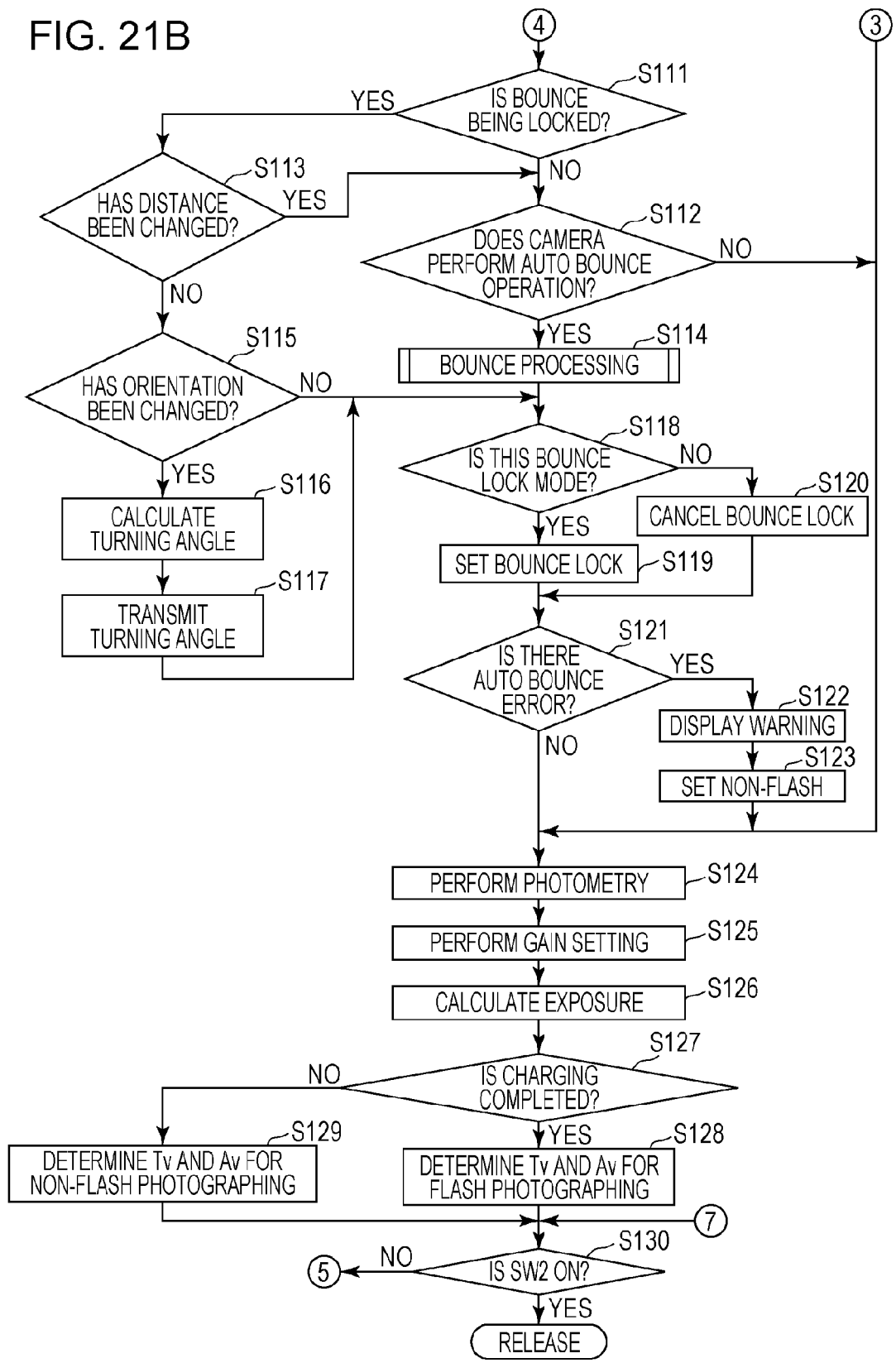
Figure 22:
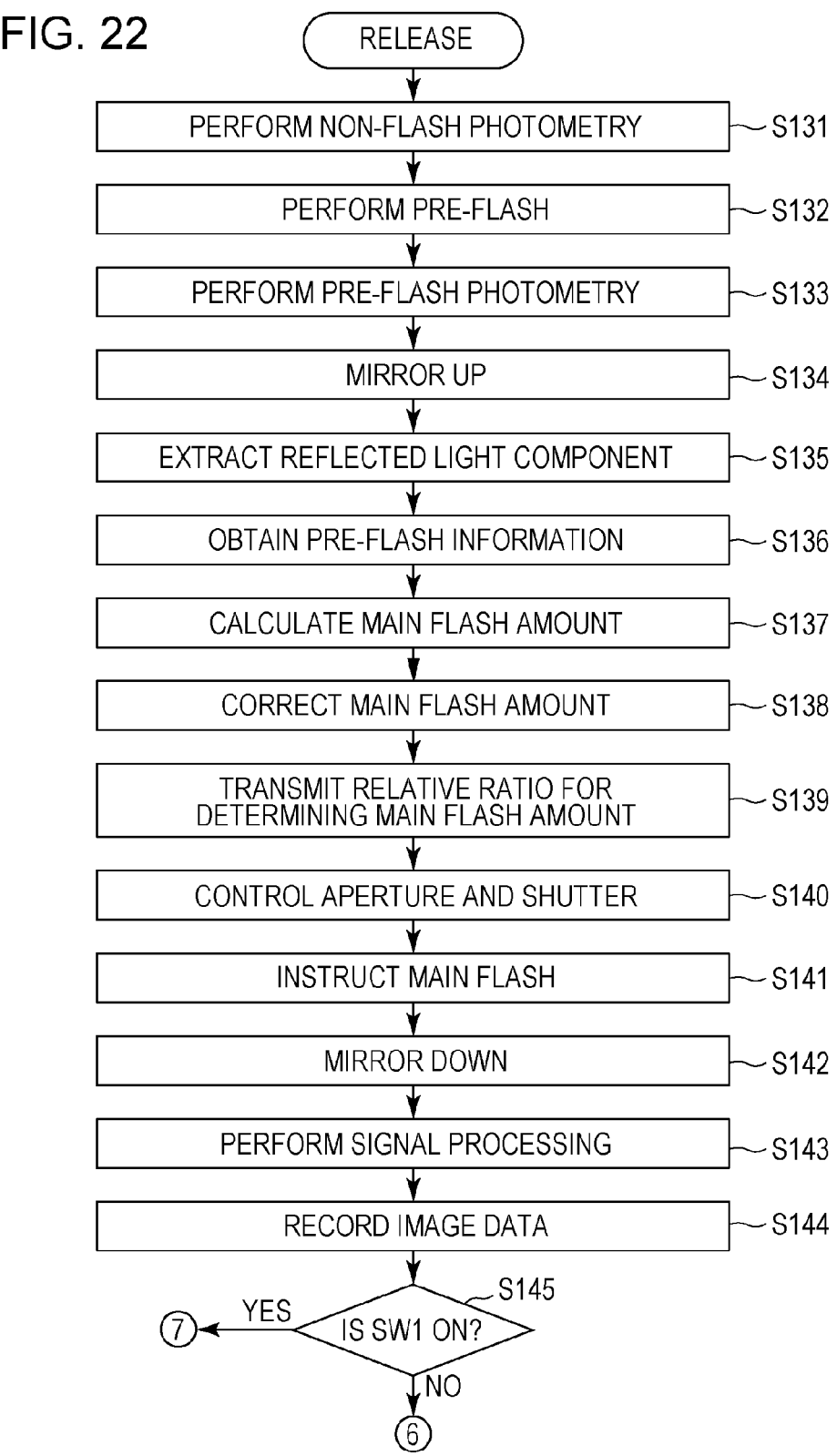
FIG. 22 is a diagram illustrating a flowchart of various processes performed at the camera main body relating to the auto bounce flash photographing in the second embodiment.

The flow continues to step S131 in FIG. 22 after step S130 in FIG. 21, but steps S131 to S145 in FIG. 22 perform the same processes as steps S23 to S37 in FIG. 4, so detailed description will be omitted.

As described above, bounce flash photographing can suitably be performed by automatically changing the irradiation direction of the lighting device in the present embodiment. Further, when employing a configuration in which driving for changing the irradiation direction is automatically performed, driving for changing the irradiation direction can be performed at suitable timing.

Note that the flowcharts described in the present embodiment are only exemplary, and various processes may be executed in sequences different from those in the flowcharts described in the present embodiment as long as there is no problem. Also, the commands, command numbers, and data items described in the present embodiment are only exemplary, these may be set in any way as long as they serve similar roles.

Third Embodiment

Hereinafter, a third embodiment according to the present invention will be described with reference to FIG. 24. A camera system according to the present embodiment is the same camera system as those in the first and second embodiments, so description of the devices making up the camera system will be omitted. Also, communication between the camera main body 100 and flash device 300 is also the same communication as those in the first and second embodiments, so description will be omitted. The present embodiment differs from the second embodiment in that processing is included which fixes the irradiation position set by the user by manually turning the movable unit 300b. When the lock button is operated in a state in which the user manually turns the movable unit 300b, the irradiation position set by the user manually turning the movable unit 300b is fixed (hereinafter, referred to as under manual bounce lock).

Figure 24A:
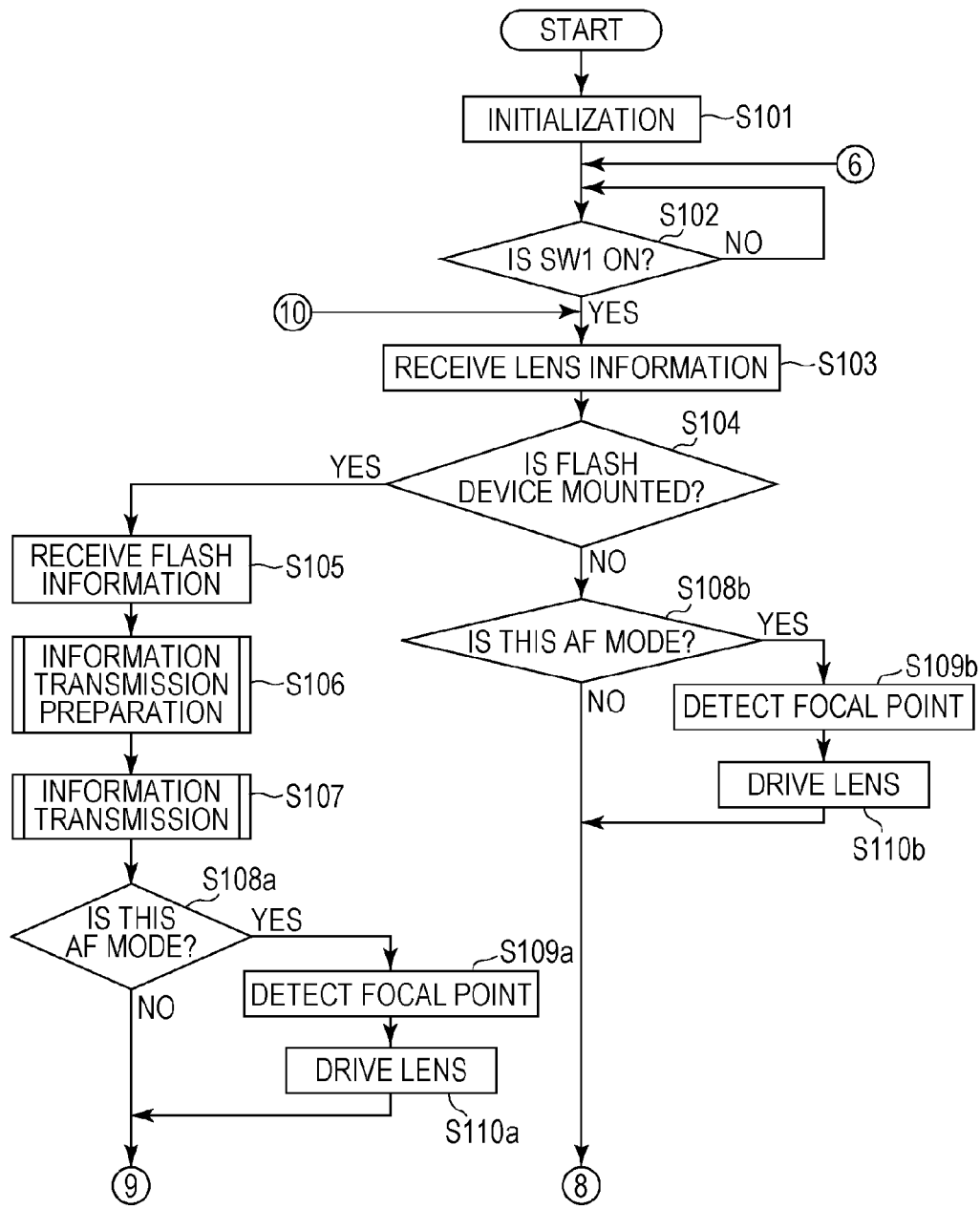
FIG. 24A and FIG. 24B are a diagram illustrating a flowchart of various processes performed at the camera main body relating to auto bounce flash photographing in a third embodiment.
Figure 24B:
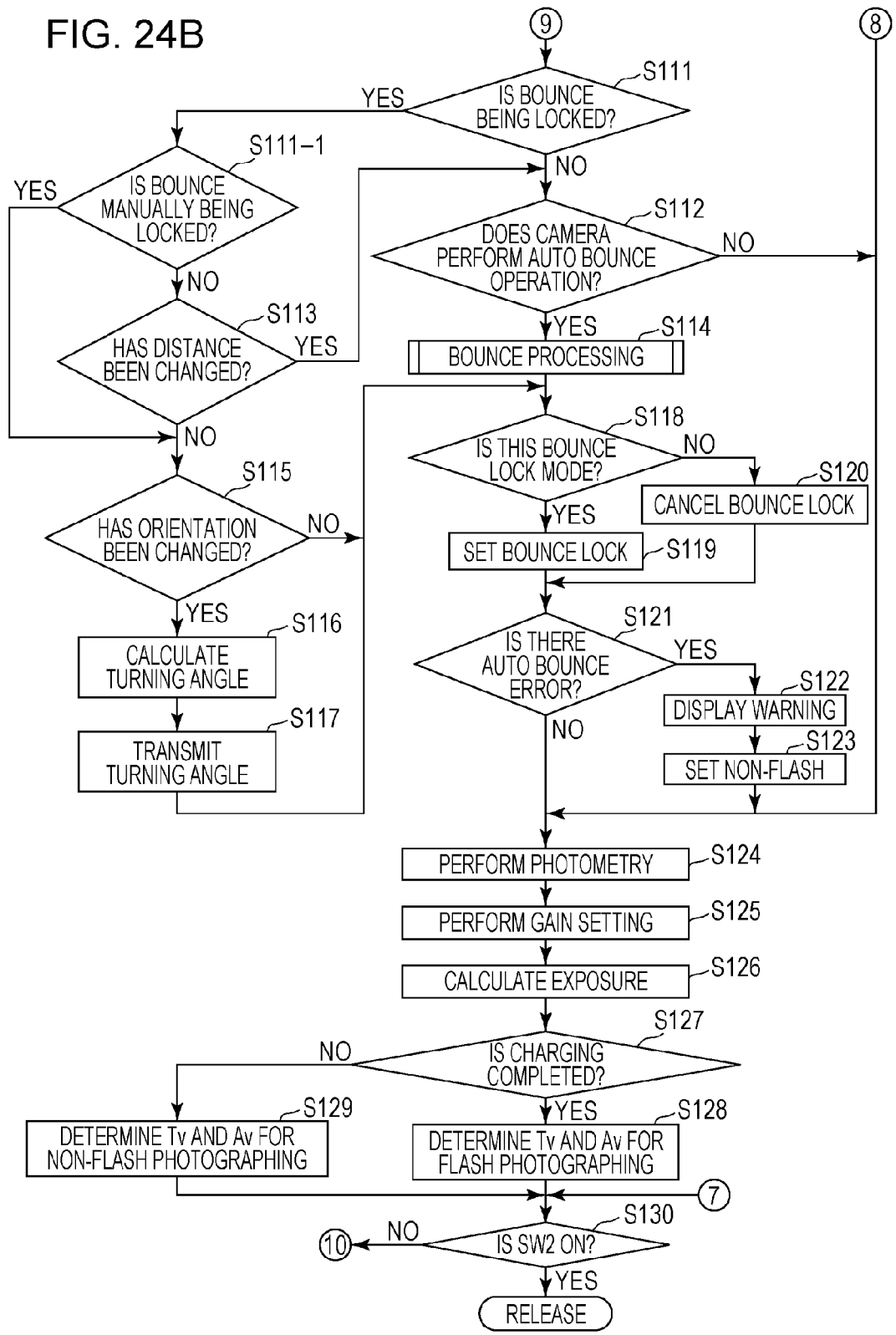

FIG. 24 is a diagram illustrating a flowchart of various processes performed at the camera main body 100 relating to auto bounce flash photographing. FIG. 24 differs from the flowchart illustrated in FIG. 21 in that step S111-1 is included between steps S111 and S113. Others are the same as the flowchart illustrated in FIG. 21, so detailed description will be omitted.

In a case where determination is made in step S111 that the irradiation position by the flash device 300 is under bounce lock, in step S111-1 the camera microcomputer 101 determines whether the irradiation position by the flash device 300 is under manual bounce lock. When the irradiation position by the flash device 300 is under manual bounce lock, the camera microcomputer 101 proceeds to step S115, and when the irradiation position by the flash device 300 is not under manual bounce lock, proceeds to step S113. Note that determination regarding whether the irradiation position by the flash device 300 is under manual bounce lock or under automatic bounce lock is performed based on the current position information of the movable unit 300b when the lock button is operated. For example, in a case where the angle calculated in the bounce processing differs from the angle indicating the current position information, determination is made that the user has manually turned the movable unit 300b.

As described above, processing to be executed is changed in the present embodiment between a case of fixing the irradiation position manually set and a case of automatically fixing the irradiation position. Specifically, resetting of the irradiation position is not automatically performed under manual bounce lock even when the object distance changes greatly. This is because the irradiation position that the user has manually set is prioritized, thereby preventing a new irradiation position from being set. On the other hand, when the orientation of the camera system is changed greatly under manual bounce lock, the turning angle of the movable unit 300b is recalculated. This is because the user has to turn the movable unit 300b to maintain the irradiation position that he/she has manually set.

Thus, in the present embodiment, bounce flash photographing can suitably be performed by automatically changing the irradiation direction of the lighting device. Further, driving of the movable unit 300b for changing the irradiation direction can be performed at suitable timing while giving the intentions of the user greatest priority.

Note that though camera systems wherein the lighting device is mounted on the imaging apparatus has been described in the second and third embodiments, control under bounce lock can also be applied to a lighting device housed in an imaging apparatus. Also, determination processing and turning angle calculation processing under bounce lock may be executed by the flash microcomputer 310 instead of the camera microcomputer 101.

Also, the second and third embodiments are to perform driving for changing the irradiation direction at suitable timing, and conditions for changing the irradiation direction are not restricted to change in object distance or change in orientation. Specifically, there may be employed conditions for changing the irradiation direction regarding any one of change in object distance and change in orientation, and in a case of a configuration including an object detection function, change in an object detection result may be employed as a condition.

Modification

Figure 25A:
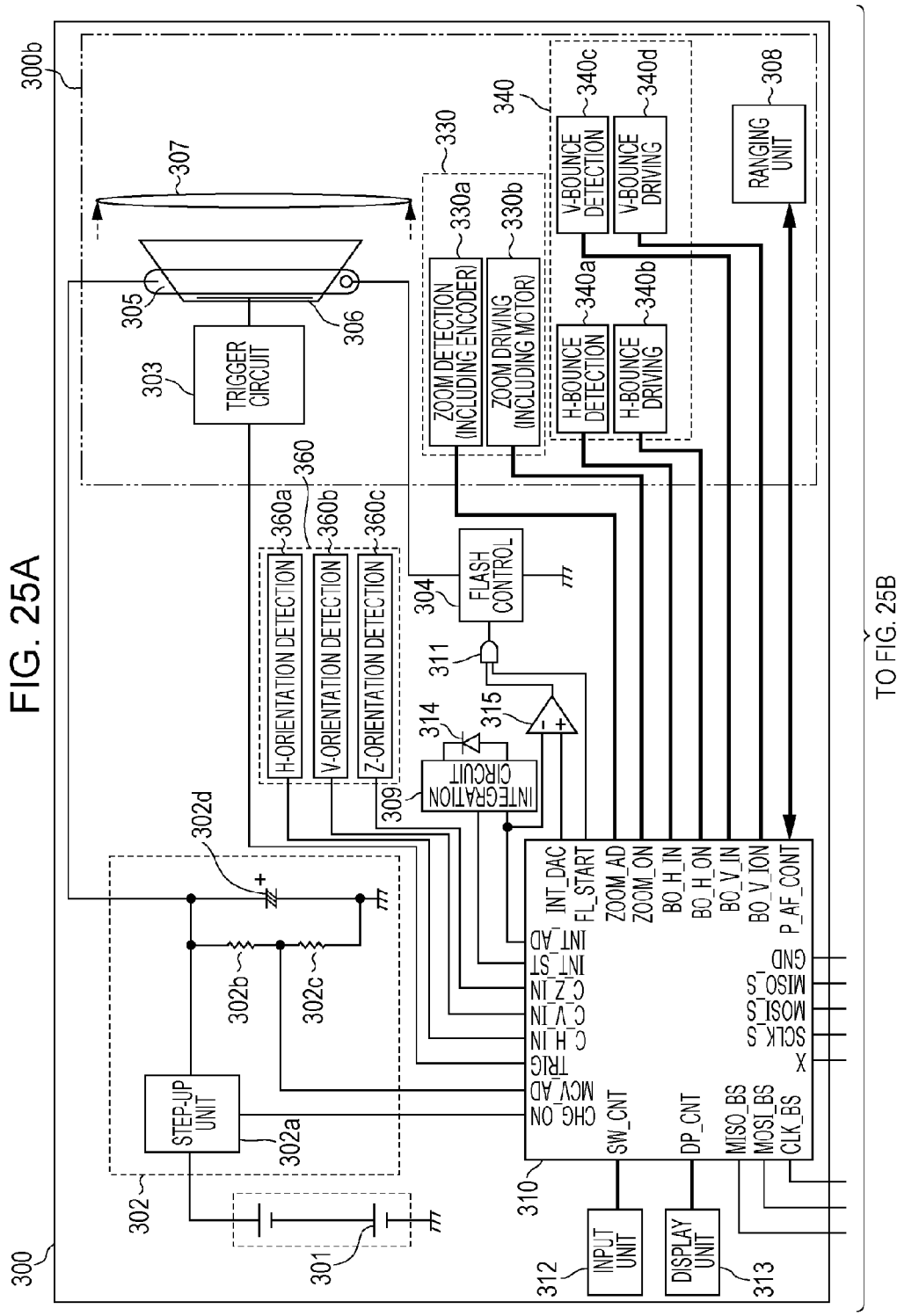

Hereinafter, a modification of the above first to third embodiments will be described with reference to FIG. 25. The camera system illustrated in FIG. 25 includes a terminal 131 separately from the terminal 130 as a communication terminal configured to perform communication between the camera main body 100 and flash device 300, which differs from the above first to third embodiments. The terminal 131 in FIG. 1 illustrates an example of 3-terminal type serial communication.

The terminal 131 includes an SCLK_BS terminal configured to synchronize communication between the camera main body 100 and flash device 300, a MOSI_BS terminal configured to transmit data to the flash device 300, a MISO_BS terminal configured to receive the data transmitted from the flash device 300, and a GND terminal connecting both of the camera main body 100 and flash device 300. Note that the communication speed of the serial communication of the terminal 131 is higher than that of the terminal 130. Though the processes to be executed at the camera main body 100 and flash device 300 in the bounce operation are the same as those in the above embodiments, various communications a performed in the present embodiment along with the bounce operation via the terminal 131.

Thus, time up to directing the irradiation direction of the flash device 300 to the irradiation direction most suitable for bounce flash photographing can be reduced in comparison with communication with the terminal 130 alone, and missed photo opportunities can be avoided. Although the preferred embodiments of the present invention have been described so far, the present invention is not restricted to these embodiments, and various modifications and changes can be made without departing from the essence thereof.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-131671 filed Jun. 24, 2013 and No. 2013-131672 filed Jun. 24, 2013, which are hereby incorporated by reference herein in their entirety.

What is claimed is:

1. A camera system comprising:
a lighting device, wherein the lighting device comprises
a flash unit,
a movable unit including the flash unit,
a detection unit configured to detect information indicating a position of the movable unit, and
a transmission unit configured to transmit position information based on information detected by the detection unit to an imaging apparatus; and
the imaging apparatus, wherein the imaging apparatus comprises
a calculation unit configured to calculate amount of light emission of the flash unit, and
a reception unit configured to receive the position information from the lighting device,
wherein, in a case where the position information received by the reception unit indicates a reference position, the calculation unit calculates the amount of the light emission according to a reflectance ratio of an object existing in a photographing area, and
wherein, in a case where the position information received by the reception unit does not indicate the reference position, the calculation unit calculates the amount of the light emission without the reflectance ratio of the object.

2. The camera system according to claim 1, further comprising:
a driving unit configured to drive the movable unit; and
a deciding unit configured to decide an irradiation direction of the flash unit,
wherein, in a case where the movable unit cannot be moved to a position where an irradiation direction of the flash unit is the irradiation direction decided by the deciding unit, the driving unit drives the movable unit to a position farther from the reference position than the position for the irradiation direction decided by the deciding unit.

3. A camera system comprising:
a lighting device, wherein the lighting device comprises
a flash unit,
a movable unit including the flash unit,
a detection unit configured to detect information indicating the position of the movable unit, and
a transmission unit configured to transmit position information based on information detected by the detection unit to an imaging apparatus; and
the imaging apparatus, wherein the imaging apparatus comprises
a calculation unit configured to calculate amount of light emission of the flash unit, and
a reception unit configured to receive the position information from the lighting device,
wherein, in a case where the position information received by the reception unit indicates a reference position, the calculation unit calculates the amount of the light emission according to a position of an object existing in a photographing area and,
wherein, in a case where the position information received by the reception unit does not indicate the reference position, the calculation unit calculates the amount of the light emission without the position of the object.

4. The camera system according to claim 3, further comprising:
a driving unit configured to drive the movable unit; and
a deciding unit configured to decide an irradiation direction of the flash unit,
wherein, in a case where the movable unit cannot be moved to a position where an irradiation direction of the flash unit is the irradiation direction decided by the deciding unit, the driving unit drives the movable unit to a position farther from the reference position than the position for the irradiation direction decided by the deciding unit.

5. An imaging apparatus configured to be communicable with a lighting device comprising a movable unit including a flash unit, the imaging apparatus comprising:
a calculation unit configured to calculate amount of light emission of the flash unit; and
a reception unit configured to receive, from the lighting device, position information relating to a position of the movable unit,
wherein, in a case where the position information received by the reception unit indicates a reference position, the calculation unit calculates the amount of the light emission according to a reflectance ratio of an object existing in a photographing area, and
wherein, in a case where the position information received by the reception unit does not indicate the reference position, the calculation unit calculates the amount of the light emission without the reflectance ratio of the object.

6. An imaging apparatus configured to be communicable with a lighting device comprising a movable unit including a flash unit, the imaging apparatus comprising:
a calculation unit configured to calculate amount of light emission of the flash unit; and
a reception unit configured to receive position information relating to the position of the movable unit from the lighting device,
wherein, in a case where the position information received by the reception unit indicates a reference position, the calculation unit calculates the amount of the light emission according to a position of an object existing in a photographing area and, wherein, in a case where the position information received by the reception unit does not indicate the reference position, the calculation unit calculates the amount of the light emission without the position of the object.

7. A control method for a camera system having a lighting device that comprises a movable unit having a flash unit and having an imaging apparatus, the control method comprising:

detecting, via the lighting device, information indicating a position of the movable unit, and transmitting, via the lighting device, position information based on detected information to the imaging apparatus;

calculating, via the imaging apparatus, amount of light emission of the flash unit, and receiving, via the imaging apparatus, the position information from the lighting device, wherein, in a case where the received position information indicates a reference position, calculating includes calculating the amount of the light emission according to a reflectance ratio of an object existing in a photographing area, and wherein, in a case where the received position information does not indicate the reference position, calculating includes calculating the amount of the light emission without the reflectance ratio of the object.

8. A control method for a camera system having a lighting device that comprises a movable unit including a flash unit, and having an imaging apparatus, the control method comprising:

detecting, via the lighting device, information indicating a position of the movable unit, and transmitting, via the lighting device, position information based on detected information to the imaging apparatus;

calculating, via the imaging apparatus, amount of light emission of the flash unit, and receiving, via the imaging apparatus, the position information from the lighting device, wherein, in a case where the received position information indicates a reference position, calculating includes calculating the amount of the light emission according to a position of an object existing in a photographing area, and wherein, in a case where the received position information does not indicate the reference position, calculating includes calculating the amount of the light emission without the position of the object.

* * * * *